US012401835B2

(12) United States Patent
Govindarajan

(10) Patent No.: US 12,401,835 B2
(45) Date of Patent: Aug. 26, 2025

(54) METHOD OF AND SYSTEM FOR STRUCTURING AND ANALYZING MULTIMODAL, UNSTRUCTURED DATA

(71) Applicant: Arrived Inc., Andover, MA (US)

(72) Inventor: Barghavi Govindarajan, Andover, MA (US)

(73) Assignee: Arrived Inc., Andover, MA (US)

( * ) Notice: Subject to any disclaimer, the term of this patent is extended or adjusted under 35 U.S.C. 154(b) by 0 days.

(21) Appl. No.: 18/971,990

(22) Filed: Dec. 6, 2024

(65) Prior Publication Data

US 2025/0193462 A1 Jun. 12, 2025

Related U.S. Application Data

(60) Provisional application No. 63/607,326, filed on Dec. 7, 2023.

(51) Int. Cl.
| | | |
|---|---|---|
| *G06F 40/284* | (2020.01) | |
| *G06F 16/683* | (2019.01) | |
| *G06F 16/783* | (2019.01) | |
| *G06F 16/903* | (2019.01) | |
| *G06Q 50/00* | (2012.01) | |
| *G06V 40/16* | (2022.01) | |

(Continued)

(52) U.S. Cl.
CPC ..... *H04N 21/23418* (2013.01); *G06F 16/685* (2019.01); *G06F 16/7837* (2019.01); *G06F 16/7844* (2019.01); *G06F 16/90335* (2019.01); *G06F 40/284* (2020.01); *G06Q 50/01* (2013.01); *G06V 40/161* (2022.01); *G10L 15/26* (2013.01); *H04N 21/845* (2013.01)

(58) Field of Classification Search
CPC ............ H04N 21/23418; H04N 21/845; G06F 16/7844; G06F 16/90335; G06F 16/7837; G06F 16/685; G06F 40/205; G06V 40/161; G06Q 50/01; G10L 15/26
See application file for complete search history.

(56) References Cited

U.S. PATENT DOCUMENTS

| | | | |
|---|---|---|---|
| 9,830,613 B2 | 11/2017 | Palmer et al. | |
| 10,846,613 B2 | 11/2020 | Ray et al. | |

(Continued)

FOREIGN PATENT DOCUMENTS

| | | |
|---|---|---|
| IN | 202111049034 A | 11/2022 |
| KR | 101730982 B1 | 4/2017 |
| KR | 20230099900 A | 7/2023 |

*Primary Examiner* — Rong Le
(74) *Attorney, Agent, or Firm* — Caldwell Intellectual Property Law

(57) ABSTRACT

A system and method for structuring and analyzing multimodal, unstructured data, as well as an article of manufacture and processor-readable storage medium implementing the same, may be used to provide a content creator with a tool to understand what actionable steps they could take to make a video perform well or go viral. Embodiments include a user interface simultaneously including a region for accepting a user query and a region that displays insight cards. The insight cards are generated based on retrieving a plurality of streaming contents, sorting the plurality of streaming contents into a viral set using one or more virality metrics, generating at least one token from the viral set, and performing a search of the viral set as a function of the at least one token to produce one or more results. The results are presented through the one or more insight cards in the user interface.

22 Claims, 21 Drawing Sheets

(51) Int. Cl.
    *G10L 15/26*     (2006.01)
    *H04N 21/234*     (2011.01)
    *H04N 21/845*     (2011.01)

(56) References Cited

U.S. PATENT DOCUMENTS

2014/0359647 A1    12/2014    Shoemake et al.
2018/0189074 A1    7/2018    Kulkarni et al.

| original_title | tagline | genres | revenue | vote_average | vote_count |
|---|---|---|---|---|---|
| The Matrix Reloaded | Free your mind. | [{"id": 12, "name": "Adventure"... | 738599701 | 6.7 | 3443 |
| The Matrix | Welcome to the Real World. | [{"id": 28, "name": "Action"},... | 463517383 | 7.9 | 8907 |
| The Matrix Revolutions | Everything that has a beginning has an end. | [{"id": 12, "name": "Adventure"... | 424988211 | 6.4 | 3096 |
| Star Trek | The future begins. | [{"id": 878, "name": "Science F... | 385680446 | 7.4 | 4518 |
| Enchanted | This fairytale princess is about to meet a real Prince Charming | [{"id": 35, "name": "Comedy"},... | 340487652 | 6.6 | 1449 |
| The Truman Show | On the air. Unaware. | [{"id": 35, "name": "Comedy"},... | 264118201 | 7.8 | 4537 |
| Total Recall | They stole his mind, now he wants it back | [{"id": 28, "name": "Action"},... | 261317921 | 7.1 | 1710 |
| Space Jam | Get ready to jam. | [{"id": 16, "name": "Animation"... | 250200000 | 6.5 | 1288 |
| Click | What If You Had A Remote... That Controlled Your Universe? | [{"id": 35, "name": "Comedy"},... | 237681299 | 6 | 2104 |
| Bedtime Stories | Whatever they dream up... he has to survive. | [{"id": 14, "name": "Fantasy"},... | 212274442 | 5.9 | 891 |
| Vanilla Sky | Forget everything you know, and open your eyes. | [{"id": 18, "name": "Drama"},... | 203388341 | 6.5 | 1078 |
| Spy Kids 3-D: Game Over | 3rd Mission. 3rd Dimension. | [{"id": 28, "name": "Action"},... | 197011982 | 4.7 | 511 |
| Rambo III | The first man for himself. The second for his country. This time it's to save his friend. | [{"id": 28, "name": "Action"},... | 189015611 | 5.7 | 693 |
| Contact | if it's just us, it seems like an awful waste of space. | [{"id": 18, "name": "Drama"},... | 171120329 | 7.2 | 1308 |
| The Spiderwick Chronicles | Their World Is Closer Than You Think. | [{"id": 12, "name": "Adventure"... | 162839667 | 6.3 | 572 |
| Bridge to Terabithia | Close your eyes, but keep your mind wide open. | [{"id": 12, "name": "Adventure"... | 137587863 | 7 | 1113 |
| Last Action Hero | This isn't the movies anymore. | [{"id": 12, "name": "Adventure"... | 137298489 | 6.1 | 712 |
| Coraline | Be careful what you wish for. | [{"id": 16, "name": "Animation"... | 124596398 | 7.3 | 1386 |
| Blazing Saddles | Never give a saga an even break! | [{"id": 37, "name": "Western"},... | 119500000 | 7.2 | 609 |
| The Game | What do you get for the man who has everything? | [{"id": 18, "name": "Drama"},... | 109423648 | 7.3 | 1506 |
| The Cell | Enter The Mind Of A Killer | [{"id": 18, "name": "Horror"},... | 104155343 | 6 | 436 |
| She's All That | These two opposites attract... But EVERYONE'S trying to keep them apart! | [{"id": 35, "name": "Comedy"},... | 103168089 | 5.7 | 413 |

2001

| | | | |
|---|---|---|---|
| 5.1 | Viral Moods | Viral Moods - Likes | Likes |
| 5.2 | | Viral Moods - Views | Views |
| 5.3 | | Viral Moods - Comments | Comments |
| 5.4 | | Viral Moods - Shares | Shares |
| 6.1 | Top Creator | Top Creator - Likes | Likes |
| 6.2 | | Top Creator - Views | Views |
| 6.3 | | Top Creator - Comments | Comments |
| 6.4 | | Top Creator - Shares | Shares |
| 7 | Top Hashtag | Top Hashtag - Likes | Likes |
| 7.2 | | Top Hashtag - Views | Views |
| 7.3 | | Top Hashtag - Comments | Comments |
| 7.4 | | Top Hashtag - Shares | Shares |

FIG. 2L

METHOD OF AND SYSTEM FOR STRUCTURING AND ANALYZING MULTIMODAL, UNSTRUCTURED DATA

CROSS-REFERENCE TO RELATED APPLICATIONS

This application claims the benefit of priority of U.S. Provisional Application Ser. No. 63/607,326, filed on Dec. 7, 2023, and entitled "METHOD OF AND SYSTEM FOR ESTIMATION OF CONTENT UPTAKE METRICS", the entirety of which is incorporated herein by reference.

FIELD OF THE INVENTION

The present invention generally relates to the field of streaming content analysis. In particular, the present invention is directed to methods and systems for structuring and analyzing multimodal, unstructured data.

BACKGROUND

Data and information are often streamed via online platforms in order to reach a broad audience. Such streaming data, when disseminated, potentially create various benefits and sources of revenues. However, how certain streaming data may attract attention or be engaged with by its audience is challenging to predict in a reliable, quantitative manner. Successfully disseminated streaming contents may likely have one or more shared traits, but these traits remain elusive to existing analytical tools with limited predictive capabilities and are often only identified in hindsight. In addition, streaming data are often unstructured, highly intricate, nuanced, and multimodal in nature. Streaming data may include without limitation audio data, video data, image data, textual data, tones, details and/or styles of editing, and/or metadata, among others. Such features add additional complexity in processing and analyzing streaming data and make it even more challenging to glean insights therefrom.

SUMMARY OF THE DISCLOSURE

Techniques for performing a sapient search method and using/implementing a sapient search system are disclosed. In one or more embodiments, the techniques may be realized as a search system. The search system includes one or more processors and a memory communicatively connected to the one or more processors. The memory contains instructions configured to be readable by one or more processors in order to perform one or more of their functions. The one or more processors are configured to receive data from and transmit data to a user interface. The user interface is configured to simultaneously display a first region and a second region. The first region is configured to receive a user query. The second region is configured to display results, as one or more insight cards, as a function of the user query. The one or more processors are configured to receive the user query from the first region of the user interface. Receiving the user query includes parsing the user query into a plurality of keywords using at least a textual processing module. The one or more processors are further configured to receive a set of streaming contents. The set of streaming contents includes unstructured data including a plurality of video frames and an audio stream. The one or more processors are further configured to structure the unstructured data of the set of streaming contents by extracting a first plurality of tokens from the plurality of video frames as a function of an object recognition module, extracting a second plurality of tokens from the audio stream as a function of a speech-to-text module, and combining the first plurality of tokens and the second plurality of tokens to form a unified set of tokens. The one or more processors are further configured to retrieve a plurality of streaming contents, including without limitation a plurality of videos, clips, audios, and/or the like, as a function of the plurality of keywords. Retrieving the plurality of streaming content includes selecting at least a streaming content from the set of streaming contents, wherein at least a token of the unified set of tokens matches at least a keyword of the plurality of keywords. The one or more processors are further configured to sort the plurality of streaming contents into a viral set, as a function of one or more virality metrics. The one or more processors are further configured to generate at least one insight token from the viral set. The one or more processors are further configured to perform a search of the viral set as a function of the at least one insight token to produce one or more results. The one or more processors are further configured to present the one or more results through the one or more insight cards in the second region of the user interface.

In one embodiment of the system, the at least one token of the second plurality of tokens may include a text tag. The text tag may be derived using an AI method, a statistical inference method, and/or the like. In one or more embodiments, the speech-to-text module may include a large language model (LLM), wherein the LLM is trained on training data and configured to extract the at least a text tag from the audio stream. In one or more embodiments, the LLM may include a plurality of domain-specific machine-learning models and each domain-specific machine-learning model of the plurality of domain-specific machine-learning models may be configured to fine-tune the at least one token of the second plurality of tokens.

In another embodiment of the system, the one or more insight cards may be generated using a video object recognition AI method, a language translation AI method, and/or a speech transcript extraction AI method, among others.

In another embodiment of the system, the one or more insight cards may be generated using a machine-learning model trained on training data, wherein the machine-learning model is selected from a group consisting of a video object recognition machine-learning model, a language translation machine-learning model, and a speech transcript extraction machine-learning model.

In another embodiment of the system, extracting the first plurality of tokens from the plurality of video frames may include identifying a face within a first video frame using the object recognition module, calculating a facial presence of the face in each video frame of the plurality of video frames, determining a facial presence percentage as a function of a count of video frames in which the facial presence is positive and a total count of video frames, and storing the facial presence percentage as at least a token of the first plurality of tokens.

In another embodiment of the system, the user query may include a plurality of query video frames and a query audio stream. Accordingly, parsing the user query may include structuring the user query by extracting at least a first keyword from the plurality of query video frames, as a function of the object recognition module, extracting at least a second keyword from the query audio stream as a function of the speech-to-text module, and combining the at least a first keyword and the at least a second keyword to form the plurality of keywords.

In one embodiment of the system, at least one of the one or more insight cards may be generated using a statistical inference method.

In another embodiment of the system, at least one of the one or more insight cards may be generated using a generative AI method.

In one embodiment of the system, the one or more virality metrics may include without limitation a number of likes, a number of dislikes, a number of shares, a number of comments, a number of views per like, a number of likes per follower, a number of shares per follower, a number of shares per viewer, a number of shares over total number of streaming contents, a number of shares over total number of shares, a number of likes per total likes in a channel, a number of views per subscriber, a retention rate of viewers, a retention time of viewers, a number of followers gained upon video posting, and/or a number of total followers in the channel, among others.

In another embodiment of the system, for each token of the at least one token, the one or more processors may be configured to determine a frequency in the viral set for each token of the unified set of tokens, and accordingly calculate a p-value using a hypergeometric test as a function of the frequency.

In one embodiment of the system, the user query may include text, an image, a video, and/or a keyword, among others.

In another embodiment of the system, the user interface may further include a third region configured to display viral concepts related to the user query. These viral concepts may be determined as a function of a prior history of virality for concepts that are associated with the user query.

In one embodiment of the system, performing the search may include performing a viral set quantification of actionability as a function of the viral set.

In one embodiment of the system, the one or more processors may be further configured to prioritize the one or more insight cards in a decreasing order of virality salience.

In another embodiment of the system, the plurality of streaming contents may be obtained from a domain of content. The domain of content may include a database of streaming contents having categories such as without limitation fighting science misinformation, promoting public understanding of science and science-based issues, supporting evidence-based public health agency communications, issues of national security and intelligence, women's and children's welfare and health, sports medicine and fitness, and/or the like.

In one embodiment of the system, the plurality of streaming contents may be obtained from a first platform and a second platform. The at least one token may be generated from the first platform. At least one additional token may be generated from the second platform. The search of the viral set may accordingly be performed as a function of the at least one token and the at least one additional token to produce the one or more results.

In another embodiment of the system, the one or more results may be ranked or prioritized as a function of a sequence of virality scores calculated over time.

In another particular embodiment, the techniques may be realized as a search method. The method includes receiving data from and transmitting data to a user interface. The user interface is configured to simultaneously display a first region and a second region. The method further includes receiving, by one or more processors, a user query through the first region. Receiving the user query includes parsing the user query into a plurality of keywords using at least a textual processing module. The method further includes receiving, a set of streaming contents. The set of streaming contents includes unstructured data including a plurality of video frames and an audio stream. The method further includes structuring the unstructured data of the set of streaming contents by extracting a first plurality of tokens from the plurality of video frames as a function of an object recognition module, extracting a second plurality of tokens from the audio stream as a function of a speech-to-text module, and combining the first plurality of tokens and the second plurality of tokens to form a unified set of tokens. The method further includes retrieving a plurality of streaming contents as a function of the plurality of keywords. Retrieving the plurality of streaming contents includes selecting at least a streaming content from the set of streaming contents, wherein at least a token of the unified set of tokens matches at least a keyword of the plurality of keywords. The method further includes sorting the plurality of streaming contents into a viral set, as a function of one or more virality metrics. The method further includes generating at least one token from the viral set. The method further includes performing a search of the viral set, as a function of the at least one token to produce one or more results. The method further includes displaying the one or more results, through one or more insight cards, in the second region of the user interface.

In one embodiment of the method, the at least one token may include a text tag.

In another embodiment of the method, the method may further include deriving the text tag using an AI method, a statistical inference method, and/or the like. In one or more embodiments, the speech-to-text module may include a large language model (LLM), wherein the LLM is trained on training data and configured to extract the at least a text tag from the audio stream.

In one embodiment of the method, the method may further include generating the one or more insight cards using a video object recognition AI method, a language translation AI method, and/or a speech transcript extraction AI method, among others.

In another embodiment of the method, the one or more insight cards may be generated using a machine-learning model trained on training data, wherein the machine-learning model is selected from a group consisting of a video object recognition machine-learning model, a language translation machine-learning model, and a speech transcript extraction machine-learning model.

In another embodiment of the method, the one or more insight cards may be generated using a machine-learning model trained on training data, wherein the machine-learning model is selected from a group consisting of a video object recognition machine-learning model, a language translation machine-learning model, and a speech transcript extraction machine-learning model.

In another embodiment of the method, extracting the first plurality of tokens from the plurality of video frames may include identifying a face within a first video frame using the object recognition module, calculating a facial presence of the face in each video frame of the plurality of video frames, determining a facial presence percentage as a function of a count of video frames in which the facial presence is positive and a total count of video frames, and storing the facial presence percentage as at least a token of the first plurality of tokens.

In another embodiment of the method, the user query may include a plurality of query video frames and a query audio stream. Accordingly, parsing the user query may include structuring the user query by extracting at least a first keyword from the plurality of query video frames, as a function of the object recognition module, extracting at least a second keyword from the query audio stream as a function of the speech-to-text module, and combining the at least a first keyword and the at least a second keyword to form the plurality of keywords.

In another embodiment of the method, the method may further include generating the one or more insight cards using a statistical inference method.

In one embodiment of the method, the method may further include generating the one or more insight cards using a generative AI method.

In another embodiment of the method, the one or more virality metrics may include without limitation a number of likes, a number of dislikes, a number of shares, a number of comments, a number of views per like, a number of likes per follower, a number of shares per follower, a number of shares per viewer, a number of shares over total number of streaming contents, a number of shares over total number of shares, a number of likes per total likes in a channel, a number of views per subscriber, a retention rate of viewers, a retention time of viewers, a number of followers gained upon video posting, and/or a number of total followers in the channel, among others.

In one embodiment of the method, the method may further include determining a frequency in the viral set for each token of unified set of tokens and accordingly calculating a p-value using a hypergeometric test as a function of the frequency.

In another embodiment of the method, the user query may include text, an image, a video, a keyword, and/or the like.

In one embodiment of the method, the user interface may further include a third region configured to display viral concepts related to the user query. These viral concepts may be determined as a function of a prior history of virality for concepts that are associated with the user query.

In one embodiment of the method, performing the search may include performing a viral set quantification of actionability as a function of the viral set.

In another embodiment of the method, the method may further include prioritizing the one or more insight cards in a decreasing order of virality salience.

In one embodiment of the method, the method may further include obtaining the plurality of streaming contents from a domain of content. The domain of content may include a database of streaming contents having categories such as without limitation fighting science misinformation, promoting public understanding of science and science-based issues, supporting evidence-based public health agency communications, issues of national security and intelligence, women's and children's welfare and health, sports medicine and fitness, and/or the like.

In another embodiment of the method, the method may further include obtaining the plurality of streaming contents from a first platform and a second platform. The method may further include generating the at least one token from the first platform. The method may further include generating at least one additional token from the second platform. The method may further include performing the search of the viral set as a function of the at least one token and the at least one additional token to produce the one or more results.

In one embodiment of the method, the method may further include prioritizing the one or more results as a function of a sequence of virality scores calculated over time.

In another embodiment of the method, the techniques may be realized as at least one processor-readable storage medium storing a computer program of instructions configured to be readable by at least one processor for instructing the at least one processor to execute a computer process for performing any method described above.

In another embodiment of the method, the techniques may be realized as an article of manufacture for performing Sapient searches. The article of manufacture includes at least one processor-readable storage medium and instructions stored on the at least one processor-readable storage medium, wherein the instructions are configured to be readable from the at least one processor-readable storage medium by at least one processor and thereby cause the at least one processor to operate so as to perform any method described above.

These and other aspects and features of nonlimiting embodiments of the present invention will become apparent to those skilled in the art upon review of the following description of specific nonlimiting embodiments of the invention in conjunction with the accompanying drawings.

While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2F is a set of exemplary results of term viral frequencies generated by the system in FIG. 1;

FIG. 2G-H are two sets of exemplary results generated by the system in FIG. 1 as a function of a query;

FIG. 2I is a set of exemplary taglines results generated by the system in FIG. 1 as a function of a query; and FIGS. 2J-M are exemplary statistical results generated by the system in FIG. 1;

Figure 1:
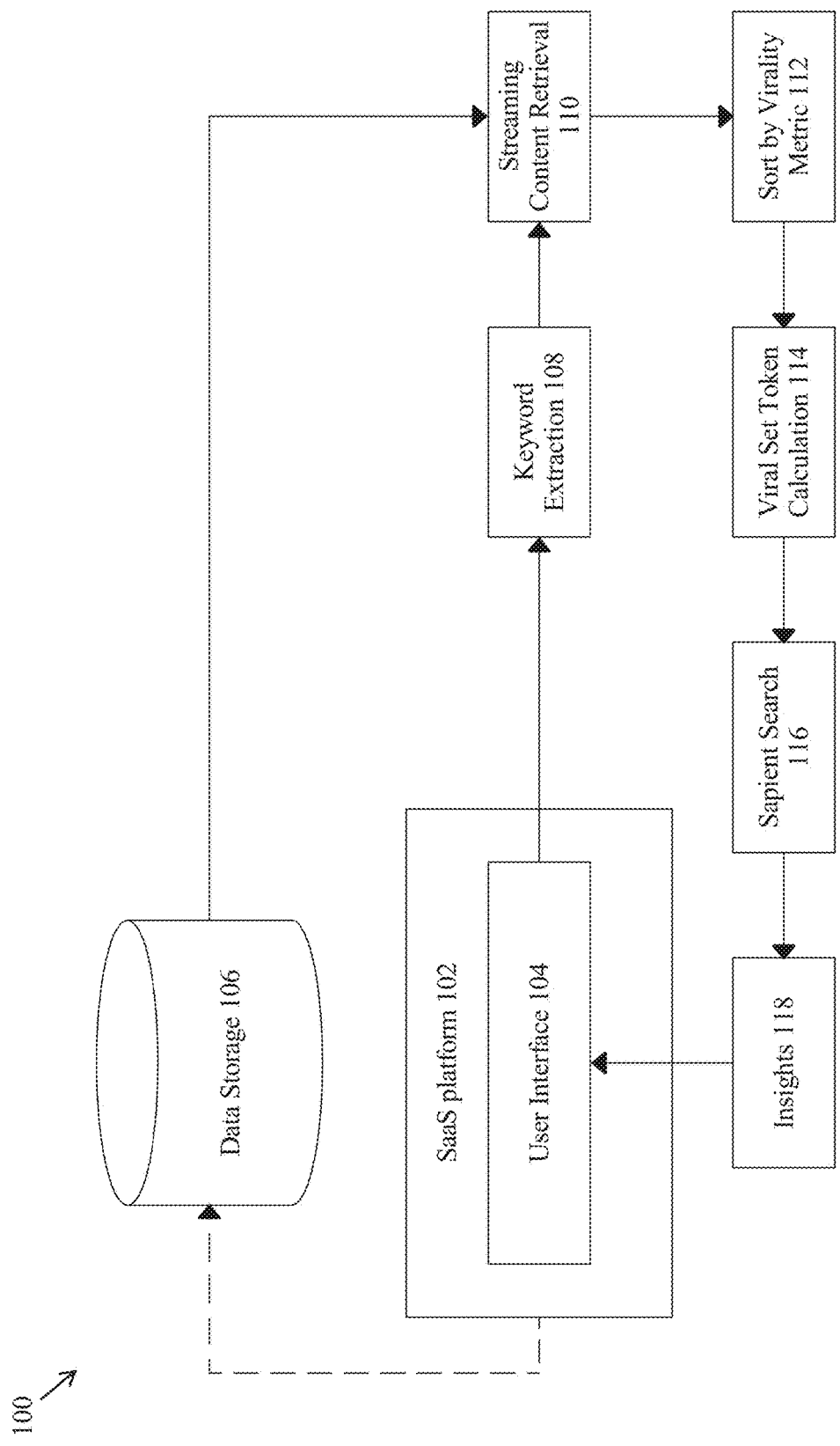
FIG. 1 is an exemplary block diagram of a system for estimating content uptake metrics.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for structuring and analyzing multimodal, unstructured data. Aspects of the present disclosure may be used to Aspects of the present disclosure may be used to estimate content uptake metrics. Aspects of the present disclosure may be used to generate reliable insights that help content creators gain recognition and/or increase revenue on social medial platforms. Exemplary embodiments illustrating aspects of the present disclosure are described below in the context of several specific examples.

Content creators are constantly uploading new videos, clips, and audios online across a growing multitude of social media websites and apps in the hopes of achieving the coveted prize of virality. When a video goes viral, it begins to be consumed at an increasingly fast rate and reaches more and more users as time goes on. Other than popularity, both in the real world and online, a post, image, video, clip, audio, or other streaming content going viral may enable its creator to receive significant revenue based on advertisements/product placements, endorsement deals, links to products for purchase, and/or other electronic rights associated with the content.

Existing Artificial Intelligence (AI) technologies are used to supplement insights and other data beyond what a particular social media platform may provide its creators. However, there is no mechanism available to make content go viral consistently and repeatedly. Trends are currently adopted by creators after they become dominant. However, timing may make all the difference, with the first few posts on an incipient trend going viral, while the bulk of later posts fade into relative obscurity. Creating captivating streaming content on one social media platform requires more than just skill; mirroring that success on new social platforms further involves enormous guesswork. A reliable tool that would allow content creators to discern what makes their content go viral does not yet exist.

A social media content creator regularly creates content (e.g., text, images, videos/audios, or video/audio clips) and posts that content to a social media website, platform, or application (e.g., FACEBOOK, INSTAGRAM, TWITTER/X, TIKTOK, YOUTUBE, SPOTIFY, and/or the like). Such content is often judged according to the numbers of clicks, views, likes, shares, views, number of subscribers or followers, and so on. When a content goes viral, most people may generally agree on a few common concepts in the content as being key to its virality or popularity. However, the exact role(s) of such concepts and their correlation(s) to the convent going viral may sometimes be challenging to quantify or predict. A factor that can contribute to a new content going viral may include without limitation the set of concepts, characteristics, or other features of previous posts, videos, audios, etc., that came before the new content. As a nonlimiting example, a pop star who has already released many hit songs and accompanying music videos over the previous few years may be more likely to see their new video go viral due to the fact that the new video is created by the same pop star and is of a similar type of music to that created before. As another nonlimiting example, an online video game critic may unexpectedly go viral for going on an angry rant about a certain video game. The critic May make another video about the same game, and it does not go viral. Trying again, the critic may make another video including an angry rant about a different video game. Thus, the pop star's new video went viral likely because it is associated with the pop star's name, brand, and/or type of music, whereas the video game critic's new video went viral likely because its audience liked seeing the creator going on another angry rant. To continue making contents go viral and uncover new concepts that aid in the creation of viral contents, these creators may use a platform according to an embodiment of the invention described herein.

In addition, knowing what is trending from a diverse set of data sources-beyond the primary platform a content creator is engaged on (e.g., FACEBOOK, INSTAGRAM, TWITTER/X, TIKTOK, YOUTUBE, SPOTIFY, and/or the like)—ranging from TV shows (e.g., Netflix) to media (e.g., Google News) to stocks, weather, local sports at the time of the content creator's query, and so forth, can dramatically influence the content creator beyond their silo.

It is also worth noting that, apart from the diverse sources and large quantity of streaming contents, which already pose sufficient difficulty with respect to their processing and analysis, the unstructured, multimodal, and often highly nuanced nature of the streaming contents may add another layer of challenge. As a nonlimiting example, a streaming content is often not readily searchable based on the content therein, unless one or more correct keywords are used as part of the query to match the title and/or description of the streaming content. As another nonlimiting example, when a streaming content includes a video clip with sound, the information that defines the streaming content (e.g., the information that potentially makes the streaming content gain wide-spread popularity) is often buried in the video frames and audio streams therein, as part of visual images, audio dialogues, closed captions, tones, rhythms, punctuations, styles, and/or the like, in a highly unstructured manner that is elusive from proper quantification.

The invention described herein provides an AI-based software as a service (SaaS) platform that uncovers features from streaming contents and estimates/predicts a content creator's audience uptake. The platform unearths temporal patterns from the semantics of past viral trends, which enables content creators to become cognizant of real-time upticks in trends at inception. By capturing elements of the content that make the content stand apart from other competing content online, the platform facilitates ongoing collaboration enabling the creator to become more visible on social channels, and continually increase brand visibility as well as revenue streams. The platform described herein presents a non-incremental improvement and provides a superior technical solution for analysis of streaming content and prediction of uptake metrics thereof compared to existing methods, machineries, and/or the like. Additional details will be provided below in this disclosure.

While particular embodiments described herein are described as being useful for social media creators who post on FACEBOOK, INSTAGRAM, TWITTER/X, TIKTOK, YOUTUBE, SPOTIFY, and/or the like, such embodiments are not limited to the particular websites, services, or applications used. Instead, these platforms are intended to serve merely as nonlimiting examples to illustrate the wide-ranging applicability of the invention described herein.

Referring now to FIG. 1, an exemplary embodiment of a system 100 for structuring and analyzing multimodal, unstructured data is illustrated. For the purposes of this disclosure, "multimodal" data are data of two or more types, forms, and/or modalities. Multidata may combine any two or more types of data in any suitable configuration recognized by a person of ordinary skill in the art, upon reviewing the entirety of this disclosure. In some cases, multimodal data may include a combination of graphical data and audio data. As a nonlimiting example, multimodal data may include a video clip (i.e., a plurality of video frames arranged in a temporal sequence) and an audio stream synchronized therewith. In some cases, multimodal data may include a combination of textual data, graphical data, and audio data. As another nonlimiting example, multimodal data may include a video clip (i.e., a plurality of video frames arranged in a temporal sequence), an audio stream synchronized with the video clip, and a stream of closed caption synchronized with the audio stream.

With continued reference to FIG. 1, system 100 may be used for estimating content uptake metrics. For the purposes of this disclosure, a "content uptake metric" is an indication, often of a predictive nature, evaluating how certain data or information can potentially be viewed, received, consumed, perceived, analyzed, or otherwise engaged with by a user or entity. For the purposes of this disclosure, a "streaming content" is a collection of data transmitted between a first computing device pertaining to a first entity and a second computing device pertaining to a second entity. In one or more embodiments, the first entity may include an entity that initiates a data streaming process, such as without limitation one or more content creators (e.g., influencers, YouTubers, TikTokers, etc.). Accordingly, the second entity may include an entity located on the receiving end of such a streaming process, such as without limitation one or more APP users, audience members, subscribers, listeners, followers, and/or the like. In some cases, for the sake of simplicity, the second entity may simply be referred to as a viewer. It is worth noting that the designation of the first and the second entities is arbitrary and a matter of perspective. As a nonlimiting example, the first entity (e.g., a viewer) may leave comments, reviews, endorsements, criticisms, suggestions, and/or the like, for the second entity (e.g., a content creator) to view, reply to, agree with, argue against, or otherwise engage upon.

With continued reference to FIG. 1, in one or more embodiments, a streaming content may include a social media post. A social media post may include any type, organization, or format of data as recognized by a person of ordinary skill in the art, upon reviewing the entirety of this disclosure. A social media post may include "still" data that typically do not vary as a function of time, such as without limitation one or more photographs, pictures, charts, cartoons, comics, drawings, sketches, memes, words, phrases, sentences, paragraphs, blocks of text, and/or the like. Additionally, and/or alternatively, a social media post may include time-dependent series of data such as without limitation a video/clip (e.g., a full-length video or a short on YouTube, a reel on Facebook, and/or the like), an audio clip (e.g., a recording, a single, an album, or a podcast), a gif, and/or the like.

With continued reference to FIG. 1, system 100 is implemented using at least a computing device. A computing device may include any analog or digital control circuit, including an operational amplifier circuit, a combinational logic circuit, a sequential logic circuit, an application-specific integrated circuit (ASIC), a field programmable gate arrays (FPGA), and/or the like. A computing device may include any computing device as described in this disclosure, including without limitation a microcontroller, microprocessor, digital signal processor, and/or system on a chip as described in this disclosure. A computing device may include, be included in, and/or communicate with a mobile device such as a mobile telephone, smartphone, or tablet. A computing device may include a single computing device operating independently, or may include two or more computing devices operating in concert, in parallel, sequentially, or the like; two or more computing devices may be included together in a single computing device or in two or more computing devices. A computing device may interface or communicate with one or more additional devices as described below in further detail via a network interface device. A network interface device may be utilized for connecting a computing device to one or more of a variety of networks, and one or more devices. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used in order to implement one or more aspects of the invention described herein. Information (e.g., data, software etc.) may be communicated to and/or from a computer and/or a computing device. A computing device may include but is not limited to, for example, a first computing device or cluster of computing devices at a first location and a second computing device or cluster of computing devices at a second location. A computing device may include one or more computing devices dedicated to data storage, security, distribution of traffic for load balancing, and/or the like. A computing device may distribute one or more computing tasks as described below across a plurality of computing devices of computing device, which may operate in parallel, in series, redundantly, or in any other manner used for distribution of tasks or memory between computing devices. A computing device may be implemented, as a nonlimiting example, using a "shared nothing" architecture.

With continued reference to FIG. 1, a computing device may be designed and/or configured to perform any method, method step, or sequence of method steps in any embodiment described in this disclosure, in any order and with any degree of repetition. For instance, a computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device may perform any step or sequence of steps as described in this disclosure in parallel, such as without limitation simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing. More details regarding computing devices will be described below.

With continued reference to FIG. 1, a computing device may include one or more processors. A processor may include any suitable processing device(s) configured to run and/or execute a set of instructions or code. As nonlimiting examples, a processor may be and/or may include one or more data processors, image processors, graphics processing units (GPU), physics processing units, digital signal processors (DSP), analog signal processors, mixed-signal processors, machine learning processors, deep learning processors, finite state machines (FSM), compression processors (e.g., data compression to reduce data rate and/or memory requirements), encryption processors (e.g., for secure wireless data and/or power transfer), and/or the like. As further nonlimiting examples, a processor may include a general-purpose processor, a central processing unit (CPU), a microprocessor, a microcontroller, a Field Programmable Gate Array (FPGA), an Application Specific Integrated Circuit (ASIC), a processor board, a virtual processor, and/or the like. A processor may be configured to run and/or execute or implement software application processes and/or other modules, processes, and/or functions, as described in further detail below.

With continued reference to FIG. 1, a computing device includes a memory communicatively connected to one or more processors, wherein the memory contains instructions configuring the one or more processors to perform any processing steps described herein. The memory may include any suitable memory device(s) configured to store data, information, computer code or instructions (such as those described herein), and/or the like. In one or more embodiments, the memory may include one or more of a random access memory (RAM), static RAM (SRAM), dynamic RAM (DRAM), a memory buffer, an erasable programmable read-only memory (EPROM), an electrically erasable read-only memory (EEPROM), a read-only memory (ROM), flash memory, volatile memory, non-volatile memory, combinations thereof, and/or the like. In one or more embodiments, the memory may store instructions configuring the one or more processors to execute one or more modules, processes, and/or functions associated with system 100.

With continued reference to FIG. 1, for the purposes of this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and/or the like. A communicative connection may be achieved, for example and without limitation, through wired or wireless electronic, digital, or analog, communication, either directly or by way of one or more intervening devices or components. Further, a communicative connection may include electrically coupling or connecting at least an output of one device, component, or circuit to at least an input of another device, component, or circuit, for example, and without limitation, using a bus or other facility for intercommunication between elements of a computing device. Communicative connecting may also include indirect connections via, for example and without limitation, wireless connection, radio communication, low-power wide-area network, optical communication, magnetic, capacitive, or optical coupling, and the like. In some instances, the terminology "communicatively coupled" may be used in place of communicatively connected in this disclosure.

With continued reference to FIG. 1, a computing device may perform determinations, classification, and/or analysis steps, methods, processes, or the like as described in this disclosure one or more using machine-learning processes. For the purposes of this disclosure, a "machine-learning process" is a process that automatedly uses a body of data known as "training data" and/or a "training set" to generate an algorithm that will be performed by a processor module to produce outputs given data provided as inputs. This is in contrast to a non-machine-learning software program where the commands to be executed are determined in advance by a user and written in a programming language. A machine-learning process may utilize supervised, unsupervised, lazy-learning processes and/or neural networks. More details regarding computing devices and machine-learning processes will be provided below.

With continued reference to FIG. 1, system 100 is configured to implement a software as a service (SaaS) platform 102. For the purposes of this disclosure, a "software as a service platform" or "SaaS platform" is a cloud-based software delivery model in which applications are hosted on remote servers and accessed by users over the internet through web browsers or Application Programming Interfaces (APIs). Unlike traditional software installations, A SaaS platform may operate on a subscription basis and allow users to utilize the software without requiring installation, maintenance, or management of underlying infrastructure. A SaaS platform may provide scalability, accessibility, and multi-tenancy, enabling multiple users to access the same application while isolating their data securely. A SaaS platform may be constructed using robust backend systems for data processing, integration, and security, often leveraging advanced technologies such as without limitation microservices, containerization, and continuous deployment pipelines, among others, to ensure high availability and performance. A SaaS platform may be adopted for business applications such as without limitation customer relationship management (CRM), enterprise resource planning (ERP), and collaboration tools, among others, thereby offering an organization a cost-effective and efficient way to implement software solutions.

With continued reference to FIG. 1, system 100 may include or be communicatively connected to a data repository. For the purposes of this disclosure, a "data repository" is a centralized storage location where large volumes of data are collected, managed, and/or maintained for future retrieval, analysis, or distribution. A data repository can be a physical or virtual location used to store structured, semi-structured, or unstructured data. Data repositories are commonly used in scientific research, healthcare, business, and IT for securely storing data from various sources, making it easily accessible for analysis, reporting, or sharing. Nonlimiting examples of data repositories may include databases, data warehouses, and/or cloud storage solutions, among others. In one or more embodiments, a data repository may be implemented as a data storage 106, as shown in FIG. 1, additional details of which will be provided below in this disclosure.

With continued reference to FIG. 1, for the purposes of this disclosure, a "database" is an organized collection of data or a type of data store based on the use of a database management system (DBMS), the software that interacts with end users, applications, and the database itself to capture and analyze the data. A database may be implemented, without limitation, as a relational database, a key-value retrieval database such as a NoSQL database, or any other format or structure for use as database that a person of ordinary skill in the art would recognize as suitable upon review of the entirety of this disclosure. A database may alternatively, or additionally, be implemented using a distributed data storage protocol and/or data structure, such as a distributed hash table or the like. A database may include a plurality of data entries and/or records as described in this disclosure. Data entries in a database may be flagged with or linked to one or more additional elements of information, which may be reflected in data entry cells and/or in linked tables such as tables related by one or more indices in database or another relational database. A person of ordinary skill in the art, upon reviewing the entirety of this disclosure, will be aware of various ways in which data entries in database may store, retrieve, organize, and/or reflect data and/or records as used herein, as well as categories and/or populations of data consistently with this disclosure.

With continued reference to FIG. 1, in some cases, one or more processors may be configured to query a database by searching within the database for a match. As a nonlimiting example, when a database includes a SQL database, a processor may be configured to submit one or more SQL queries to interact with the database. To retrieve data, a "SELECT" statement may be used to specify one or more columns, rows, table names, and/or the like, and optional conditions may be applied using WHERE clauses. In some cases, a DBMS may use indexes, if available, to quickly locate relevant rows and columns, ensuring accurate and efficient data retrieval. Once SQL queries are executed using a DBMS interface or code, results may be returned for further steps.

With continued reference to FIG. 1, system 100 may include and/or be communicatively connected to a server, such as, without limitation, a remote server, a cloud server, a network server, and/or the like. In one or more embodiments, a computing device may be configured to transmit one or more processes to be executed by a server. In one or more embodiments, a server may contain additional and/or increased processor power wherein one or more processes as described below may be performed by the server. As a nonlimiting example, one or more processes associated with data processing may be performed by a network server, wherein data are transmitted to the network server, processed, and transmitted back to a computing device. In one or more embodiments, a server may be configured to perform one or more processes as described below to allow for increased computational power and/or decreased power usage by a computing device. In one or more embodiments, a computing device may transmit processes to a server to conserve power or energy.

With continued reference to FIG. 1, in one or more embodiments, system 100 and/or data storage 106 may include, be communicatively connected to, or otherwise implement a central server, as described above. As a nonlimiting example, a central server may be implemented via node.js and/or connected to a cloud network server or cloud network system, including, without limitation, Amazon Web Services, wherein the cloud network server or cloud network system is configured to manage and analyze data using at least an application programming interface (API), as described below. In one or more embodiments, a central server may be communicatively connected to a third-party cloud network system, such as the Things Network, wherein data are handled and preprocessed before reaching at least an application programming interface. As a nonlimiting example, data storage 106 may include or be implemented as one or more cloud-based servers that provide a robust, secure, privacy-preserving, and scalable infrastructure.

With continued reference to FIG. 1, for the purposes of this disclosure, an "application programming interface" or "API" is a way for two or more computer programs or components to communicate with each other. It is a type of software interface that offers one or more services to other pieces of software. An application programming interface may be written in programming languages such as C++, Java, Pascal, JavaScript, CFML, PHP, Ruby, Python, or the like. A document or standard that describes how to build or use such a connection or interface is called an application programming interface specification. A computer system that meets this standard is said to implement or expose an application programming interface. The term application programming interface may refer either to the specification or to the implementation. Whereas a system's user interface, as described below, dictates how its end users interact with the system in question, its application programming interface dictates how to write code that takes advantage of that system's capabilities. In contrast to a user interface, which connects a computer to an end user, as described in further detail below, an application programming interface connects computers or pieces of software to each other. It is not intended to be used directly by an end user other than a programmer who is incorporating it into the software. An application programming interface is often made up of different parts which act as tools or services that are available to a programmer. A program or programmer that uses one of these parts is said to call that portion of the application programming interface. Calls that make up the application programming interface are also known as subroutines, methods, requests, or endpoints. An application programming interface specification defines these calls and explains how to use or implement them. One purpose of application programming interfaces is to hide the internal details of how a system works, exposing only those parts that a programmer will find useful, and keeping them consistent even if the internal details change later. An application programming interface may be custom-built for a particular pair of systems, or it may be a shared standard allowing interoperability among many systems. A person of ordinary skill in the art will recognize how to implement one or more application programming interfaces for the invention described herein upon reviewing the entirety of this disclosure.

With continued reference to FIG. 1, system 100 may include or be communicatively connected to a display device, wherein the display device is configured to display SaaS platform 102. For the purposes of this disclosure, a "display device" is a device configured to show visual information. In some cases, a display device may include a liquid crystal display (LCD), a cathode ray tube (CRT), a plasma display, a light emitting diode (LED) display, and any combinations thereof. A display device may include, but is not limited to, a smartphone, tablet, laptop, monitor, tablet, and the like. A display device may include a separate device that includes a transparent screen configured to display computer-generated images and/or information.

With continued reference to FIG. 1, in one or more embodiments, a display device may be configured to visually present data through a user interface or a graphical user interface (GUI) to at least a user, wherein the user may interact with the data through the user interface or GUI, as described below. In one or more embodiments, a user may view a user interface or GUI through a display device. In one or more embodiments, a display device may be located on a remote device, as described below.

With continued reference to FIG. 1, a display device may include or be communicatively connected to a remote device. For the purposes of this disclosure, a "remote device" is a computer device separate and distinct from system 100. For example, and without limitation, a remote device may include a smartphone, a tablet, a laptop, a desktop computer, or the like. In one or more embodiments, a remote device may be communicatively connected to system 100 such as without limitation through network communication, through Bluetooth communication, and/or the like. In one or more embodiments, one or more processors May receive data from a user and/or initiate one or more subsequent steps through a remote device. In one or more embodiments, one or more inputs from one or more users may be submitted through a user interface, such as without limitation a GUI, displayed using a remote device, as described in further detail below.

With continued reference to FIG. 1, system 100 and/or SaaS platform 102 includes a user interface (UI) 104. User interface 104 is configured to receive an input from a user. For the purposes of this disclosure, a "user interface" is a means by which a user and a computer system interact, for example, using input devices and software. A user interface may include a graphical user interface (GUI), command line interface (CLI), menu-driven user interface, touch user interface, voice user interface (VUI), form-based user interface, any combination thereof, or the like. In one or more embodiments, a user may interact with a user interface using computing device distinct from and communicatively connected to system 100 and/or one or more processors, such as a smartphone, tablet, or the like operated by the user. A user interface may include one or more graphical locator and/or cursor facilities allowing user to interact with graphical models and/or combinations thereof, for instance using a touchscreen, touchpad, mouse, keyboard, and/or other manual data entry device.

With continued reference to FIG. 1, in one or more embodiments, user interface 104 may include a GUI accompanied by a search box/field for receiving user-provided input. The input may include a keyword, text, an image, and/or a video, among others. As a nonlimiting example, a text prompt such as "how thoughts shape your reality" may be provided by the user. A content creator using SaaS platform 102 may enter a text prompt using an input device (e.g., a mouse, a keyboard, microphone, touchscreen, and/or the like). In some cases, SaaS platform 102 may not require the user to type any query and may instead suggest prompts to the user that are similar to or based on the user's previously created content (e.g., social media channel content history and/or the like).

With continued reference to FIG. 1, for the purposes of this disclosure, a "graphical user interface" or "GUI" is a type of user interface that allows end users to interact with electronic devices through visual representations. In one or more embodiments, a GUI may include icons, menus, other visual indicators or representations (graphics), audio indicators such as primary notation, display information, and related user controls. A menu may contain a list of choices and may allow users to select one from them. A menu bar may be displayed horizontally across the screen as a pull-down menu. A menu may include a context menu that appears only when a user performs a specific action. Files, programs, web pages, and the like may be represented using a small picture within a GUI. In one or more embodiments, a GUI may include a graphical visualization of a user profile and/or the like. In one or more embodiments, one or more processors may be configured to modify and/or update a GUI as a function of at least an input or the like by populating a user interface data structure and visually presenting data through modification of the GUI.

With continued reference to FIG. 1, in one or more embodiments, a GUI may contain one or more interactive elements. For the purposes of this disclosure, an "interactive element" is an element within a GUI that allows for communication with one or more processors by one or more users. For example, and without limitation, interactive elements may include a plurality of tabs wherein selection of a particular tab, such as for example, by using a fingertip, may indicate to a system to perform a particular function and display the result through a GUI. In one or more embodiments, interactive elements may include tabs within a GUI, wherein the selection of a particular tab may result in a particular function. In one or more embodiments, interactive elements may include words, phrases, illustrations, and the like, to indicate a particular process that one or more users would like a system to perform. A person of ordinary skill in the art, upon reviewing the entirety of this disclosure, will be aware of various ways in which user interfaces, GUIs, and/or elements thereof may be implemented and/or used as described in this disclosure.

With continued reference to FIG. 1, in one or more embodiments, a display device and/or remote device may be configured to display at least an event handler graphic corresponding to at least an event handler. For the purposes of this disclosure, an "event handler graphic" is a graphical element with which user interacts using display device and/or remote device to enter data, such as without limitation user query or the like as described elsewhere in this disclosure. Exemplary event handler graphics may include, without limitation, a button, a link, a checkbox, a text entry box and/or window, a drop-down list, a slider, or any other event handler graphic deemed suitable by a person of ordinary skill in the art upon reviewing the entirety of this disclosure. For the purposes of this disclosure, an "event handler" is a module, data structure, function, and/or routine that performs an action on display device and/or remote device in response to one or more user inputs. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. An event handler may generate prompts for further information, may compare data to validation rules such as requirements that the data in question be entered within certain numerical ranges, and/or may modify data and/or generate warnings to user in response to such requirements. An event handler may convert data into expected and/or desired formats, such as date formats, currency entry formats, name formats, or the like. An event handler may transmit data from a remote device to system 100, one or more processors, and/or one or more computing devices.

With continued reference to FIG. 1, in one or more embodiments, an event handler may include a cross-session state variable. For the purposes of this disclosure, a "cross-session state variable" is a variable recording data entered on remote device during a previous session. Such data may include, for instance, previously entered text, previous selections of one or more elements as described above, or the like. For instance, a cross-session state variable data may represent a search that user entered in a past session. A cross-session state variable may be saved using any suitable combination of client-side data storage on a remote device and server-side data storage on a computing device; for instance, data may be saved wholly or in part as a "cookie" which may include data or an identification of remote device to prompt provision of cross-session state variable by the computing device, which may store the data on the computing device. Alternatively, or additionally, a computing device may use login credentials, device identifier, and/or device fingerprint data to retrieve cross-session state variable, which the computing device may transmit to remote device. A cross-session state variable may include at least a prior session datum. A prior session datum may include any element of data that may be stored in cross-session state variable. An event handler graphic may be further configured to display at least a prior session datum, for example and without limitation, by auto-populating user query data from previous sessions.

With continued reference to FIG. 1, in one or more embodiments, one or more processors and/or computing device may configure display device and/or remote device to generate a graphical view. For the purposes of this disclosure, a "graphical view" is a data structure that results in display of one or more graphical elements on a screen. A graphical view may include at least a display element. For the purposes of this disclosure, a "display element" is an image that a program and/or data structure cause to be displayed. Display elements may include, without limitation, windows, pop-up boxes, web browser pages, display layers, and/or any other display element deemed relevant by a person of ordinary skill in the art upon reviewing the entirety of this disclosure. A graphical view may include at least a selectable event graphic corresponding to one or more selectable event handlers. For the purposes of this disclosure, a "selectable event graphic" is a graphical element that, upon selection, will trigger an action to be performed. Selection may be performed using a cursor or other locator as manipulated using a locator device such as a mouse, touchscreen, track pad, joystick, or the like. As a nonlimiting example, a selectable event graphic may include a redirection link. For the purposes of this disclosure, a "redirection link" is a hyperlink, button, image, portion of an image, and/or other graphic containing or referring to a uniform resource locator (URL) and/or other resource locator to another graphical view including without limitation buttons, and/or to a process that performs navigation to such URL and/or other resource locator upon selection of a selectable event graphic. Redirection may be performed using any event handler, including without limitation event handlers detecting the click of a mouse or other locator, access of redirection link using a touchscreen, the selection of any key, mouseover events, or the like.

With continued reference to FIG. 1, once a user submits their query/prompt, or selects one of the suggested prompts, system 100 and/or SaaS platform 102 may accordingly be configured to perform an estimation of content uptake metrics, thereby providing the user with targeted insight into what type of viral content this query may generate. Receiving the user query includes parsing the user query into a plurality of keywords using at least a textual processing module. For the purposes of this disclosure, a "keyword" is a data element or group of data elements of textual nature that summarizes or captures one or more aspects of a user query. For the purposes of this disclosure, a "textual processing module" is a module configured to process data that are based on text. For the purposes of this disclosure, a "module" is a discrete and identifiable unit of software or hardware that encapsulates a specific functionality or a set of related functions, designed to operate independently or as part of a larger system. A software module typically consists of a collection of routines, subroutines, and data structures that perform particular tasks and can be developed, tested, and maintained independently of other modules within the system. Hardware modules, on the other hand, refer to physical components or assemblies that can be integrated into a larger device or system to provide specific functionalities. Modules facilitate modular design, enabling ease of development, debugging, updating, and scalability by allowing individual units to be modified or replaced without affecting the entire system. This modular architecture supports the principles of reusability, maintainability, and interoperability in complex computing environments. A module may implement one or more machine learning algorithms and/or include one or more machine learning models, as described in detail below in this disclosure.

With continued reference to FIG. 1, in one or more embodiments, one or more keywords may be extracted from a prompt, such as without limitation a text prompt, using a keyword extraction process 108. For the purposes of this disclosure, a "keyword extraction process" is a process that separates one or more data elements of high significance, importance, relevance, and/or the like from one or more data elements of lesser significance, importance, relevance, and/or the like, thereby condensing key information within a dataset for downstream processing. In some cases, keyword extraction process 108 may be configured to ignore or otherwise remove frequently occurring words, such as without limitation "a", "an", and "the", among others. As a nonlimiting example, a set of keywords extracted from a text prompt may be organized under the format of: [thoughts, shape, reality]. In the case when user interface 104 receives an image or video, the keywords maybe be extracted from a description or other text field thereof, such as without limitation by implementing an optical character recognition (OCR) algorithm, or the like. Embodiments of the invention described herein may also support generation of text from images, videos, etc., or summarization of textual documents, such as without limitation by implementing a large language model (LLM) or another natural language processing technique similar thereto. Additional details will be provided below in this disclosure.

With continued reference to FIG. 1, the one or more processors are further configured to receive a set of streaming contents. The set of streaming contents includes unstructured data including a plurality of video frames and an audio stream. The one or more processors are further configured to structure the unstructured data of the set of streaming contents by extracting a first plurality of tokens from the plurality of video frames as a function of an object recognition module, extracting a second plurality of tokens from the audio stream as a function of a speech-to-text module, and combining the first plurality of tokens and the second plurality of tokens to form a unified set of tokens. Additional details will be provided below in this disclosure. For the purposes of this disclosure, an "object recognition module" is a module configured to identify an object within a set of graphical data based on the shape of the object. For the purposes of this disclosure, a "speech-to-text" module is a module configured to transcribe audio data into corresponding textual data.

With continued reference to FIG. 1, in one or more embodiments, the user query may include a plurality of query video frames and a query audio stream. Accordingly, parsing the user query may include structuring the user query by extracting at least a first keyword from the plurality of query video frames, as a function of the object recognition module, extracting at least a second keyword from the query audio stream as a function of the speech-to-text module, and combining the at least a first keyword and the at least a second keyword to form the plurality of keywords, consistent with details described elsewhere in this disclosure.

With continued reference to FIG. 1, in one or more embodiments, one or more AI models or machine-learning models may be used to extract keywords from images, recognize objects in frames from videos, extract embedded text from videos, and/or generate sentences from images/videos using Open AI or other generative models similar thereto. Other embodiments include website links as inputs (i.e., http, https, or www), where the content contained within the linked website is extracted and leveraged. In additional exemplary embodiments, the invention described herein may be configured to support presentation files from Microsoft PowerPoint (.ppt or .pptx), documents from Microsoft Word (.docx or .doc), portable document format (.pdf) files, or any other text-containing document uploaded by a user, by extracting the contents therein and determining associated keywords therefrom. The terms "AI model", "AI method", and "machine-learning model" may be used interchangeably throughout this disclosure.

With continued reference to FIG. 1, in one or more embodiments, one or more machine-learning models may be used to perform certain function or functions of system 100, such without limitation keyword extraction process 108 described above, among others. One or more processors may use a machine-learning module to implement one or more algorithms as described herein or generate one or more machine-learning models, without limitation an optical character recognition machine-learning/AI model, as described in further detail below. However, a machine-learning module is exemplary and may not be necessary to generate one or more machine-learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows the machine-learning model to determine its own outputs for inputs. Training data may contain correlations that a machine-learning process may use to model relationships between two or more categories of data elements. Exemplary inputs and outputs may be retrieved from a database (e.g., data storage 106), synthesized using one or more generative models, or be provided by a user. In one or more embodiments, a machine-learning module may obtain training data by querying a communicatively connected database that includes past inputs and outputs. Training data may include inputs from various types of databases, resources, and/or user inputs and outputs correlated to each of those inputs, so that a machine-learning model may determine an output. Training data may be supplied as one or more inputs from one or more users or entities. In one or more embodiments, one or more historical user queries may be incorporated into training data upon validation. In one or more embodiments, at least a portion of training data may be added, deleted, replaced, or otherwise updated as a function of one or more inputs from one or more entities. Correlations between inputs and outputs within training data may indicate causative and/or predictive links therebetween, which may be modeled as relationships, such as without limitation mathematical relationships, by machine-learning models, as described in further detail below. In one or more embodiments, training data may be formatted and/or organized by categories of data elements by, for example, associating data elements with one or more descriptors corresponding to categories of data elements. As a nonlimiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In one or more embodiments, training data may include previous outputs such that one or more machine-learning models may iteratively produce outputs. Implementation of a machine-learning model may be consistent with any type of machine-learning model or algorithm described in this disclosure. A person of ordinary skill in the art, upon reviewing the entirety of this disclosure, will be able to recognize suitable means to implement a machine-learning model in system 100.

With continued reference to FIG. 1, using the keywords identified from keyword extraction process 108, as described above, system 100 is further configured to perform a streaming content retrieval process 110 to retrieve a plurality of streaming content as a function of the plurality of keywords. Retrieving the plurality of streaming content includes selecting at least a streaming content from the set of streaming contents, wherein at least a token of the unified set of tokens matches at least a keyword of the plurality of keywords. Additional details will be provided below in this disclosure. For the purposes of this disclosure, a "streaming content retrieval process" is a process that identifies one or more relevant streaming contents, as described above, by matching a large set of streaming contents to one or more keywords, attributes, and/or the like. Specifically, in some cases, N streaming contents (e.g., videos, audios, clips, and/or the like) may be retrieved from data storage 106 with at least one matching keyword, where N is an integer. The at least one matching keyword may be located in the description and/or one or more other computed text fields of a streaming content. In some cases, streaming content retrieval process 110 may be implemented in a binary manner (i.e., in vs. out) by applying one or more inclusion/exclusion criteria. In some cases, streaming content retrieval process 110 may be implemented by computing one or more overlap scores to indicate a degree of match between a streaming content and one or more keywords. As nonlimiting examples, if 6 out of 20 extracted keywords have matching counterparts in a streaming content, an overlap score of 30% may be assigned to that streaming content. Accordingly, system 100 may be configured accordingly to select one or more relevant streaming contents by comparing the one or more overlap scores against one or more scoring thresholds. As a nonlimiting example, a first overlap score at or above a scoring threshold (e.g., 80% vs. 60%) may signify that its corresponding streaming content is a satisfactory match to one or more extracted keywords and should therefore be deemed relevant by system 100. In contrast, a second overlap score below the same scoring threshold (e.g., 40% vs. 60%) may indicate that its corresponding streaming content is not a satisfactory match to the one or more extracted keywords and should be deemed irrelevant/eliminated accordingly. As nonlimiting examples, such a scoring threshold may be preset by system 100, modified as a function of one or more user inputs (e.g., via one or more advanced search criteria specified by a user), or dynamically adjusted using one or more machine-learning or AI models, as described in further detail below.

With continued reference to FIG. 1, following streaming content retrieval process 110 described above, system 100 is further configured to perform a sorting process 112. For the purposes of this disclosure, a "sorting process" is a process of organizing a plurality of data elements into two or more matching categories as a function of one or more features, traits, or attributes of each element therein. Sorting process 112 may include or be implemented using any sorting, grouping, or classification algorithms recognized by a person of ordinary skill in the art, upon reviewing the entirety of this disclosure. Optionally, in some cases (as indicated by the dashed arrow), a user may contribute additional data from their own social media channel(s) directly to data storage 106. The user may also combine their own social media channel data with other consenting users' aggregated data in order to increase the real-time adaptability of system 100 and/or produce more generalizable inferences on an estimation of virality.

With continued reference to FIG. 1, one or more processors are further configured to implement a sorting process 112 to sort retrieved streaming contents as a function of a virality metric. For the purposes of this disclosure, a "virality metric" is a numerical indication pertaining to how a streaming content is viewed, received, consumed, perceived, analyzed, or otherwise engaged upon by a plurality of entities interacting therewith. In some cases, a virality metric may be used as a measure for the popularity of a streaming content. As a nonlimiting example, when retrieved streaming contents include a plurality of videos transmitted via a video-streaming platform (e.g., YOUTUBE, TIKTOK, and/or the like), a virality metric may include without limitation a number of likes (e.g., thumbs up), a number of dislikes (e.g., thumbs down), a number of shares, a number of comments, a number of views, a retention time, a retention rate, a number of views per follower, a number of comments per follower, a number of shares per follower, a number of likes per follower, a number of new (increasing) or reduced (decreasing) followers of the video's author/creator/owner/account, or any number/type of related metrics, among others. The N videos may combine all tokens from the user query and be sorted according to one or more of these virality metrics into a sorted set of N videos. Such sorted set of N videos may accordingly be referred to as a "viral set". For the purposes of this disclosure, a "viral set" is a set of streaming contents sorted or organized as a function of one or more virality metrics. A viral set may include without limitation the top K videos. K may be computed in multiple ways, such as without limitation a selection of top 1% streaming contents as a function of a virality metric, a selection of streaming contents based on mean+2×standard deviation of a virality metric, etc. The population of the viral set may include all N videos.

With continued reference to FIG. 1, in one or more embodiments, one or more viral subsets may also be computed similarly for each token of the user query, in an independent manner, and the threshold of a virality metric may accordingly be applied separately for each of these viral subsets to recognize the top P videos associated with each token in user query. P may be computed in multiple ways, such as without limitation based on a selection of top 1% streaming contents as a function of a virality metric, a selection of streaming contents based on mean+standard deviation of a virality metric, etc. A viral superset may then be computed by the union of these viral subsets, thus enabling each token in a user query to be adequately represented in the combined set used for feature enrichment computations. Additional details will be provided below in this disclosure.

With continued reference to FIG. 1, system 100 is further configured to generate at least one insight token from the viral set by implementing one or more viral set token calculations 114. For the purposes of this disclosure, an "insight token" is a token that provides one or more insights or interpretations pertaining to a data element. For the purposes of this disclosure, a "viral set token calculation" is a process of determining one or more tokens for a viral set, as described above in this disclosure. Specifically, any text associated with each of the N videos may be tokenized as part of several viral set token calculations 114 performed on the sorted streaming contents described above. For the purposes of this disclosure, a "token" is a discrete unit of data or information extracted from a larger dataset, typically representing a meaningful data element for further analysis. Tokens are often used in natural language processing (NLP) and text analysis and may refer to words, phrases, or other meaningful segments of text that are separated during a process called tokenization. A token may represent one or more identifiable elements as structured or semi-structured data, such as without limitation keys, values, unique identifiers, and/or the like. In some cases, a token may serve as a placeholder or abstraction for data security purposes, where sensitive information is replaced with a non-sensitive equivalent during processing. Tokens are often integral to data analytics workflows, serving as the building blocks for advanced analyses such as without limitation trend detection, sentiment analysis, and/or pattern recognition, among others. As a nonlimiting example, for a given single video of the N videos, the video may include a social media video from a platform such as TIKTOK OR YOUTUBE. Metadata about pertaining to the video and the creator(s) thereof may be obtained, and computed annotations may be represented as text. Features of interest may accordingly be encoded as text tokens or text tags. For the purposes of this disclosure, a "text tag" is a token described using textual data. For the purposes of this disclosure, "metadata" are structured information that describes and provides context about the primary data being transmitted. Metadata may include details such as without limitation the timestamp, geolocation, user ID, post type (e.g., image, video, text, and/or the like), content tags, engagement metrics (e.g., likes, shares, comments, and/or the like), and/or platform-specific identifiers, among others. Metadata may be useful, sometimes even essential, for organizing, indexing, and analyzing streaming data in real time. Metadata may further facilitate one or more functionalities such as without limitation content recommendation algorithms, trend analysis, targeted advertising, and/or monitoring for policy compliance, among others, thereby enabling a social media platform to process and deliver relevant and personalized user experiences in an efficient manner.

With continued reference to FIG. 1, system 100 may be configured to perform statistical enrichment for one or more tokens in a viral set. For the purposes of this disclosure, a "statistical enrichment" is a process of enhancing raw data streams by applying statistical methods to extract meaningful patterns, correlations, insights, and/or the like. A statistical enrichment may involve aggregating, normalizing, and analyzing a continuous influx of data to identify significant trends, anomalies, relationships, etc., within the context of the dataset. As nonlimiting examples, a statistical enrichment may include calculating one or more engagement metrics such as without limitation averages, proportions, and/or deviations for a social media post over time and/or applying one or more predictive models to forecast future trends based on historical data. A statistical enrichment may also involve correlating metadata (e.g., hashtags, timestamps, locations, and/or the like), as described above, with user interactions (e.g., likes, shares, and/or the like) to derive insights regarding audience behavior, topic virality, or sentiment, among others. A statistical enrichment may be used to transform raw, unstructured streaming data into actionable intelligence, enabling more precise decision-making for content strategies, targeted advertising, and/or user engagement optimization, among others. Specifically, as a nonlimiting example, to perform statistical enrichment for one or more tokens in a viral set, the following may be calculated for each token of the one or more tokens:

expected probability=frequency of N hits/N
observed probability=(frequency in viral set)/(N viral videos)
enrichment=observed probability/expected probability And p-value for each token of the one or more tokens may be determined accordingly using a hypergeometric test or other similar statistical measures of significance. For the purposes of this disclosure, a "probability value" or "p-value" is a measure used in statistics that describes the probability of obtaining test results at least as extreme as a result that is actually observed, under the assumption that the null hypothesis is correct. A very small p-value indicates that an extreme observed outcome would be very unlikely under the null hypothesis. For the purposes of this disclosure, a "null hypothesis" is a hypothesis used in statistics indicating that no relationship exists between two sets of data or variables being analyzed. For the purposes of this disclosure, a "hypergeometric test" is a type of statistical test used to determine whether the observed frequency of a specific category or subset in a sample differs significantly from what would be expected under a given null hypothesis. A hypergeometric test is commonly applied when sampling is done without replacement, meaning the population size decreases as elements are selected. A hypergeometric test may calculate the probability of observing a given number of successes in a sample, based on the total population size, the number of successes in the population, and the sample size. This test is particularly useful in scenarios where the data involves categorical outcomes, and the sample size is a significant fraction of the population. A common application of a hypergeometric test may include enrichment analysis, consistent with details described above, such as without limitation identifying one or more overrepresented categories (e.g., hashtags in social media datasets) relative to a background set. A hypergeometric test may help assess whether the occurrence of specific events, categories, or items in the sample is statistically significant compared to the overall population distribution.

With continued reference to FIG. 1, in one or more embodiments, an enrichment set calculation may facilitate the creation of a search and navigation experience wherein the user input is tokenized, and every token may be used to obtain a statistically meaningful set of records referring to each of those tokens. Some records may contain more than one token from the query, but most of the records may have only one of the tokens. Subsequently, enrichment of features in streaming contents with a high virality metric (e.g., number of likes, comments, shares, views, shares/follower, and/or the like, consistent with details described above) versus low virality metric, a high virality metric versus all streaming contents in general, and so forth, may be determined and mapped back to the viral streaming contents that constitute such enrichment. This way, if a user would like to know which viral streaming content(s) contributed to each tokenized input word/phrase, the systems, methods, and other embodiments described herein may enable such function in user interface 104. Additional details will be provided below in this disclosure. As a nonlimiting example, a visual search may be performed using a large language model. A metadata enrichment analysis on 100,000 videos applied to Words & Phonemes in video metadata associated with enrichment & attenuation of views is summarized below in Table 1. Additional details will be provided below in this disclosure.

TABLE 1

Meta data Enrichment Analysis on 100,000 Videos Applied to Words & Phonemes in Video MetaData Associated with Enrichment & Attenuation of Views.

| Word/ Phoneme | Count Total | Count Sampling | Expected | Observed | Enrichment | P-value (enrichment) | P-value (attenuation) | CREATOR total videos | CREATOR matching videos |
|---|---|---|---|---|---|---|---|---|---|
| learn | 15870 | 11 | 0.0951 | 0.0107 | 0.1129 | 1 | <1E−20 | 990 | 4 |
| earn | 17887 | 15 | 0.1072 | 0.0146 | 0.1366 | 1 | <1E−20 | 990 | 4 |
| rn | 26512 | 60 | 0.1589 | 0.0586 | 0.3687 | 1 | <1E−20 | 990 | 24 |
| ear | 27699 | 73 | 0.166 | 0.0713 | 0.4294 | 1 | <1E−20 | 990 | 29 |
| partner | 5989 | 4 | 0.0359 | 0.0039 | 0.1088 | 1 | 4.90E−12 | 990 | 1 |
| SOU | 51 | 2 | 0.0003 | 0.002 | 6.3891 | 0.00386 | 0.996 | 990 | 18 |

With continued reference to FIG. 1, viral set token calculation 114 may be implemented by utilizing one or more inputs of feature categories, such as without limitation text description, speech transcript, objects in video, video labels, text in video, shot changes, face characteristics, audio characteristics, author metadata, music characterization, social platform-specific video metadata, cover image, posting time, audience characteristics, and/or the like. Each of these categories will be elaborated in further detail below in this disclosure. As a nonlimiting example, in one specific test, an analysis of such feature categories was performed on approximately 90 million publicly available videos from various social media platforms including without limitation YOUTUBE, TIKTOK, INSTAGRAM, SNAPCHAT, TWITTER, LINKEDIN, and/or FACEBOOK, among others. This number may continue to grow as more users enroll in SaaS platform 102.

With continued reference to FIG. 1, an analysis for text description may be implemented. The analysis may be configured to extract tokenized text including without limitation hashtags, emojis, and/or uncommon words/phrases, among others. Such an analysis may implement certain steps to classify words and detect sentence patterns therefrom, such as without limitation in a format of [statements, questions, commands and exclamations]. This analysis may be extended to other languages besides English, including without limitation any number of automated language translation models that enable combined feature enrichment analysis across multiple languages encoded in a single language such as English. In one or more embodiments, such analysis may include a sentiment analysis applied to words in speech. In one or more embodiments, such analysis may include or implement summarization-based algorithms for generating additional insight tokens.

With continued reference to FIG. 1, an exemplary input of feature category text description may include without limitation "Imagination is my reality. #makeup #mimles #facepaint #trippy #illusion #illusionmakeup #illusionart #fyp #fy #foryou #foryoupage #fineart #surreal #art #artist #tiktokart #painting #bizarre". Exemplary output text tokens for the feature category text description may accordingly include without limitation "imagination, reality, my reality, #makeup, #mimles, #facepaint, #trippy, #illusion, #illusionmakeup, #illusionart, #fyp, #fy, #foryou, #foryoupage, #fineart, #surreal #art, #artist, #tiktokart, #painting, #bizarre". In some cases, upper/lower cases may be preserved. In some cases, symbols such as hashtags may be retained or removed in order to combine tokens appropriately.

With continued reference to FIG. 1, additional insight token may also be acquired for each feature category. For text description, the additional insight token may include a statement, more-than-10-hashtags, no-grammatical-error, and/or uses-emoji, among others.

With continued reference to FIG. 1, other viral associations may be determined for each feature category. As a nonlimiting example, text description category may include other viral associations including without limitation a viral quote: {"text": "my Imagination creates my reality", "author": "Walt Disney", confidence: 0.9}; a viral TED talk: {"title": "Your Brain hallucinates your conscious reality", "views": 2.6M, "speaker": "Anil Seth"}; and a viral book: {"text:: "Imagine if . . . : Creating a Future for Us all", "author": "Dr. Robinson", confidence: 0.4}; and/or a viral association with external databases such as one or more books, TED talks, and/or quotes, among others, derived from a classic fuzzy search with tokens from text and speech in the output. As a nonlimiting example, such viral associations may be used to promote inspiration among content creators.

With continued reference to FIG. 1, the analysis for speech transcript may implement a speech-to-text algorithm (human speech) using, for example and without limitation, Google Video Intelligence pre-trained models.

With continued reference to FIG. 1, an analysis for objects in video and/or video labels may be implemented. The analysis may implement Google Video AI service or the like for object detection. Accordingly, the quality of results may be adjustable based on an AI confidence threshold. As a nonlimiting example, 0.5 may be used as a threshold. Objects present in over 10 seconds across the length of video may be filtered. A nonlimiting example of output text tokens for the feature category objects in video may include person, clothing, glasses, lipstick, packaged goods, jewelry, animal, hat, flower, scarf, top, etc. A nonlimiting example of output text tokens for the feature category video labels may include person, clothing, glasses, lipstick, packaged goods, jewelry, animal, hat, flower, scarf, top, etc.

With continued reference to FIG. 1, in one or more embodiments, an analysis for text in video may be implemented. The analysis may implement Google Video AI service or the like for text extraction. As a nonlimiting example, the analysis may be configured to remove noise from data, such as without limitation a TIKTOK watermark, based on a curated set of frequently occurring text annotations in an overall dataset.

With continued reference to FIG. 1, in one or more embodiments, an analysis for shot changes may be implemented. The analysis may implement Google Video AI service or the like for shot detection. As a nonlimiting example, the analysis may be configured to compute a length of time between shots to detect the progression and/or the mean length of a shot. As a nonlimiting example, creator-specified heuristics may be quantified based on such an analysis. As a nonlimiting example, quick scene changes may be incorporated frequently by some creators, as such changes may capture more variety in the first five seconds of a streaming content (e.g., a video). In some cases, the first few seconds of a video may be deemed critical in capturing attention.

With continued reference to FIG. 1, in one or more embodiments, an analysis for face characteristics may be implemented. The analysis may implement Google Video AI service or the like for face detection. As a nonlimiting example, the analysis may be configured to calculate the mean total time (e.g., over the length of a video) for each face attribute and/or determine one or more attributes of detection such as without limitation 0% [negate presence], >75% [state presence], and/or the like. As another nonlimiting example, extracting the first plurality of tokens from the plurality of video frames may include identifying a face within a first video frame using the object recognition module, calculating a facial presence of the face in each video frame of the plurality of video frames, determining a facial presence percentage as a function of a count of video frames in which the facial presence is positive and a total count of video frames, and storing the facial presence percentage as at least a token of the first plurality of tokens.

With continued reference to FIG. 1, an analysis for audio characteristics may be implemented. The analysis may include without limitation a time domain analysis. As a nonlimiting example, the analysis may be configured to analyze Audio Waveform (MP3) data using FFMPEG library to identify certain patterns, such as without limitation a sudden drop in dB loudness, silence, and/or the like. As another nonlimiting example, the analysis may include a frequency/Fourier domain analysis. Additional details will be provided below in this disclosure.

With continued reference to FIG. 1, an analysis for author metadata may include without limitation metadata from a social media account, such as title, channel description, total number of followers, total number of likes, and/or the like. Such metadata may be extracted from social media platforms including without limitation YOUTUBE, TIKTOK, and/or the like. The analysis may be configured to use tokens from channel description to deduplicate video description (e.g., classify #mimies as author instead of hashtag). As a nonlimiting example, a following on TIKTOK may be compared or correlated to a following on YouTube as the dataset is expanded for the same creator across multiple social media platforms and/or channels. This step may also be used to monitor changes in followers/subscribers before and after posting a specific streaming content, i.e., an increase or decrease in followers/subscribers.

With continued reference to FIG. 1, in one or more embodiments, an analysis for music characterization may be implemented. As a nonlimiting example, if music is detected in a streaming content such as a video, the analysis may be configured to classify the music into one or more categories such as without limitation blues, classical, country, disco, hip-hop, jazz, metal, pop, reggae, rock, and/or the like. The analysis may be performed using an open-source algorithm or the like, such as without limitation a convolutional neural network (CNN) trained on GTZAN data. Additional details will be provided below in this disclosure.

With continued reference to FIG. 1, in one or more embodiments, an analysis for social platform specific video metadata may be implemented. The analysis may be configured to process data with respect to a streaming content (e.g., a video) extracted as is. The analysis may be configured to perform classification as a function of one or more bin metrics (e.g., high or low engagement/virality, and/or the like). The analysis may be configured to process data pertaining to a level of engagement with respect to a streaming content, such as without limitation the number of likes/new followers in response to a video. As a nonlimiting example, one or more social media platforms such as TIKTOK may have special features such as "duet" to repost another creator's content and overlay your own video. As a nonlimiting example, one or more social media platforms may contain videos tied to "challenges" which refer to a wave of similarly themed videos with one or more shared music tracks or hashtags.

With continued reference to FIG. 1, in one or more embodiments, an analysis for cover image may be implemented. As a nonlimiting example, the analysis may be configured to map a cover image to a 3-part video chunk including an introduction, a middle, and an ending and accordingly perform object detection on the cover image to add appropriate tags in one or more output text tokens. As another nonlimiting example, the analysis may be configured to determine a cosine distance between a vectorized form of entities in image vs. text description.

With continued reference to FIG. 1, in one or more embodiments, an analysis for posting time may be implemented. The analysis may be configured to identify a date on which a video was posted and to accordingly bin an associated calendar date to represent this date in various embeddings. This step may be extended according to the time of posting and/or the region of posting, among others.

With continued reference to FIG. 1, in one or more embodiments, an analysis for audience characteristics may be implemented. As a nonlimiting example, the analysis may be configured to tokenize all text from comments in a video, if any. These tokens may represent the perspective of the audience and may often be used as a heuristic to decipher which specific aspect of a streaming content is resonating with its audience. The analysis may be constrained to followers of the logged in user so as to personalize insights about their audience. An exemplary input of audience characteristics may include a combination of text and emojis. An exemplary output text tokens may include without limitation omg, amazing, soo, underrated, deserves, more, recognition, god, glad, see, amazing, beautiful, work, watched, many, time, cant, get, enough, watch, again, notice, last, one, cant, even, pur, eyeshadow, correct, and/or the like.

With continued reference to FIG. 1, following viral set token calculations 114, system 100 is further configured to perform a sapient search 116. For the purposes of this disclosure, a "sapient search" is an intelligent and context-aware search methodology that leverages advanced AI techniques to retrieve, categorize, and/or interpret social media data. Such advanced AI techniques may include without limitation natural language processing (NLP), machine learning (ML), semantic analysis, and/or the like. Unlike basic keyword-based searches, sapient searches analyze the meaning, intent, and sentiment behind content to deliver more nuanced and relevant results. As a nonlimiting example, when analyzing social media content, a sapient search may recognize sarcasm, understand colloquial language, and/or distinguish between positive and negative sentiment in a post, among others. A sapient search may also relate posts with similar themes even if different terminology is used, thereby improving the accuracy of content classification and trend analysis. A sapient search may be useful in applications such as without limitation brand monitoring, crisis management, user sentiment analysis, and/or the like. A sapient search may be used to identify one or more emerging topics, as it enables a deeper understanding of data by mimicking human-level comprehension.

With continued reference to FIG. 1, up to this point, the features being processed to categorize streaming contents into viral subsets for analysis may be derived by algorithms that leverage certain AI methods, consistent with details described elsewhere in this disclosure. As a nonlimiting example, the features may be processed using, at least in part, Google's Video AI service. The insights presented to the user may involve additional algorithms. These algorithms may be capable of quantifying heuristics and may often be used by content creators to make sense of the results and understand what actionable steps may be taken to create a well-performing video of their own. Even if a video does not necessarily "go viral," the insights gleaned therefrom may still be beneficial towards increasing a video's performance (e.g., number of views, likes, among other popularity metrics or the like).

With continued reference to FIG. 1, sapient search 116 may produce one or more of the following raw results. First, N viral videos may be arranged by a decreasing order of virality metric. Second, a viral token set, which includes all the tokens that satisfy the conditions of enrichment >5 and p-value <0.05, may be identified. Third, videos from the N viral videos that have one or more tokens from the viral token set may be arranged by a decreasing order of virality metric. Additional details will be provided below in this disclosure.

With continued reference to FIG. 1, from sapient search 116, system 100 is further configured to present one or more results of a user query. Specifically, by presenting one or more results one or more insights 118 may be made available to the user via user interface 104. For the purposes of this disclosure, an "insight" is an organized form data representing a meaningful interpretation and/or an actionable finding of an existing dataset. Additional details will be provided below in this disclosure.

With continued reference to FIG. 1, in one or more embodiments, keyword extraction process 108, streaming content retrieval process 110, sorting process 112, viral set token calculations 114, sapient search 116, and generated insights 118 may be embodied at the same location as data storage 106. In such embodiments, the storage and processing of data may occur at the same location, such as without limitation a cloud-based server, consistent with details described above in this disclosure. Alternatively, in one or more embodiments, one or more of the elements of FIG. 1 may be embodied at one or more separate (i.e., remote) locations. As a nonlimiting example, SaaS platform 102 may be run on a first server, and data may be streamed to a user with access to a second server and sent back to data storage 106 located on a third server. Other implementations recognized by those of ordinary skill in the art, upon reviewing the entirety of this disclosure, are also contemplated herein.

With continued reference to FIG. 1, in one or more embodiments, systems and methods described herein may be embodied as a "sapient search system", a "sapient search method", and/or the like. As a nonlimiting example, such a sapient search system may include a computer or mobile device hosting user interface 104, on which SaaS platform 102 interfaces with data storage 106. Data storage 106 may store a database or the like of streaming contents (e.g., videos) and data associated therewith, consistent with details described above. A nonlimiting example of a sapient search system may may be configured to perform a series of steps illustrated by the functional block diagram of FIG. 1—specifically, the step of the user entering a query in user interface 104, the system performing keyword extraction, streaming content retrieval, sorting by virality metric, performing viral set token calculations, sapient search, and provision of insights back to the user interface 104 while optionally sending data directly from the SaaS platform 102 to data storage 106. Additional details pertaining to such a sapient search system will be provided below when discussing FIG. 7.

With continued reference to FIG. 1, in one or more embodiments, one or more processors may implement one or more aspects of "generative artificial intelligence (AI)". For the purposes of this disclosure, "generative artificial intelligence" or "generative AI" is a type of artificial intelligence that uses machine-learning algorithms to create, establish, or otherwise generate data. Such generated data may include without limitation one or more insight cards, as described in further detail below in this disclosure. In one or more embodiments, machine-learning module described below in this disclosure may generate one or more generative machine-learning models that are trained on one or more prior iterations. One or more generative machine-learning models may be configured to generate new examples that are similar to the training data of the one or more generative machine-learning models but are not exact replicas; for instance, and without limitation, data quality or attributes of the generated examples may bear a resemblance to the training data provided to one or more generative machine-learning models, wherein the resemblance may pertain to underlying patterns, features, or structures found within the provided training data.

With continued reference to FIG. 1, in some cases, generative machine-learning models may include one or more generative models. For the purposes of this disclosure, a "generative model" is a statistical model of joint probability distribution $P(X, Y)$ between a given observable variable, x, and a target variable, y. x may represent features or data that can be directly measured or observed, whereas y may represent outcomes or labels that one or more generative models aim to predict or generate. Exemplary generative models include generative adversarial models (GANs), diffusion models, and the like. In one or more embodiments, generative models may rely on Bayes theorem to find joint probability; for instance, and without limitation, naive Bayes classifiers may be employed by a computing device or one or more processors to categorize input data such as, without limitation, a plurality of streaming contents.

With continued reference to FIG. 1, in a nonlimiting example, one or more generative machine-learning models may include one or more naive Bayes classifiers generated by one or more processors using a naive Bayes classification algorithm. A naive Bayes classification algorithm may generate classifiers by assigning class labels to problem instances, represented as vectors of element values. Class labels are drawn from a finite set. A naive Bayes classification algorithm may include generating a family of algorithms that assume that the value of a particular element is independent of the value of any other element, given a class variable. A naive Bayes classification algorithm may be based on Bayes Theorem expressed as $P(A/B)=P(B/A)\times P(A)+P(B)$, where $P(A/B)$ is the probability of hypothesis A given data B, also known as posterior probability; $P(B/A)$ is the probability of data B given that the hypothesis A was true; $P(A)$ is the probability of hypothesis A being true regardless of data, also known as prior probability of A; and $P(B)$ is the probability of data regardless of the hypothesis. A naive Bayes algorithm may be generated by first transforming training data into a frequency table. One or more processors and/or a computing device may then calculate a likelihood table by calculating probabilities of different data entries and classification labels. One or more processors and/or a computing device may utilize a naive Bayes equation to calculate a posterior probability for each class. A class containing the highest posterior probability is the outcome of prediction.

With continued reference to FIG. 1, although naive Bayes classifier may be primarily known as a probabilistic classification algorithm, it may also be considered a generative model described herein due to its capability of modeling the joint probability distribution $P(X, Y)$ over observable variables, X, and target variable, Y. In one or more embodiments, a naive Bayes classifier may be configured to make an assumption that the features, X, are conditionally independent given class label, Y, allowing generative model to estimate a joint distribution as $P(X,Y)=P(Y)\Pi_i P(X_i|Y)$, wherein $P(Y)$ is the prior probability of the class, and $P(X_i|Y)$ is the conditional probability of each feature given the class. One or more generative machine-learning models containing naive Bayes classifiers may be trained on labeled training data, estimating conditional probabilities $P(X_i|Y)$ and prior probabilities $P(Y)$ for each class; for instance, and without limitation, using techniques such as Maximum Likelihood Estimation (MLE). One or more generative machine-learning models containing naive Bayes classifiers may select a class label, y, according to prior distribution, $P(Y)$, and for each feature, $X_i$, sample at least a value according to conditional distribution, $P(X_i|y)$. Sampled feature values may then be combined to form one or more new data instances with selected class label, y. In a nonlimiting example, one or more generative machine-learning models may include one or more naive Bayes classifiers to generate new examples as a function of exemplary input data or classes of input data, wherein the models may be pretrained and/or retrained using a plurality of features within streaming contents, as described herein as input correlated to plurality of labelled classes (e.g., tokens) as outputs.

With continued reference to FIG. 1, in one or more embodiments, one or more generative machine-learning models may include generative adversarial network (GAN). For the purposes of this disclosure, a "generative adversarial network" is a type of artificial neural network with at least two sub models (i.e., neural networks), a generator and a discriminator, that compete against each other in a process that ultimately results in the generator learning to generate new data samples, wherein the "generator" is a component of the GAN that learns to create hypothetical data by incorporating feedback from the "discriminator" configured to distinguish real data from the hypothetical data. In one or more embodiments, a generator may learn to make discriminator classify its output as real. In one or more embodiments, a discriminator may include a supervised machine-learning model while generator may include an unsupervised machine-learning model, as described in further detail below.

With continued reference to FIG. 1, in one or more embodiments, discriminator may include one or more discriminative models, i.e., models of conditional probability $P(Y|X=x)$ of target variable, Y, given observed variable, X. In one or more embodiments, discriminative models may learn boundaries between classes or labels in given training data. In a nonlimiting example, discriminator may include one or more classifiers as described in further detail below to distinguish between different categories, e.g., real vs. fake, or states, e.g., TRUE vs. FALSE within the context of generated data. In one or more embodiments, one or more processors may implement one or more classification algorithms such as, without limitation, Support Vector Machines (SVM), Logistic Regression, Decision Trees, and/or the like to define decision boundaries.

With continued reference to FIG. 1, additionally, or alternatively, one or more generative models may also include a variational autoencoder (VAE). For the purposes of this disclosure, a "variational autoencoder" is an autoencoder or an artificial neural network architecture whose encoding distribution is regularized during the model training process in order to ensure that its latent space includes desired properties allowing new data sample generation. In one or more embodiments, VAE may include a prior and noise distribution respectively, trained using expectation-maximization meta-algorithms such as, without limitation, probabilistic PCA, sparse coding, among others. In a nonlimiting example, VAE may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from latent space to input space.

With continued reference to FIG. 1, in a nonlimiting example, VAE may be used by one or more processors and/or a computing device to model complex relationships between various parts of a streaming content. In some cases, VAE may encode input data into a latent space, capturing one or more features or nuances therefrom. Such encoding process may include learning one or more probabilistic mappings from observed design models to a lower-dimensional latent representation. Latent representation may then be decoded back into the original data space, therefore reconstructing the design model. In some cases, such decoding process may allow VAE to generate new examples or variations that are consistent with the learned distributions.

With continued reference to FIG. 1, in one or more embodiments, Additionally, or alternatively, one or more generative machine-learning models may utilize one or more predefined templates representing, for example, and without limitation, acceptable or widely applied formats of insight cards, as described in further detail below in this disclosure.

With continued reference to FIG. 1, in one or more embodiments, one or more processors and/or computing device may be configured to continuously monitor user inputs such as queries or feedback submitted by users. In an embodiment, one or more processors may configure a discriminator to provide ongoing feedback and further corrections as needed to subsequent input data. An iterative feedback loop may be created as one or more processors continuously receive real-time data, identify errors as a function of real-time data, deliver corrections based on the identified errors, and monitor subsequent model outputs and/or user feedback on the delivered corrections. In one or more embodiments, one or more processors may be configured to retrain one or more generative machine-learning models based on user feedback or update training data of one or more generative machine-learning models by integrating the user feedback into original training data. In such embodiment, an iterative feedback loop may allow image generator to adapt to user's needs and performance requirements, enabling one or more generative machine-learning models described herein to learn and update based on user responses and generated feedback.

With continued reference to FIG. 1, other exemplary embodiments of generative machine-learning models may include, without limitation, long short-term memory networks (LSTMs), (generative pre-trained) transformer (GPT) models, mixture density networks (MDN), and/or the like. A person of ordinary skill in the art, upon reviewing the entirety of this disclosure, will be aware of various generative machine-learning models that may be used to perform certain function or functions of system 100, such as without limitation one or more insight cards, as described herein.

With continued reference to FIG. 1, in one or more embodiments, a machine-learning module may be further configured to generate a multimodal neural network that combines various neural network architectures described herein. In a nonlimiting example, multimodal neural network may combine LSTM for time-series analysis with GPT models for natural language processing. Such fusion may be applied by one or more processors and/or a computing device to generate synthetic data of more complex nature. In one or more embodiments, multimodal neural network may also include a hierarchical multimodal neural network, wherein the hierarchical multimodal neural network may involve a plurality of layers of integration. For instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multimodal neural network may include, without limitation, ensemble-based multimodal neural network, cross-modal fusion, adaptive multimodal network, among others. A person of ordinary skill in the art, upon reviewing the entirety of this disclosure, will be aware of various multimodal neural networks and combination thereof that may be implemented by system 100 in accordance with this disclosure.

With continued reference to FIG. 1, in one or more embodiments, one or more processors may perform one or more functions of system 100 by using optical character recognition (OCR) to read digital files and extract information therein. In one or more embodiments, OCR may include automatic conversion of images (e.g., typed, handwritten, or printed text) into machine-encoded text. In one or more embodiments, recognition of at least a keyword from an image component may include one or more processes, including without limitation OCR, optical word recognition, intelligent character recognition, intelligent word recognition, and the like. In one or more embodiments, OCR may recognize written text one glyph or character at a time, for example, for languages that use a space as a word divider. In one or more embodiments, intelligent character recognition (ICR) may recognize written text one glyph or character at a time, for instance by employing machine-learning processes. In one or more embodiments, intelligent word recognition (IWR) may recognize written text, one word at a time, for instance by employing machine-learning processes.

With continued reference to FIG. 1, in one or more embodiments, OCR may employ preprocessing of image components. Preprocessing process may include without limitation de-skew, de-speckle, binarization, line removal, layout analysis or "zoning", line and word detection, script recognition, character isolation or "segmentation", and normalization. In one or more embodiments, a de-skew process may include applying a transform (e.g., homography or affine transform) to an image component to align text. In one or more embodiments, a de-speckle process may include removing positive and negative spots and/or smoothing edges. In one or more embodiments, a binarization process may include converting an image from color or greyscale to black-and-white (i.e., a binary image). Binarization may be performed as a simple way of separating text (or any other desired image component) from the background of image component. In one or more embodiments, binarization may be required for example if an employed OCR algorithm only works on binary images. In one or more embodiments, a line removal process may include removal of non-glyph or non-character imagery (e.g., boxes and lines). In one or more embodiments, a layout analysis or "zoning" process may identify columns, paragraphs, captions, and the like as distinct blocks. In one or more embodiments, a line and word detection process may establish a baseline for word and character shapes and separate words, if necessary. In one or more embodiments, a script recognition process may, for example in multilingual documents, identify a script, allowing an appropriate OCR algorithm to be selected. In one or more embodiments, a character isolation or "segmentation" process may separate signal characters, for example, character-based OCR algorithms. In one or more embodiments, a normalization process may normalize the aspect ratio and/or scale of image component.

With continued reference to FIG. 1, in one or more embodiments, an OCR process may include an OCR algorithm. Exemplary OCR algorithms include matrix-matching processes and/or feature extraction processes. Matrix matching may involve comparing an image to a stored glyph on a pixel-by-pixel basis. In one or more embodiments, matrix matching may also be known as "pattern matching", "pattern recognition", and/or "image correlation". Matrix matching may rely on an input glyph being correctly isolated from the rest of image component. Matrix matching may also rely on a stored glyph being in a similar font and at the same scale as input glyph.

With continued reference to FIG. 1, in one or more embodiments, an OCR process may include a feature extraction process. In one or more embodiments, feature extraction may decompose a glyph into features. Exemplary nonlimiting features may include corners, edges, lines, closed loops, line direction, line intersections, and the like. In one or more embodiments, feature extraction may reduce the dimensionality of representation and may make the recognition process computationally more efficient. In one or more embodiments, extracted features can be compared with an abstract vector-like representation of a character, which might be reduced to one or more glyph prototypes. General techniques of feature detection in computer vision are applicable to this type of OCR. In one or more embodiments, a machine-learning process such as nearest neighbor classifiers (e.g., k-nearest neighbors algorithm) may be used to compare image features with stored glyph features and choose a nearest match. OCR may employ any machine-learning process described in this disclosure. Exemplary nonlimiting OCR software may include Cuneiform and Tesseract. Cuneiform is a multi-language, open-source OCR system originally developed by Cognitive Technologies of Moscow, Russia. Tesseract is a free OCR software originally developed by Hewlett-Packard of Palo Alto, California, United States.

With continued reference to FIG. 1, in one or more embodiments, OCR may employ a two-pass approach to character recognition. Second pass may include adaptive recognition and use letter shapes recognized with high confidence on a first pass to better recognize remaining letters on a second pass. In one or more embodiments, a two-pass approach may be advantageous for unusual fonts or low-quality image components where visual verbal content may be distorted. Another exemplary OCR software tool includes OCRopus. The development of OCRopus is led by the German Research Center for Artificial Intelligence in Kaiserslautern, Germany. In one or more embodiments, OCR software may employ neural networks, for example, deep neural networks, as described in this disclosure below.

With continued reference to FIG. 1, in one or more embodiments, OCR may include post-processing. For example, OCR accuracy may be increased, in some cases, if output is constrained by a lexicon. A lexicon may include a list or set of words that are allowed to occur in a document. In one or more embodiments, a lexicon may include, for instance, all the words in the English language, or a more technical lexicon for a specific field. In some cases, an output stream may be a plain text stream or file of characters. In one or more embodiments, an OCR may preserve an original layout of visual verbal content. In one or more embodiments, near-neighbor analysis can make use of co-occurrence frequencies to correct errors by noting that certain words are often seen together. For example, "Washington, D.C." is generally far more common in English than "Washington DOC". In one or more embodiments, an OCR process may make use of a priori knowledge of grammar for a language being recognized. For example, OCR process may apply grammatical rules to help determine if a word is likely to be a verb or a noun. Distance conceptualization may be employed for recognition and classification. For example, a Levenshtein distance algorithm may be used in OCR post-processing to further optimize results. A person of ordinary skill in the art will recognize how to apply the aforementioned technologies to extract information from a digital file upon reviewing the entirety of this disclosure.

With continued reference to FIG. 1, in one or more embodiments, a computer vision module configured to perform one or more computer vision tasks such as, without limitation, object recognition, feature detection, edge/corner detection thresholding, or machine-learning process may be used to recognize specific features or attributes. For the purposes of this disclosure, a "computer vision module" is a computational component designed to perform one or more computer vision, image processing, and/or modeling tasks. In one or more embodiments, computer vision module may receive one or more digital files from a data repository (e.g., data storage 106) and generate one or more labels therefrom.

With continued reference to FIG. 1, in one or more embodiments, a computer vision module may include an image processing module, wherein images may be preprocessed using the image processing module. For the purposes of this disclosure, an "image processing module" is a component designed to process digital images such as images described herein. For example, and without limitation, an image processing module may be configured to compile a plurality of images of a multi-layer scan to create an integrated image. In one or more embodiments, image processing module may include a plurality of software algorithms that can analyze, manipulate, or otherwise enhance an image, such as, without limitation, a plurality of image processing techniques as described below. In one or more embodiments, a computer vision module may also include hardware components such as, without limitation, one or more graphics processing units (GPUs) that can accelerate the processing of a large number of images. In one or more embodiments, a computer vision module may be implemented with one or more image processing libraries such as, without limitation, OpenCV, PIL/Pillow, ImageMagick, and the like. In a nonlimiting example, in order to generate one or more labels and/or recognize one or more reference attributes, one or more image processing tasks, such as noise reduction, contrast enhancement, intensity normalization, image segmentation, and/or the like, may be performed by a computer vision module on a plurality of images to isolate certain features or components from the rest. In one or more embodiments, one or more machine-learning models may be used to perform segmentations, for example, and without limitation, a U-net (i.e., a convolution neural network containing a contracting path as an encoder and an expansive path as a decoder, wherein the encoder and the decoder forms a U-shaped structure). A person of ordinary skill in the art, upon reviewing the entirety of this disclosure, will be aware of various image processing, computer vision, and modeling tasks that may be performed by one or more processors.

With continued reference to FIG. 1, in one or more embodiments, one or more functions of system 100 may involve a use of image classifiers to classify images within any data described in this disclosure. For the purposes of this disclosure, an "image classifier" is a machine-learning model that sort inputs of image information into categories or bins of data, outputting the categories or bins of data and/or labels associated therewith. An image classifier may include a mathematical model, a neural net, or a program generated by a machine-learning algorithm known as a "classification algorithm", as described in further detail below. An image classifier may be configured to output at least a datum that labels or otherwise identifies a set of images that are clustered together, found to be close under a distance metric as described below, or the like. A computing device may generate an image classifier using a classification algorithm. For the purposes of this disclosure, a "classification algorithm" is a process whereby a computing device derives a classifier from training data. Classification may be performed using, for example and without limitation, linear classifiers such as without limitation logistic regression and/or naive Bayes classifiers, nearest neighbor classifiers such as without limitation k-nearest neighbors classifiers, support vector machines, least squares support vector machines, Fisher's linear discriminant, quadratic classifiers, decision trees, boosted trees, random forest classifiers, learning vector quantization, and/or neural network-based classifiers, among others. In one or more embodiments, one or more processors may use an image classifier to identify a key image in any data described in this disclosure. For the purposes of this disclosure, a "key image" is an element of visual data used to identify and/or match elements to each other. In one or more embodiments, key image may include part of an image that unambiguously identify the type of the image. Image classifier may be trained with binarized visual data that have already been classified to determine key images in any other data described in this disclosure. For the purposes of this disclosure, "binarized visual data" are visual data that are described in a binary format. For example, binarized visual data of a photo may include ones and zeroes, wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. An image classifier may receive input data described in this disclosure and output a key image with the data. In one or more embodiments, image classifier may be used to compare visual data in one dataset with visual data in another dataset, as described below.

With continued reference to FIG. 1, one or more processors may be configured to perform feature extraction on one or more images, as described below. For the purposes of this disclosure, "feature extraction" is a process of transforming an initial dataset into informative measures and values. As a nonlimiting example, feature extraction may include a process of determining one or more geometric features of a structure. In one or more embodiments, feature extraction may be used to determine one or more spatial relationships within a drawing that may be used to uniquely identify one or more features. In one or more embodiments, one or more processors may be configured to extract one or more regions of interest, wherein the regions of interest may be used to extract one or more features using one or more feature extraction techniques.

With continued reference to FIG. 1, one or more processors may be configured to perform one or more of its functions, such as extraction of one or more tokens, as described below, using a feature learning algorithm. For the purposes of this disclosure, a "feature learning algorithm" is a machine-learning algorithm that identifies associations between elements of data in a dataset where particular outputs and/or inputs are not specified. Dataset may include without limitation a training dataset. For instance, and without limitation, a feature learning algorithm may detect co-occurrences of elements of data, as defined above, with each other. A computing device may perform feature learning algorithm by dividing elements or sets of data into various sub-combinations of such data to create new elements of data and evaluate which elements of data tend to co-occur with which other elements. In one or more embodiments, a feature learning algorithm may perform clustering of data.

With continued reference to FIG. 1, a feature learning and/or clustering algorithm may be implemented, as a non-limiting example, using a k-means clustering algorithm. For the purposes of this disclosure, a "k-means clustering algorithm" is a type of cluster analysis that partitions n observations or unclassified cluster data entries into k clusters in which each observation or unclassified cluster data entry belongs to the cluster with the nearest mean. For the purposes of this disclosure, a "cluster analysis" is a process that includes grouping a set of observations or data entries in way that observations or data entries in the same group or cluster are more similar to each other than to those in other groups or clusters. A cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as without limitation biclustering, group models, graph-based models such as a clique, signed graph models, neural models, and the like. Cluster analysis may include hard clustering, whereby each observation or unclassified cluster data entry belongs to a cluster or not. Cluster analysis may include soft clustering or fuzzy clustering, whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa, as described below. A cluster analysis may include strict partitioning clustering, whereby each observation or unclassified cluster data entry belongs to exactly one cluster. A cluster analysis may include strict partitioning clustering with outliers, whereby observations or unclassified cluster data entries may belong to no cluster and may be considered outliers. A cluster analysis may include overlapping clustering whereby observations or unclassified cluster data entries may belong to more than one cluster. A cluster analysis may include hierarchical clustering, whereby observations or unclassified cluster data entries that belong to a child cluster also belong to a parent cluster.

With continued reference to FIG. 1, a computing device may generate a k-means clustering algorithm by receiving unclassified data and outputting a definite number of classified data entry clusters, wherein the data entry clusters each contain cluster data entries. A k-means algorithm may select a specific number of groups or clusters to output, identified by a variable "k". Generating a k-means clustering algorithm includes assigning inputs containing unclassified data to a "k-group" or "k-cluster" based on feature similarity. Centroids of k-groups or k-clusters may be utilized to generate a classified data entry cluster. A k-means clustering algorithm may select and/or be provided "k" variable by calculating k-means clustering algorithm for a range of k values and comparing results. A k-means clustering algorithm may compare results across different values of k as the mean distance between cluster data entries and cluster centroid. A k-means clustering algorithm may calculate mean distance to a centroid as a function of k value, and the location of where the rate of decrease starts to sharply shift, which may be utilized to select a k value. Centroids of k-groups or k-cluster include a collection of feature values which are utilized to classify data entry clusters containing cluster data entries. A k-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. A k-means clustering algorithm may assign unclassified data to one or more k-centroids based on the squared Euclidean distance by first performing a data assigned step of unclassified data. A k-means clustering algorithm may assign unclassified data to its nearest centroid based on the collection of centroids ci of centroids in set C. Unclassified data may be assigned to a cluster based on $\text{argmin}_{c_i \, \ni \, c} \text{dist}(c_i, x)^2$, where argmin includes argument of the minimum, ci includes a collection of centroids in a set C, and dist includes standard Euclidean distance. K-means clustering module may then recompute centroids by taking a mean of all cluster data entries assigned to a centroid's cluster. This may be calculated based on $c_i = 1/|S_i| \Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

With continued reference to FIG. 1, k-means clustering algorithm may be configured to calculate a degree of similarity index value. For the purposes of this disclosure, a "degree of similarity index value" is a distance measured between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between the element to be compared and/or clustered and a particular cluster.

With continued reference to FIG. 1, k-means clustering algorithm selects a classified data entry cluster as a function of the degree of similarity index value. In one or more embodiments, k-means clustering algorithm may select a classified data entry cluster with the smallest degree of similarity index value indicating a high degree of similarity between an element and the data entry cluster. Alternatively, or additionally, a k-means clustering algorithm may select a plurality of clusters having a low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; a person of ordinary skills in the art, upon reviewing the entirety of this disclosure, will be aware of various additional or alternative feature learning approaches, such as particle swarm optimization (PSO) and generative adversarial network (GAN) that may be used consistently with this disclosure.

With continued reference to FIG. 1, in one or more embodiments, one or more processors may use an image recognition algorithm to determine patterns within an image. In one or more embodiments, an image recognition algorithm may include an edge-detection algorithm, which may detect one or more shapes defined by edges. For the purposes of this disclosure, an "edge detection algorithm" is or includes a mathematical method that identifies points in a digital image at which the image brightness changes sharply and/or has discontinuities. In one or more embodiments, such points may be organized into straight and/or curved line segments, which may be referred to as "edges". Edge detection may be performed using any suitable edge detection algorithm, including without limitation Canny edge detection, Sobel operator edge detection, Prewitt operator edge detection, Laplacian operator edge detection, and/or differential edge detection. Edge detection may include phase congruency-based edge detection, which finds all locations of an image where all sinusoids in the frequency domain, for instance when generated using a Fourier decomposition, may have matching phases which may indicate a location of an edge.

With continued reference to FIG. 1, in one or more embodiments, in order to perform one or more generative functions of system 100, such as without limitation generation of text from images and/or videos, one or more machine-learning models, as described above, may be implemented using a large language model (LLM) or another natural language processing technique similar thereto. As a nonlimiting example, the speech-to-text module, as described above, may include or otherwise implement an LLM. An LLM is trained using a large set of training examples. In some cases, training an LLM may include pre-training the LLM on a general set of training examples and fine-tuning the LLM on a special set of training examples, wherein both the general set of training examples and the special set of training examples are subsets of the large set of training examples. In some cases, an LLM may be configured to process data beyond video or streamed media, such as without limitation static text, image, audio, website site maps, sales or marketing campaign data, and/or one or more combinations thereof. In some cases, one or more LLMs or similar natural language processing (NLP) algorithms may be configured to extract nuanced features to replace and/or or augment NLP-based tokens. This step may be implemented using a plurality of domain-specific machine-learning models trained on multimodal training data. Accordingly, each domain-specific machine-learning model of the plurality of domain-specific machine-learning models may be configured to fine-tune the at least one token of the second plurality of tokens, consistent with details described above. In some cases, insights 118 from multiple data sources (e.g., data storage 106) may be harmonized by using one or more LLMs to ensure compatibility. In some cases, insights 118 pertaining to keyword(s) or context may be used to fine-tune one or more LLMs to offer self-serve, on-demand insights 118 via a chat interface or agents.

Insights 118 gleaned therefrom may then be deployed into downstream applications. Additional details will be provided below in this disclosure.

With continued reference to FIG. 1, for the purposes of this disclosure, a "large language model" is a deep learning data structure that can recognize, summarize, translate, predict and/or generate text and other content based on knowledge gained from massive datasets. LLMs may be trained on large sets of data. Training sets may be drawn from diverse sets of data such as, as nonlimiting examples, journal articles, social media posts, user communications, advertising documents, newspaper articles, and/or the like. In some embodiments, training sets of an LLM may include information from one or more public or private databases. As a nonlimiting example, training sets may include databases associated with an entity. In some embodiments, training sets may include portions of documents associated with the electronic records correlated to examples of outputs. In one or more embodiments, an LLM may include one or more architectures based on capability requirements of the LLM. Exemplary architectures may include, without limitation, Generative Pretrained Transformer (GPT), Bidirectional Encoder Representations from Transformers (BERT), Text-To-Text Transfer Transformer (T5), and the like. Architecture choice may depend on a needed capability, such as without limitation generative, contextual, or other specific capabilities, among others.

With continued reference to FIG. 1, in one or more embodiments, an LLM may be generally trained. For the purposes of this disclosure, a "generally trained" LLM is an LLM that is trained on a general training set comprising a variety of subject matters, datasets, and fields. In one or more embodiments, an LLM may be initially generally trained. Additionally, or alternatively, an LLM may be specifically trained. For the purposes of this disclosure, a "specifically trained" LLM is an LLM that is trained on a specific training set, wherein the specific training set includes data including specific correlations for the LLM to learn. As a nonlimiting example, an LLM may be generally trained on a general training set, then specifically trained on a specific training set. In one or more embodiments, generally training an LLM may be performed using an unsupervised machine-learning process. In one or more embodiments, specific training of an LLM may be performed using a supervised machine-learning process. As a nonlimiting example, a specific training set may include information from a database. As a nonlimiting example, a specific training set may include text related to the users such as user specific data for electronic records correlated to examples of outputs. In one or more embodiments, training one or more machine-learning models may include setting the parameters of the one or more models (weights and biases) either randomly or using a pretrained model. Generally training one or more machine-learning models on a large corpus of text data can provide a starting point for fine-tuning on a specific task. A model such as an LLM may learn by adjusting its parameters during the training process to minimize a defined loss function, which measures the difference between predicted outputs and ground truth. Once model has been generally trained, the model may then be specifically trained to fine-tune the pretrained model on task-specific data to adapt it to the target task. Fine-tuning may involve training model with task-specific training data, adjusting the model's weights to optimize performance for the particular task. In some cases, this may include optimizing a model's performance by fine-tuning hyperparameters such as learning rate, batch size, and regularization. Hyperparameter tuning may help in achieving the best performance and convergence during training. In one or more embodiments, fine-tuning a pretrained model such as an LLM may include fine-tuning the pretrained model using Low-Rank Adaptation (LoRA). For the purposes of this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in one or more embodiments, an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction-based algorithm configured to receive an article and apply a probability distribution to the words already typed in a sentence to work out the most likely word to come next in augmented articles. For example, if some words that have already been typed are "social", then it may be highly likely that the word "media" will come next. An LLM may output such predictions by ranking words by likelihood or a prompt parameter. For the example given above, an LLM may score "media" as the most likely, "network" as the next most likely, "cause" or "causes" next, and the like. An LLM may include an encoder component and a decoder component.

With continued reference to FIG. 1, an LLM may include a transformer architecture. In some embodiments, the encoder component of an LLM may include a transformer architecture. For the purposes of this disclosure, a "transformer architecture" is a neural network architecture that uses self-attention and positional encoding. A transformer architecture may be designed to process sequential input data, such as natural language, with applications towards tasks such as translation and text summarization. A transformer architecture may process the entire input all at once. For the purposes of this disclosure, "positional encoding" is a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as without limitation sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. For the purposes of this disclosure, an "attention mechanism" is a part of a neural network architecture that enables a system to dynamically quantify relevant features of the input data. In the case of natural language processing, input data may include a sequence of textual elements. It may be applied directly to the raw input or to its higher-level representation.

With continued reference to FIG. 1, an attention mechanism may represent an improvement over a limitation of an encoder-decoder model. An encoder-decoder model encodes an input sequence to one fixed-length vector from which an output is decoded at each time step. This issue may be seen as a problem when decoding long sequences because it may make it difficult for the neural network to cope with long sentences, such as those that are longer than the sentences in the training corpus. Applying an attention mechanism, an LLM may predict next word by searching for a set of positions in a source sentence where the most relevant information is concentrated. An LLM may then predict the next word based on context vectors associated with these source positions and all the previously generated target words, such as textual data of a dictionary correlated to a prompt in a training dataset. For the purposes of this disclosure, "context vectors" are fixed-length vector representations useful for document retrieval and word sense disambiguation.

With continued reference to FIG. 1, an attention mechanism may include, without limitation, generalized attention, self-attention, multi-head attention, additive attention, global attention, and the like. In generalized attention, when a sequence of words or an image is fed to an LLM, it may verify each element of input sequence and compare it against the output sequence. Each iteration may involve the mechanism's encoder capturing input sequence and comparing it with each element of the decoder's sequence. From the comparison scores, an attention mechanism may then select the words or parts of image that it needs to pay attention to. In self-attention, an LLM may pick up particular parts at different positions in input sequence and over time compute an initial composition of output sequence. In multi-head attention, an LLM may include a transformer model of an attention mechanism. Attention mechanisms, as described above, may provide context for any position in input sequence. For example, if the input data is a natural-language sentence, a transformer may not have to process one word at a time. In multi-head attention, computations by an LLM may be repeated over several iterations, and each computation may form parallel layers known as attention heads. Each separate head may independently pass input sequence and corresponding output sequence element through separate head. A final attention score may be produced by combining attention scores at each head so that every nuance of input sequence is taken into consideration. In additive attention (Bahdanau attention mechanism), an LLM may make use of attention alignment scores based on a number of factors. Alignment scores may be calculated at different points in neural network, and/or at different stages represented by discrete neural networks. Source or input sequence words are correlated with target or output sequence words but not to an exact degree. This correlation may take into account all hidden states and the final alignment score is the summation of a matrix of alignment scores. In global attention (Luong mechanism), in situations where neural machine translations are required, an LLM may either attend to all source words or predict the target sentence, thereby attending to a smaller subset of words.

With continued reference to FIG. 1, a multi-headed attention in an encoder may apply a specific attention mechanism called self-attention. Self-attention allows models such as an LLM or components thereof to associate each word in an input to other words. As a nonlimiting example, an LLM may learn to associate the word "you", with "how" and "are". It's also possible that an LLM learns that words structured in this pattern are typically a question and to respond appropriately. In one or more embodiments, to achieve self-attention, an input may be fed into three distinct and fully connected neural network layers to create query, key, and value vectors. Query, key, and value vectors may be fed through a linear layer; then, the query and key vectors may be multiplied using dot product matrix multiplication in order to produce a score matrix. A score matrix may determine the amount of focus for a word that should be put on other words (thus, each word may be a score that corresponds to other words in the time-step). The values in a score matrix may be scaled down. As a nonlimiting example, a score matrix may be divided by the square root of the dimension of the query and key vectors. In one or more embodiments, a softmax of the scaled scores in a score matrix may be taken. The output of this softmax function may be called attention weights. Attention weights may be multiplied by a value vector to obtain an output vector, wherein the output vector may then be fed through a final linear layer.

With continued reference to FIG. 1, in order to use self-attention in a multi-headed attention computation, query, key, and value may be split into N vectors before applying self-attention. Each self-attention process may be called a "head". Each head may produce an output vector and each output vector from each head may be concatenated into a single vector. This single vector may then be fed through a final linear layer discussed above. In theory, each head can learn something different from input, therefore giving the encoder model more representation power.

With continued reference to FIG. 1, an encoder of a transformer may include a residual connection. Residual connection may include adding the output from multi-headed attention to the positional input embedding. In one or more embodiments, an output from a residual connection may go through a layer normalization. In one or more embodiments, a normalized residual output may be projected through a pointwise feed-forward network for further processing. A pointwise feed-forward network may include a couple of linear layers with an ReLU activation in between. An output may then be added to an input of a pointwise feed-forward network and further normalized.

With continued reference to FIG. 1, a transformer architecture may include a decoder. A decoder may include a multi-headed attention layer, a pointwise feed-forward layer, one or more residual connections, and layer normalization (particularly after each sub-layer), as discussed in more detail above. In one or more embodiments, a decoder may include two multi-headed attention layers. In one or more embodiments, a decoder may be autoregressive. For the purposes of this disclosure, "autoregressive" means that the decoder takes in a list of previous outputs as inputs along with encoder outputs containing attention information from the input.

With continued reference to FIG. 1, in one or more embodiments, an input to a decoder may go through an embedding layer and positional encoding layer to obtain positional embeddings. A decoder may include a first multi-headed attention layer, wherein the first multi-headed attention layer may receive positional embeddings.

With continued reference to FIG. 1, a first multi-headed attention layer may be configured to not condition to future tokens. As a nonlimiting example, when computing attention scores on the word "am", decoder should not have access to the word "fine" in "I am fine", because that word is a future word that was generated after. The word "am" should only have access to itself and the words before it. In one or more embodiments, this may be accomplished by implementing a look-ahead mask. A look ahead mask is a matrix of the same dimensions as a scaled attention score matrix that is filled with "Os" and negative infinities. For example, the top right triangle portion of look-ahead mask may be filled with negative infinities. A look-ahead mask may be added to a scaled attention score matrix to obtain a masked score matrix. Masked score matrix may include scaled attention scores in the lower-left triangle of the matrix and negative infinities in the upper-right triangle of the matrix. Then, when a softmax of this matrix is taken, negative infinities will be zeroed out; this leaves zero attention scores for "future tokens".

With continued reference to FIG. 1, a second multi-headed attention layer may use encoder outputs as queries and keys and outputs from a first multi-headed attention layer as values. This process matches an encoder's input to a decoder's input, allowing the decoder to decide which encoder input is relevant to put a focus on. An output from a second multi-headed attention layer may be fed through a pointwise feedforward layer for further processing.

With continued reference to FIG. 1, an output of a pointwise feedforward layer may be fed through a final linear layer. This final linear layer may act as a classifier. This classifier may be as big as the number of classes that you have. For example, if you have 10,000 classes for 10,000 words, an output of that classifier will be of size 10,000. An output of this classifier may be fed into a softmax layer which may serve to produce probability scores between zero and one. An index may be taken of the highest probability score in order to determine a predicted word.

With continued reference to FIG. 1, a decoder may take this output and add it to decoder inputs. A decoder may continue decoding until a token is predicted. A decoder may stop decoding once it predicts an end token.

With continued reference to FIG. 1, in one or more embodiments, a decoder may be stacked N layers high, with each layer accepting inputs from an encoder and layers before it. Stacking layers may allow an LLM to learn to extract and focus on different combinations of attention from its attention heads.

With continued reference to FIG. 1, an LLM may receive an input. An input may include a string of one or more characters. An input may additionally include unstructured data. For example, an input may include one or more words, a sentence, a paragraph, a thought, a query, and the like. For the purposes of this disclosure, a "query" is a string of characters that poses a question. In one or more embodiments, an input may be received from a user device. A user device may be any computing device that is used by a user. As nonlimiting examples, a user device may include one or more desktops, laptops, smartphones, tablets, and the like. In one or more embodiments, an input may include any set of data associated with training and/or using an LLM. As a nonlimiting example, an input may be a prompt such as "what features or traits made this video go viral?"

With continued reference to FIG. 1, an LLM may generate at least one annotation as output. At least one annotation may be any annotation as described herein. In one or more embodiments, an LLM may include multiple sets of transformer architecture as described above. An output may include a textual output. For the purposes of this disclosure, a "textual output" is an output comprising a string of one or more characters. A textual output may include, for example, a plurality of annotations for unstructured data. In one or more embodiments, a textual output may include a phrase or sentence identifying the status of a user query. In one or more embodiments, a textual output may include a sentence or plurality of sentences describing a response to user query. As a nonlimiting example, this may include restrictions, timing, advice, dangers, benefits, and the like.

With continued reference to FIG. 1, through domain-specific constraints (e.g., silos of content), insights regarding virality obtained using a sapient search system and method may be leveraged to support a variety of initiatives, agendas, or goals, among others. As a nonlimiting example, by taking into account the domain-specific constraints of scientific videos for fighting science misinformation, insights regarding virality may be leveraged to promote public understanding of science and science-based issues. Other silos may be used to support evidence-based public health agency communications during epochs of uncertainty, such as without limitation COVID-19 or other pandemics or wars (e.g., Ukraine-Russia war), or issues of national security and intelligence where inaccurate or fake news may cause societal harm, among others. Another relevant silo may include women's and children's welfare & health. Sports medicine and fitness may constitute yet another silo. This list is not intended to be exhaustive and simply serves to illustrate the far-ranging applicability of the invention described herein.

With continued reference to FIG. 1, aside from the benefits gained from gaining insights from a single platform (e.g., YouTube), the inventive concepts disclosed herein may enable cross-platform insights that yield richer insights than what a single platform alone may yield.

With continued reference to FIG. 1, additional embodiments of the invention described herein may include without limitation further applications of virality scores obtained using a sapient search method. As a nonlimiting example, a series of video virality scores recorded over time (i.e., a sequence) may be considered as a factor in the prioritization of sapient search results. Additional details will be provided below in this disclosure.

With continued reference to FIG. 1, the present disclosure may involve the processing of input data and the generation of output data to some extent. This input data processing and output data generation may be implemented in hardware or software. For example, specific electronic components may be employed in a desktop computer, server, cloud computing environment or similar or related circuitry for implementing the functions associated with the techniques described herein.

With continued reference to FIG. 1, alternatively, one or more processors (local and/or distributed) operating in accordance with instructions may implement the functions associated with estimation of content uptake metrics in accordance with the present disclosure as described above. If such is the case, it is within the scope of the present disclosure that such instructions may be stored on one or more non-transitory processor-readable storage media (e.g., a magnetic disk, solid-state drive, or other storage medium), or transmitted to one or more processors via one or more signals embodied in one or more carrier waves. Storage may be distributed among one or several computer servers or using a cloud database service, consistent with details described above.

With continued reference to FIG. 1, the present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art, upon reviewing the entirety of this disclosure, will be able to recognize that its usefulness is not limited thereto and that the present disclosure may be beneficially implemented in any number of environments for any number of purposes. Accordingly, the claims set forth below should be construed in view of the full breadth and spirit of the present disclosure as described herein.

Figure 2A:
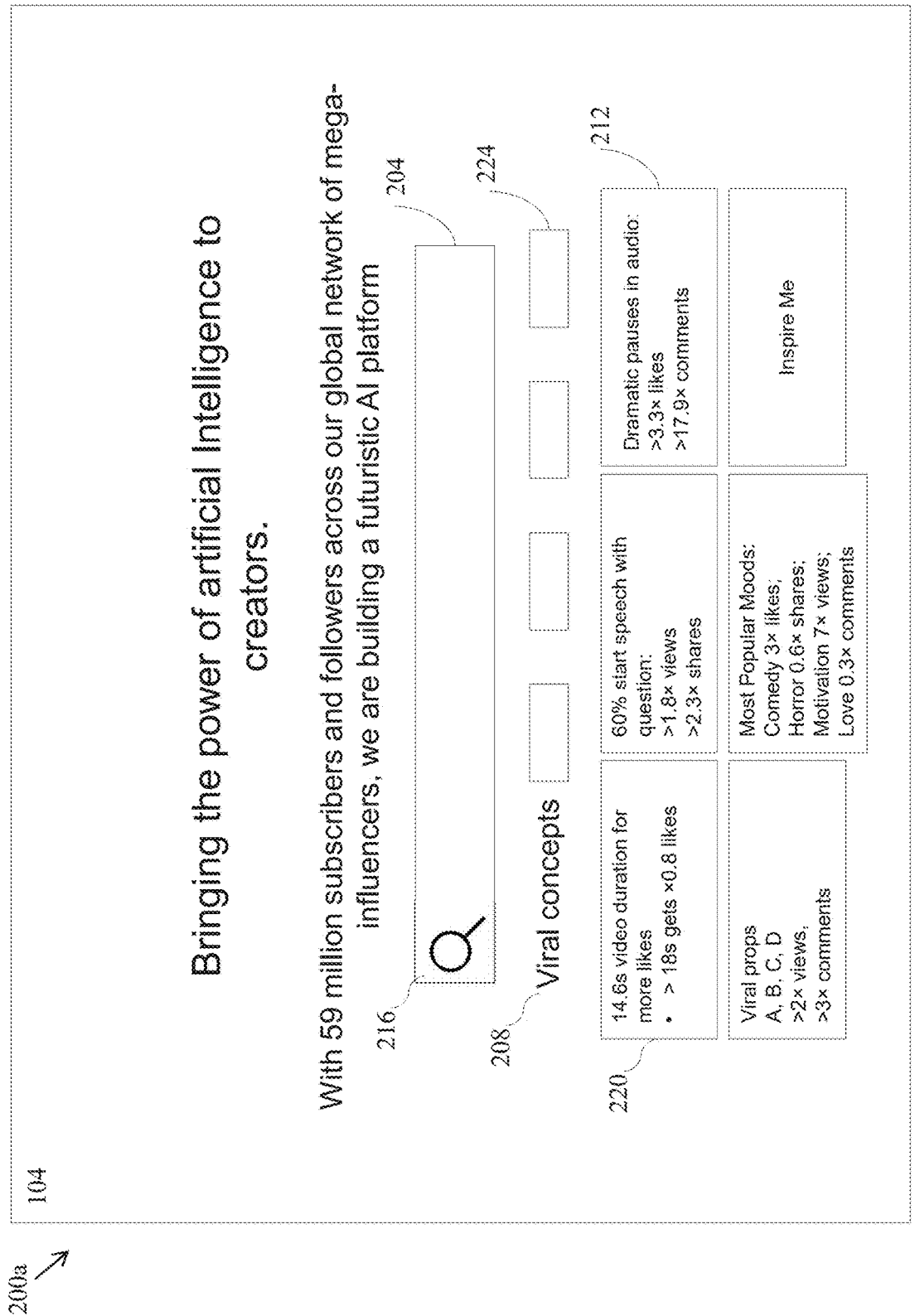
FIG. 2A is an exemplary embodiment of a user interface including a search query and results generated in response to the search query, among other related elements.

Referring now to FIG. 2A, an exemplary embodiment 200a of user interface 104 is illustrated. User interface 104 includes one or more insights 118, consistent with details described above. One or more insights 118 may include useful statistical information, and such statistical information is presented to the user, using user interface 104. Search results for the user's query may be presented to the user in the form of one or more insights 118 that include one or more characteristics of the raw results from sapient search 116.

With continued reference to FIG. 2A, the collection of possible insights 118 may be growing as a function of time. Each insight 118 may be associated with an "actionability" score that determines whether or not an insight 118 may be presented to the user. As a nonlimiting example, if a mean duration of videos in the third raw result, as described above, is not significantly different from a mean duration of videos across the entire population (e.g., a tenth of video has no bearing on virality as far as the topic in user's text prompt is concerned), the result therefrom may not be actionable. Additionally, and/or alternatively, each query may be frequently associated with a different set of top insights 118.

With continued reference to FIG. 2A, user interface 104 may include a search box 204. Search box 204 may receive as a query one or more keywords or other text, as well as one or more images, audios, videos, and/or clips. As shown in FIG. 2A, as a nonlimiting example, the query provided through user interface 104 may include a query such as "How thoughts shapes reality". The user may submit the query by interacting with a graphical user interface (GUI) element, consistent with details described above, such as without limitation by clicking a magnifying glass icon on the lefthand side of search box 204, by hitting the enter key on a keyboard, or by other equivalent action. Search box 204 may be accompanied by examples of other viral concepts 208 that are selected based on prior history of virality for concepts that are associated with a user query. For the purposes of this disclosure, a "viral concept" is a concept, idea, event, topic, or theme that is currently going viral or being widely disseminated. As a nonlimiting example, these examples may be based on previously published search algorithms on semantics or other search methods recognized by a person of ordinary skill in the art, upon reviewing the entirety of this disclosure.

With continued reference to FIG. 2A, user interface 104 may include one or more insight cards 212. For the purposes of this disclosure, an "insight card" is an element of visual representation generated based on insight 118 and displayed using user interface 104. As a nonlimiting example, one or more insight cards 212 may be included in the lower section of user interface 104. Each insight card 212 may be configured to emerge from data being processed in response to a submitted query. This lower section may be dynamically updated, as each search result may trigger one or more different insight cards 212, a different number of insight cards 212, and so forth. An algorithm implementing the method for estimation of content uptake metrics, as described above in this disclosure, may determine that each insight card 212 has a value that is worth showing to the user.

With continued reference to FIG. 2A, in some cases, each insight card 212 may be configured to leverage previously published methods such as video object recognition AI methods, language translation AI methods, and/or speech transcript extraction AI methods, among others. As a nonlimiting example, insight card 212 may implement advanced machine learning or statistical inference methods where viral features are computed for a subset of videos as a function of metadata related to the user's specific search query. For the purposes of this disclosure, a "statistical inference method" is a technique used to analyze data and draw conclusions about a population based on a sample. A statistical inference method may be implemented using probability theory to estimate population parameters, test hypotheses, etc., and make predictions or decisions under uncertainty. A statistical inference method may bridge the gap between sample data and generalizations pertaining to a broader population of data. Common statistical inference methods may include without limitation estimation (such as point estimates and confidence intervals, among others), hypothesis testing (e.g., t-tests, chi-square tests, ANOVA, and/or the like), and regression analysis, among others. These methods may rely on certain assumptions pertaining to data distribution and may be designed to assess relationships, differences, trends, etc., within the data while accounting for variability and randomness. Statistical inference methods are often considered foundational in fields such as without limitation data science, machine learning, and experimental research, among others, enabling data-driven decision-making.

With continued reference to FIG. 2A, insight cards 212 displayed in user interface 104 may be prioritized in a decreasing order of virality salience from a large number (e.g., thousands) of insight cards 212 derived from features pertaining to videos, audios, images, text, speech transcripts, embedded text, music files, and so forth. For the purposes of this disclosure, a "virality salience" is an indication describing a degree to which a piece of streaming content exhibits one or more characteristics that make it highly shareable and likely to spread rapidly across social media platforms. In some cases, a virality salience may encapsulate the visibility and/or prominence of a streaming content's potential to go viral, which may be driven by one or more factors such as without limitation emotional appeal, relevance, novelty, timing, social endorsement, and/or the like. A virality salience may be measured through one or more engagement metrics (e.g., likes, shares, comments, and/or the like), network reach (i.e., how widely it is distributed across user connections), content resonance (i.e., an alignment with current trends or user interests), and/or the like. Tools such as without limitation predictive analytics and algorithms, among others, may be used to evaluate virality salience by identifying certain content feature(s) or metadata (e.g., hashtags, keywords, or influential users interacting with the post) that contribute to its rapid dissemination. A high virality salience may indicate a stronger likelihood of becoming widely recognized or influential in shaping conversations on social media, and vice versa.

With continued reference to FIG. 2A, as a nonlimiting example, a virality salience may include a virality score. For the purposes of this disclosure, a "virality score" is a numerical indication of virality salience, consistent with details described above in this disclosure. A virality score may be assigned based on any discrete or continuous scale deemed relevant by a person of ordinary skill in the art, upon reviewing the entirety of this disclosure. In one or more embodiments, a virality score may include a frequency of a viral word. In one or more embodiments, a virality score may include a score returned by a sapient search system in response to a user query submitted through user interface 104.

With continued reference to FIG. 2A, it is understood that a user interface such as a GUI may implement the same functionality in a myriad of different implementations. As a nonlimiting example, the size of search box 204 may be configured to adopt a larger or smaller size; the font and/or size of the text in user interface 104 may be changed; the shape of one or more insight cards 212 may include a triangle instead of a rectangle; one or more insight cards 212 may be located above the search box 204 or encircling the search box 204; and so forth. However, despite these types of variations, it is emphasized that the simple layout of GUI with search box 204 deployed in a first region 216 of user interface 104 in relation to one or more insight cards 212 in a second region 220 of the user interface 104 may afford several advantages. Mainly, this arrangement may leverage the immense AI-driven analytics that occur behind the scenes from the user, thereby distilling the most essential and useful information as a function of a user query. In such a manner, the user may quickly and easily ascertain what characteristic, or quality, makes a given search go viral in the first place. A content creator who aims to understand why a video of theirs was particularly popular may submit that video into the search box via a link or other appropriate means. After submitting the query, the content creator may be promptly shown what concepts, characteristics, qualities, and so forth, have been flagged as potential roads to virality. Similarly, user interface 104 may include a third region 224 configured to display one or more viral concepts 208 related to the user query as a function of a prior history of virality for concepts that are associated with the user query, consistent with details described above.

With continued reference to FIG. 2A, a quantification of actionability from a sapient search may be performed. When search is presented in existing user interfaces, search results are usually relevance based. In contrast, with sapient search algorithms, sapient search systems, as well as the other various methods, systems, programs, and articles of manufacture described herein, may be actionability based. In some cases, one or more virality-based enrichments may be deployed, wherein the larger the difference between a viral set versus a control set, the larger the actionability may be.

With continued reference to FIG. 2A, search techniques including without limitation lexical, semantic, and fuzzy-based searches may be used by content creators, and influencers may not incorporate virality and semantics together in a way for a user interface to enable a positive modulation of a user's intent. With sapient search 116, regarding what terms are matched, the sapient search 116 may incorporate one or more social performance metrics of a streaming content (e.g., a video) into a ranked plurality of search results. As a result, top recommendations may include viral streaming contents whose descriptions are associated significantly (e.g., with the highest degree of resemblance) with the search query. All content related to each query word/token may be retrieved, and their combined enriched concepts/tokens in a viral streaming content versus other videos may accordingly be computed. Based on these two attributes, sapient search results may capture associations between words that mostly cooccur in the context of virality. As a nonlimiting example, the words "couple" and "dating" in a sentence "couple in a blind dating show" may be associated by a sapient search system. Additional details may be found below in FIG. 2F, exemplary results 200*f*.

With continued reference to FIG. 2A, regarding the elements to be displayed by user interface 104, both viral and non-viral (dud) content may be displayed together. However, consuming these viral and non-viral content together may neuromodulate a content creator into subpar effectiveness with respect to their own future content. In one or more embodiments, with a sapient search, on the other hand, only viral tokens/concepts may be displayed, and upon examination by a user (e.g., a content creator), only the viral streaming contents therein may be selectively displayed. Taken together, a user (e.g., a content creator) may be influenced/conditioned into optimistic thinking and triggered for creating future viral content.

With continued reference to FIG. 2A, regarding which elements are to be emphasized, only emphasizing videos and some description thereof (e.g., text) may cause other useful features to be ignored. As a result, statistical enrichments in features such as video objects recognized in viral videos, audio track features/speech features recognized in viral videos, and text enrichments recognized from descriptions, emojis, embedded text, and speech transcripts, among others, may not be displayed in user interface 104. Such a rich array of information on viral content may be missing and hence not educating a user aptly. Accordingly, embodiments herein may provide the most important, relevant and useful information to the user through user interface 104.

With continued reference to FIG. 2A, furthermore, when none of the viral content outside of the social media platform is displayed to the user (e.g., a content creator), the user may not be able to receive any inspiration from outside of their social media platform, despite the fact that there may be several data siloes with clear viral data outside of the social media platform of interest. Thus, by showing viral enrichments from sources outside of a user's social media platform, user interface 104, as well as other software user interface embodiments described herein, may enable a more holistic education of viral features to the user, such as without limitation a content creator. These sources may include without limitation online streaming contents (e.g., viral talk shows or podcasts, TED talks, and/or the like), viral e-book titles, famous sentences or quotes (e.g., proverbs), and popular jokes or punchlines, among others. Algorithms disclosed herein may enable novel viral enrichments, such as without limitation "romance", "couple", and "dating", to be revealed prominently for an exemplary query such as "how thoughts shape your reality". In this nonlimiting example, it is remarkable that viral videos wherein the couple is blindfolded emerge, where their thoughts are indeed impacting the reality of their outcomes; however, no explicit text such as "thoughts shape reality" are mentioned anywhere in the video's textual content or audio script. This is one nonlimiting example that illustrates the power of sapient search 116. Additional details may be found below in FIG. 2F, exemplary results 200f.

Figure 2B:
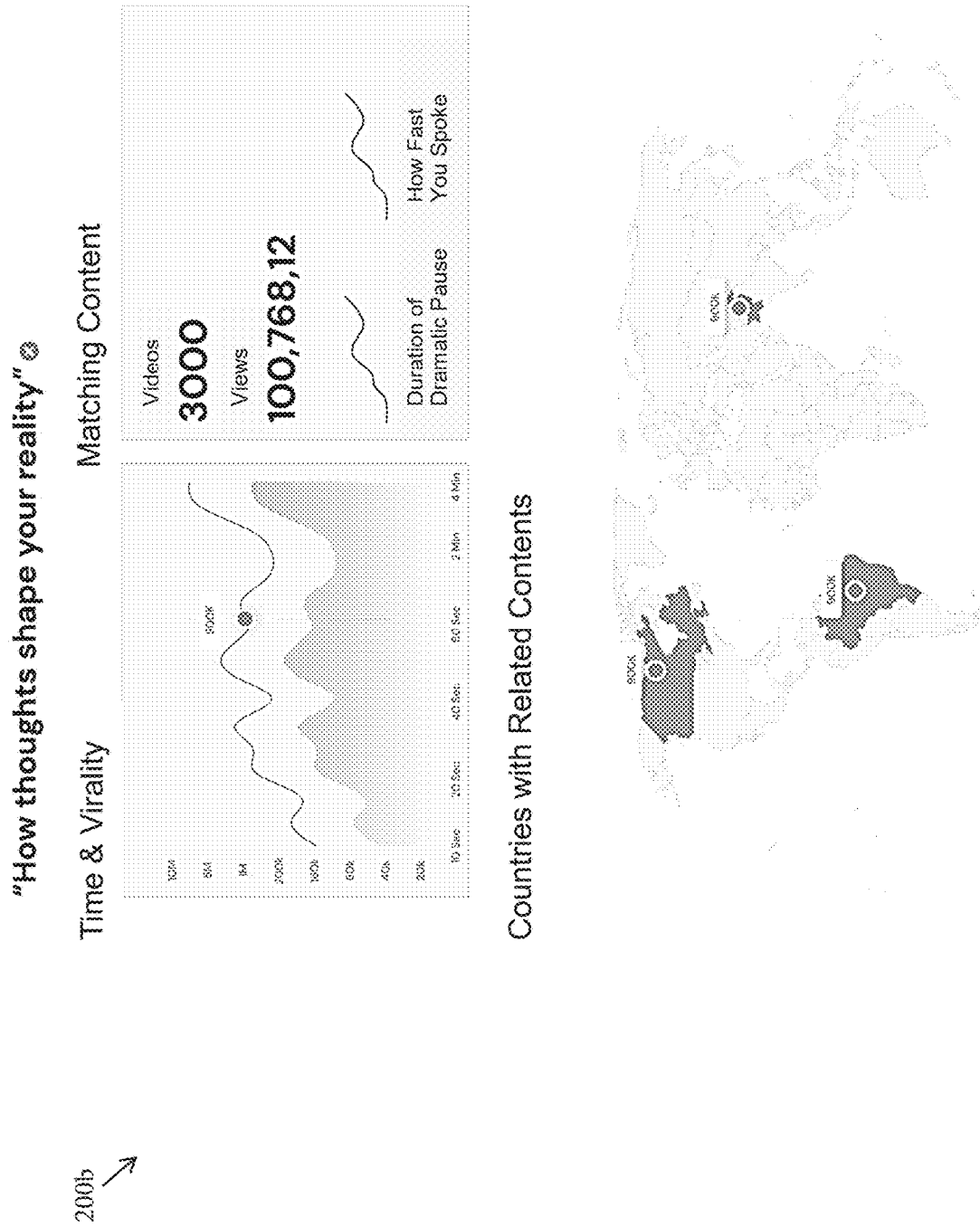
FIG. 2B is another exemplary embodiment of a user interface containing a first portion including a time-virality correlation plot, a second portion including identified matching contents by the number of videos and views, and a third portion including a map of identified countries with related contents.

Referring now to FIG. 2B, FIG. 2B includes another exemplary embodiment 200b of user interface 104 containing a first portion including a time-virality correlation plot, a second portion including identified matching contents by the number of videos and views, and a third portion including a map of identified countries with related contents.

Figure 2C:
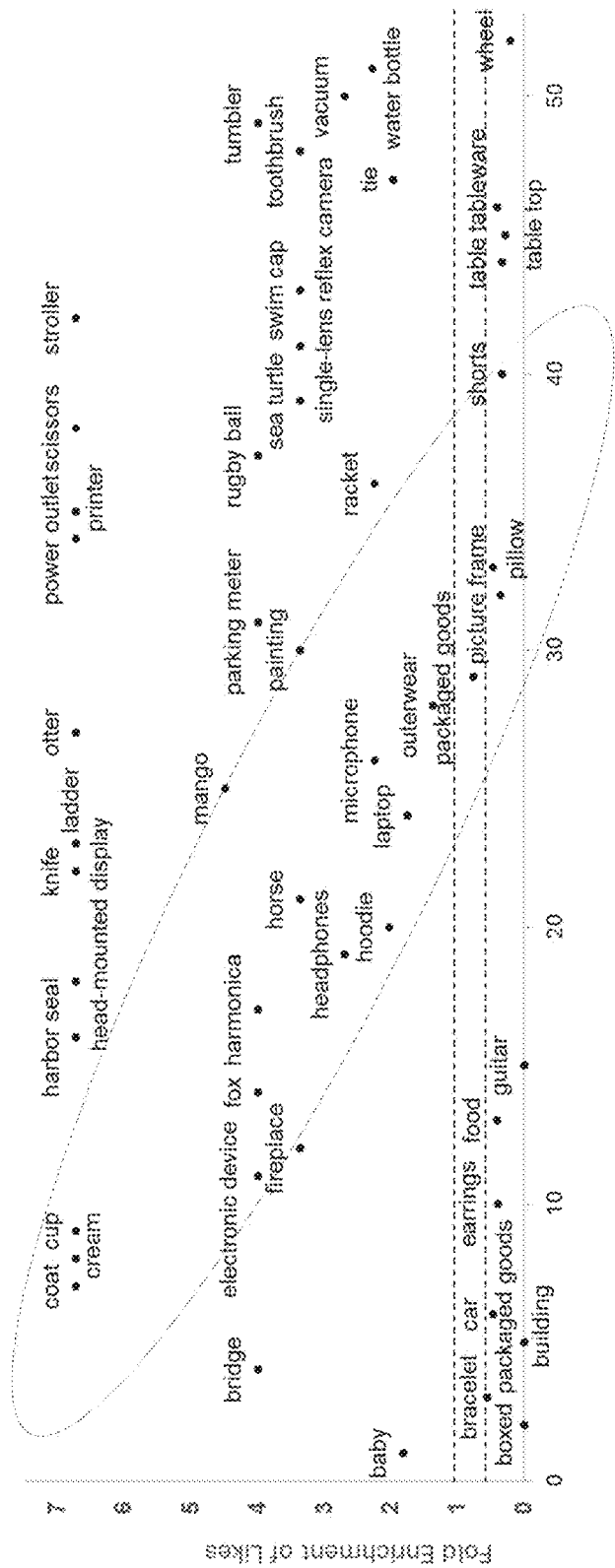
FIG. 2C is an exemplary embodiment of a user interface including results of object recognition.

Referring now to FIG. 2C, FIG. 2C includes an exemplary embodiment 200c of user interface 104 showing results of object recognition, consistent with details described above in this disclosure.

Figure 2D:
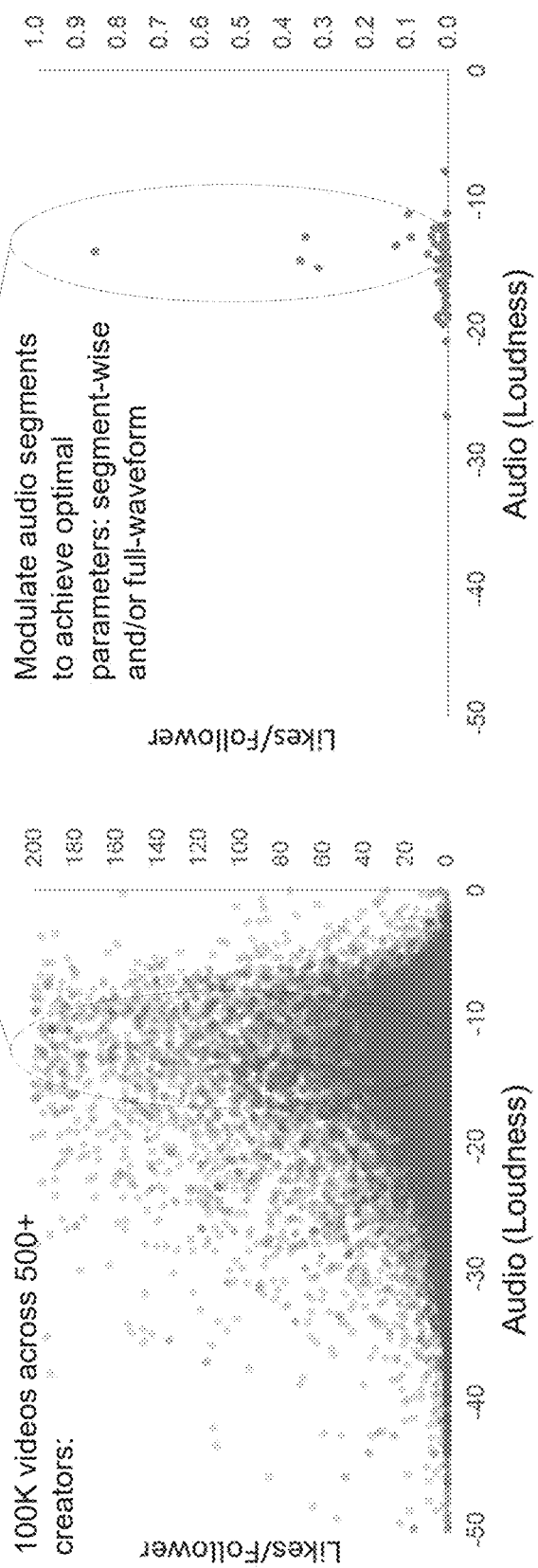
FIG. 2D is an exemplary embodiment of a user interface including results of an audio enrichment analysis.

Referring now to FIG. 2D, FIG. 2D includes an exemplary embodiment 200d of a user interface 104 showing results of an audio enrichment analysis, consistent with details described above in this disclosure. Specifically, an audio (loudness) enrichment analysis on 100,000 videos and juxtaposition with contents of TIKTOK creators show clear amplification of virality (Likes/Follower) in [−10,−15] "Golden Range" of audio loudness. Data are presented on a −log 10 db scale. Audio segments may be modulated to achieve optimal parameters in segment-wise and/or full-waveform.

Figure 2E:
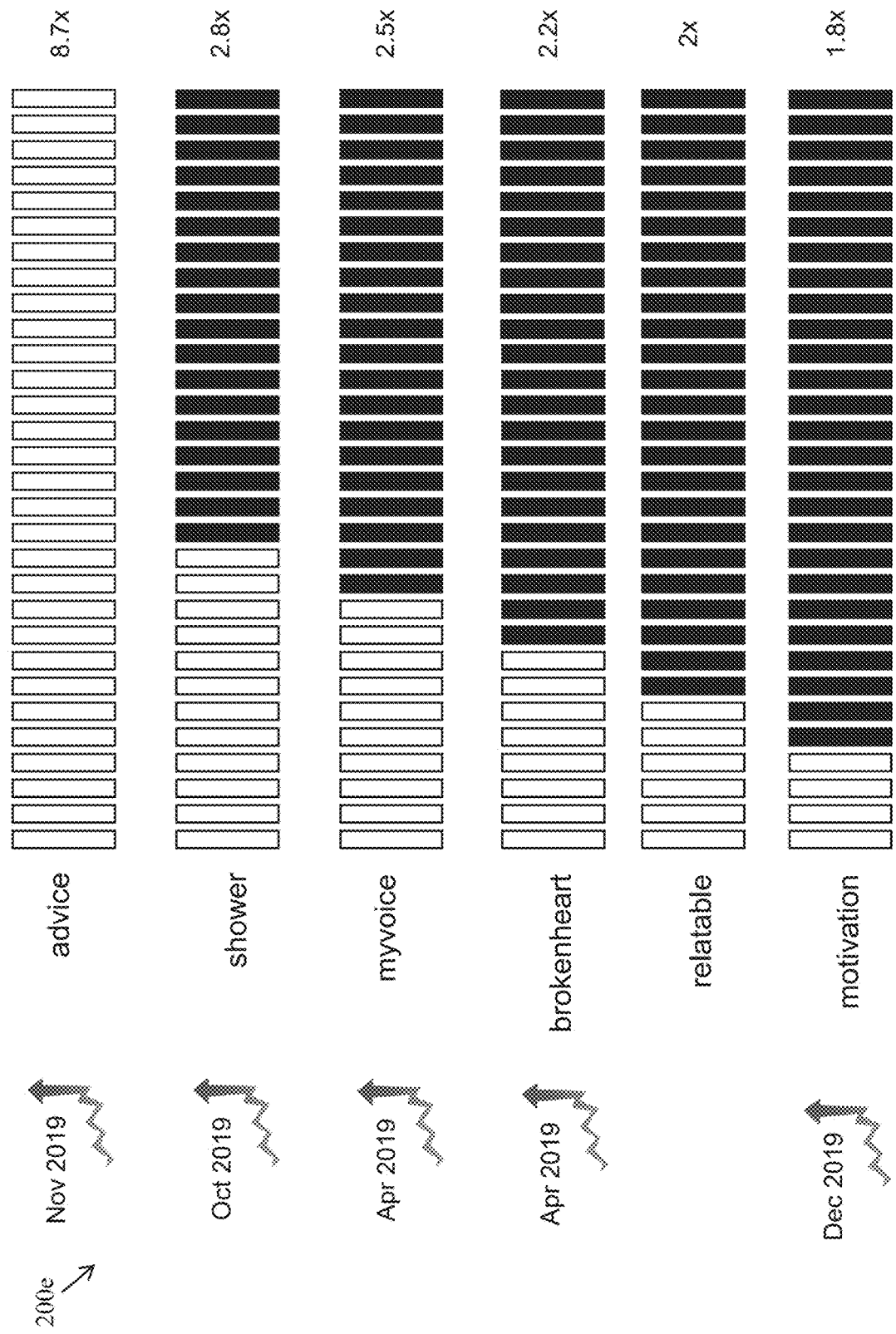
FIG. 2E is an exemplary embodiment of a set of insights generated by the system in FIG. 1.

Referring now to FIG. 2E, FIG. 2E illustrates an exemplary embodiment 200e of a set of insights 118 generated by system 100, consistent with details described above.

Figure 2F:
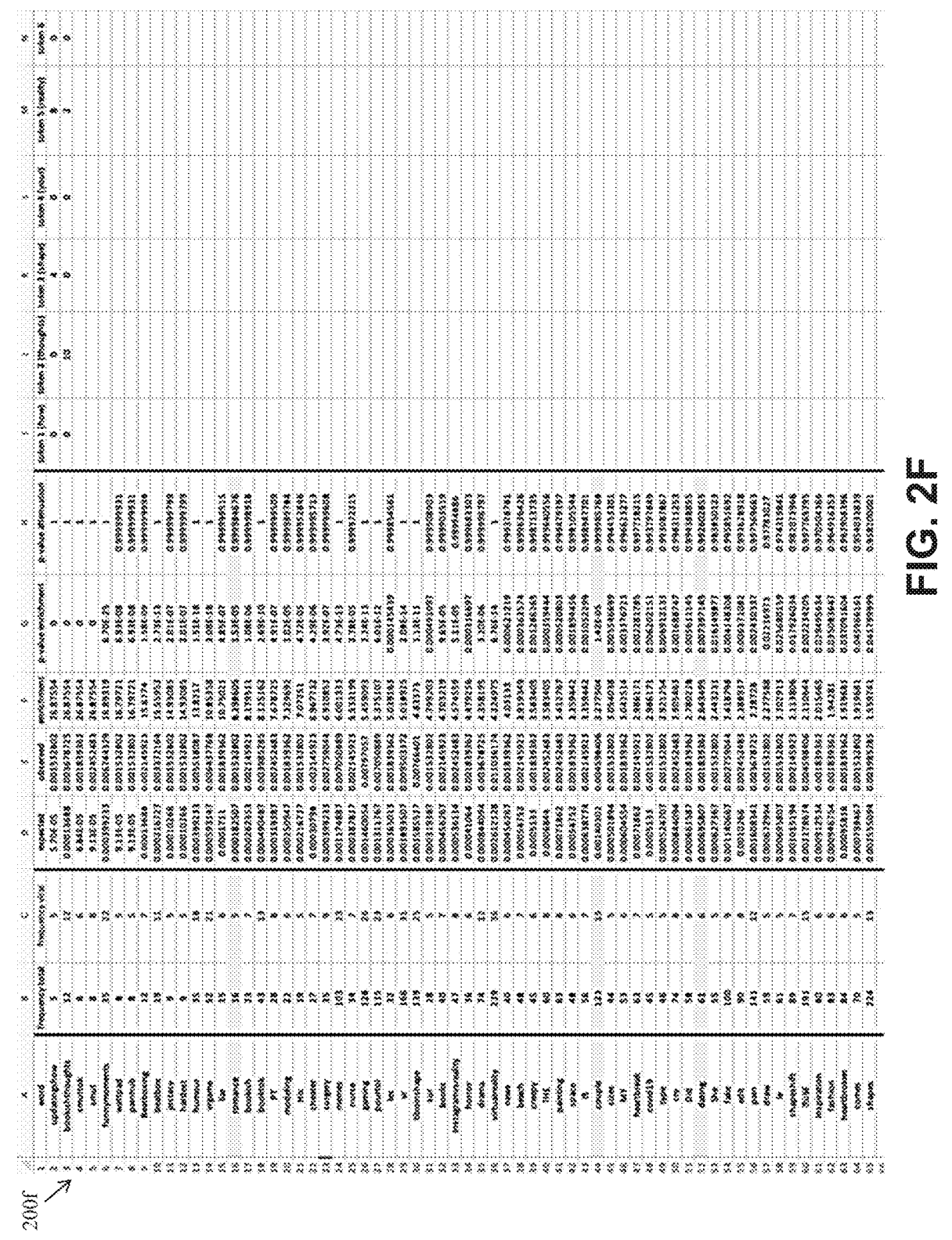

Referring now to FIG. 2F, FIG. 2F includes exemplary results 200f of term viral frequencies generated by the system 100, consistent with details described above.

Figure 2G:
Figure 2H:
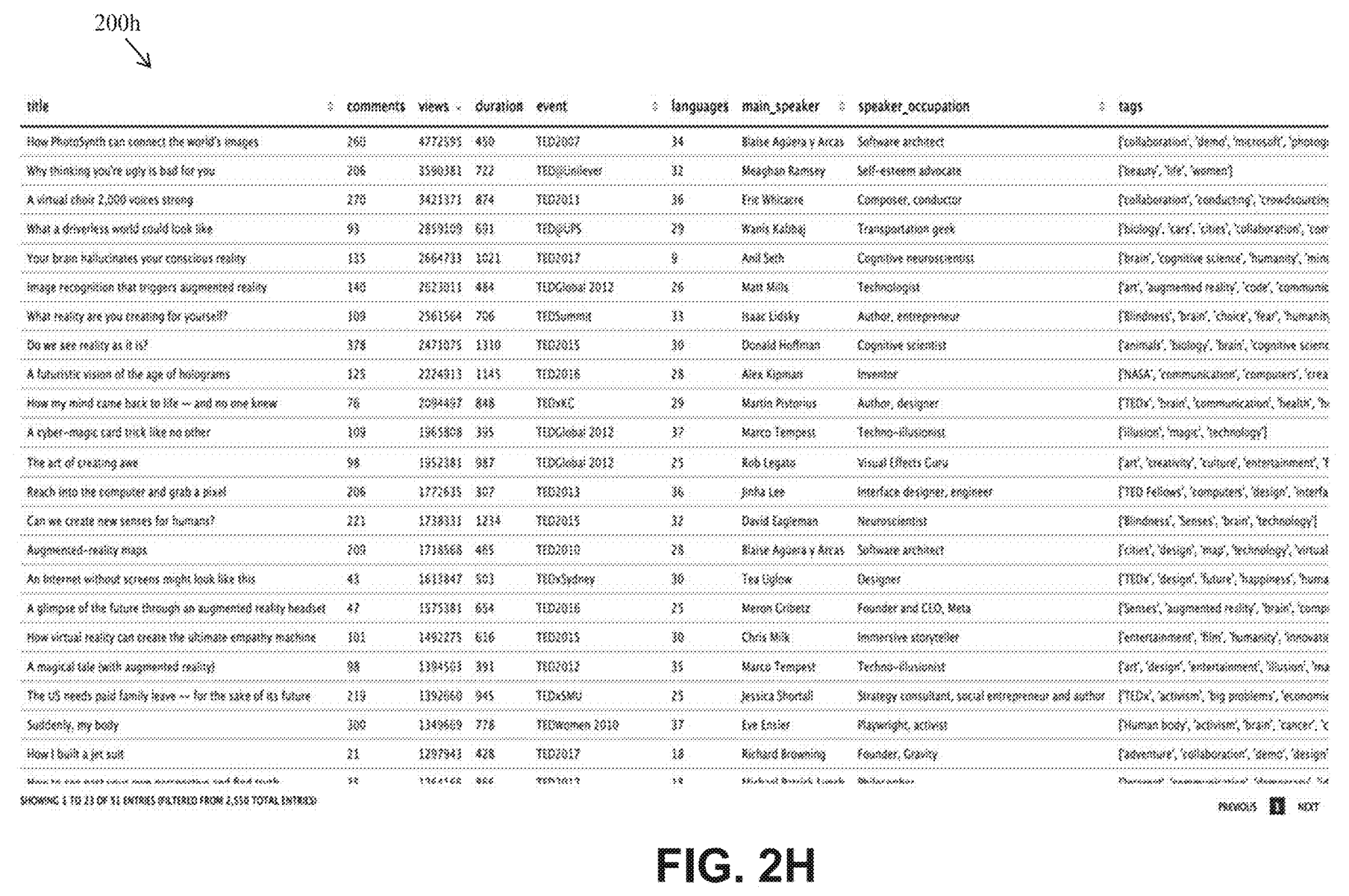
Figure 2J:
Figure 2K:
Figure 2M:
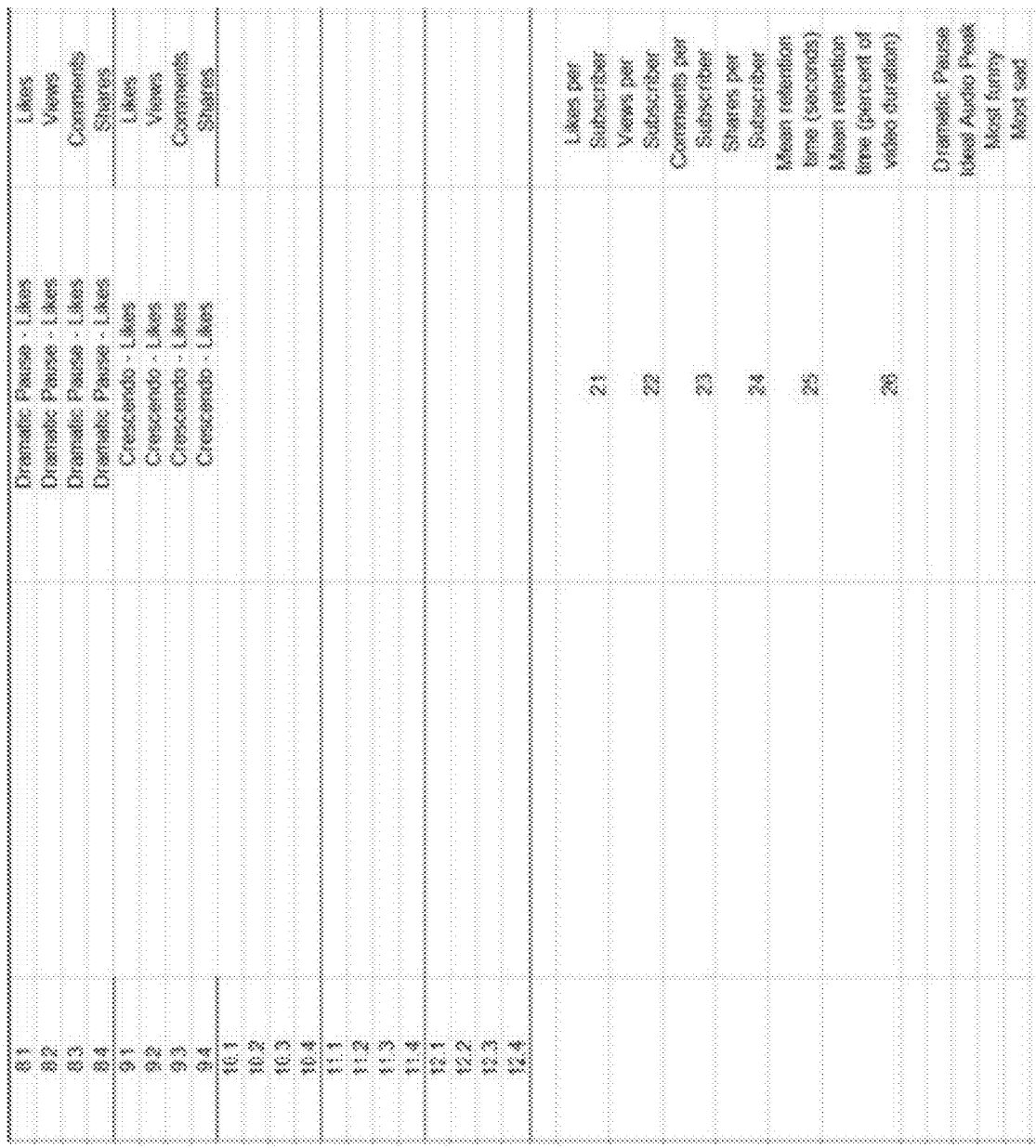

Referring now to FIGS. 2G-H, FIGS. 2G-H include exemplary embodiments 200g-h of a list of viral TED talk results based on a query "how thoughts shape your reality", to be displayed in user interface 104 catering to content creators on social media platforms such as without limitation TIKTOK, YOUTUBE, and INSTAGRAM, among others.

Referring now to FIG. 2I, FIG. 2I includes an exemplary embodiment 200i of a list of streaming contents with taglines results for query "How thoughts shape your reality", to be displayed in user interface 104 catering to content creators on social media platforms like TIKTOK, YOUTUBE, and INSTAGRAM, among others.

Referring now to FIGS. 2J-M, FIGS. 2J-M include exemplary results 200j-m that together form a single table. This table summarizes a plurality of possible insight cards 212 (as identified in the "Insight Card ID" column), the displayed name of each insight card 212, factors on which virality was based for each insight card 212, and the underlying data used in the analysis.

Figure 3:
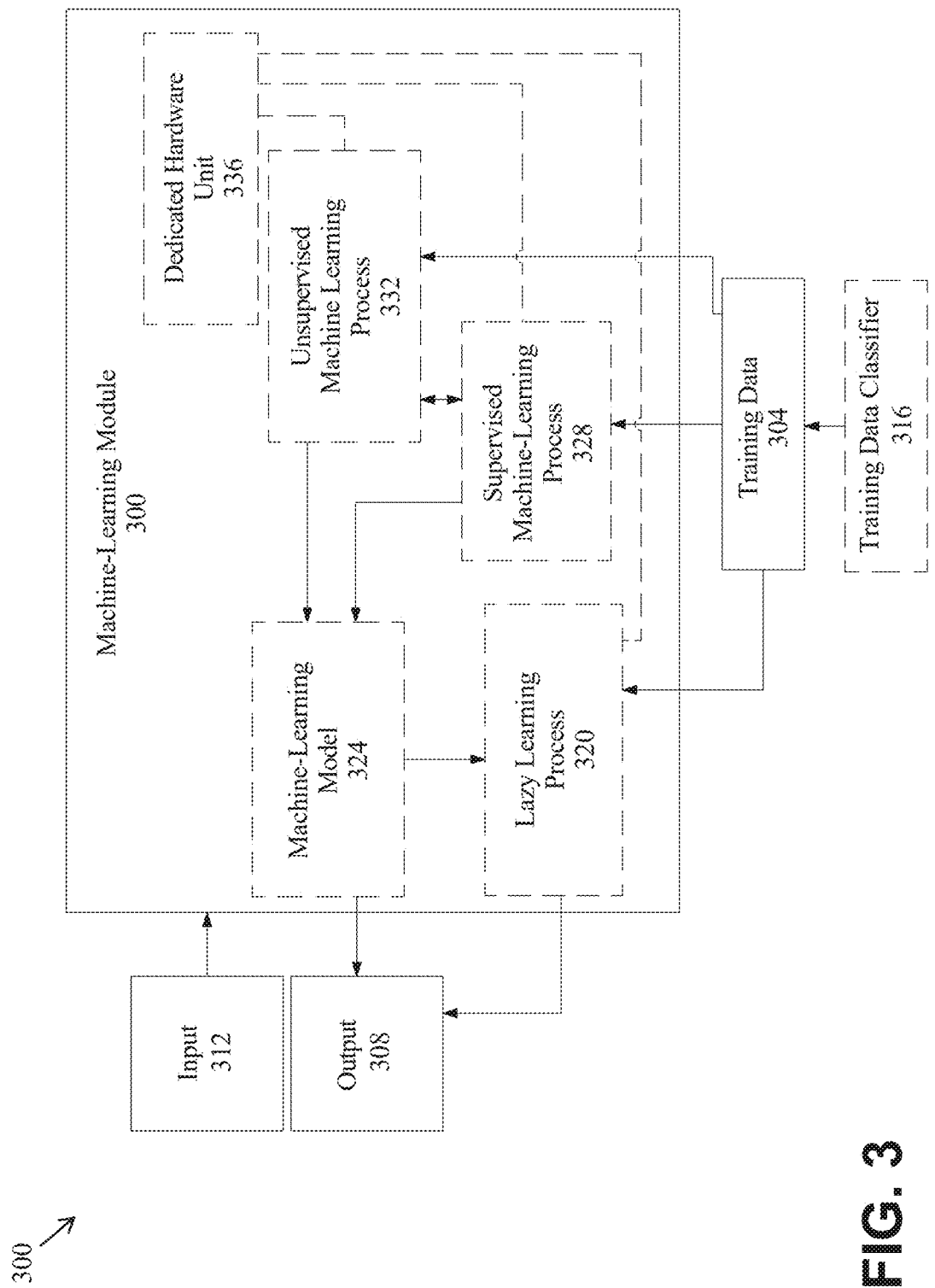
FIG. 3 is a block diagram of an exemplary embodiment of a machine-learning process.

Referring now to FIG. 3, an exemplary embodiment of a machine-learning module 300 that may perform one or more machine-learning processes as described above is illustrated. Machine-learning module may perform determinations, classification, and/or analysis steps, methods, processes, or the like as described in this disclosure using machine-learning processes. For the purposes of this disclosure, a "machine-learning process" is an automated process that uses training data 304 to generate an algorithm instantiated in hardware or software logic, data structures, and/or functions that will be performed by a computing device/module to produce outputs 308 given data provided as inputs 312. This is in contrast to a non-machine-learning software program where the commands to be executed are predetermined by user and written in a programming language.

With continued reference to FIG. 3, for the purposes of this disclosure, "training data" are data containing correlations that a machine-learning process uses to model relationships between two or more categories of data elements. For instance, and without limitation, training data 304 may include a plurality of data entries, also known as "training examples", each entry representing a set of data elements that were recorded, received, and/or generated together. Data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a nonlimiting example, training data 304 may include data entered in standardized forms by persons or processes, such that entry of a given data element within a given field in a given form may be mapped to one or more descriptors of categories. Elements in training data 304 may be linked to descriptors of categories by tags, tokens, or other data elements. For instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 3, alternatively, or additionally, training data 304 may include one or more elements that are uncategorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data, and the like; categories may be generated using correlation and/or other processing algorithms. As a nonlimiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a nonlimiting illustrative example, inputs may include a plurality of streaming contents, such as without limitation a plurality of videos, whereas outputs may include a plurality of tokens.

With continued reference to FIG. 3, training data 304 may be filtered, sorted, and/or selected using one or more supervised and/or unsupervised machine-learning processes and/or models as described in further detail below; such processes and/or models may include without limitation a training data classifier 316. For the purposes of this disclosure, a "classifier" is a machine-learning model that sorts inputs into categories or bins of data, outputting the categories or bins of data and/or labels associated therewith. Machine-learning model may include without limitation a data structure representing and/or using a mathematical model, neural net, or a program generated by a machine-learning algorithm, known as a "classification algorithm". A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm. For the purposes of this disclosure, a "classification algorithm" is a process wherein a computing device and/or any module and/or component operating therein derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, learning vector quantization, and/or neural network-based classifiers. In one or more embodiments, training data classifier 316 may classify elements of training data to a plurality of cohorts as a function of certain features or traits.

With continued reference to FIG. 3, machine-learning module 300 may be configured to generate a classifier using a naive Bayes classification algorithm. Naive Bayes classification algorithm generates classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as $P(A/B)=P(B/A) \times P(A) + P(B)$, where $P(A/B)$ is the probability of hypothesis A given data B, also known as posterior probability; $P(B/A)$ is the probability of data B given that the hypothesis A was true; $P(A)$ is the probability of hypothesis A being true regardless of data, also known as prior probability of A; and $P(B)$ is the probability of the data regardless of the hypothesis. A naive Bayes algorithm may be generated by first transforming training data into a frequency table. Machine-learning module 300 may then calculate a likelihood table by calculating probabilities of different data entries and classification labels. Machine-learning module 300 may utilize a naive Bayes equation to calculate a posterior probability for each class. A class containing the highest posterior probability is the outcome of prediction. Naive Bayes classification algorithm may include a gaussian model that follows a normal distribution. Naive Bayes classification algorithm may include a multinomial model that is used for discrete counts. Naive Bayes classification algorithm may include a Bernoulli model that may be utilized when vectors are binary.

With continued reference to FIG. 3, machine-learning module 300 may be configured to generate a classifier using a k-nearest neighbors (KNN) algorithm. For the purposes of this disclosure, a "k-nearest neighbors algorithm" is or at least includes a classification method that utilizes feature similarity to analyze how closely out-of-sample features resemble training data 304 and to classify input data to one or more clusters and/or categories of features as represented in training data 304. This may be performed by representing both training data 304 and input data in vector forms and using one or more measures of vector similarity to identify classifications within training data 304 and determine a classification of input data. K-nearest neighbors algorithm may include specifying a k-value, or a number directing the classifier to select the k most similar entries of training data 304 to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a nonlimiting example, an initial heuristic may include a ranking of associations between inputs 312 and elements of training data 304. Heuristic may include selecting some number of highest-ranking associations and/or training data elements.

With continued reference to FIG. 3, generating k-nearest neighbors algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least 2. Each value of n-tuple of values may represent a measurement or other quantitative value associated with a given category of data or attribute, examples of which are provided in further detail below. A vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent when their directions and/or relative quantities of values are the same; thus, as a nonlimiting example, a vector represented as [5, 10, 15] may be treated as equivalent, for the purposes of this disclosure, as a vector represented as [1, 2, 3]. Vectors may be more similar where their directions are more similar, and more different where their directions are more divergent. However, vector similarity may alternatively, or additionally, be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized", or divided by a "length" attribute, such as a length attribute l as derived using a Pythagorean norm:

$$l = \sqrt{\sum_{i=0}^{n} a_i^2},$$

where $a_i$ is attribute number of vector i. Scaling and/or normalization may function to make vector comparison independent of absolute quantities of attributes, while preserving any dependency on similarity of attributes. This may, for instance, be advantageous where cases represented in training data 304 are represented by different quantities of samples, which may result in proportionally equivalent vectors with divergent values.

With continued reference to FIG. 3, training examples for use as training data may be selected from a population of potential examples according to cohorts relevant to an analytical problem to be solved, a classification task, or the like. Alternatively, or additionally, training data 304 may be selected to span a set of likely circumstances or inputs for a machine-learning model and/or process to encounter when deployed. For instance, and without limitation, for each category of input data to a machine-learning model and/or process that may exist in a range of values in a population of phenomena such as images, user data, process data, physical data, or the like, a computing device, one or more processors, and/or machine-learning module 300 may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to user, so that a process can detect, automatically or via user input, one or more values that are not included in the set of training examples. Computing device, one or more processors, and/or machine-learning module 300 may automatically generate a missing training example. This may be done by receiving and/or retrieving a missing input and/or output value and correlating the missing input and/or output value with a corresponding output and/or input value collocated in a data record with the retrieved value, provided by user, another device, or the like.

With continued reference to FIG. 3, computing device, one or more processors, and/or machine-learning module 300 may be configured to preprocess training data 304. For the purposes of this disclosure, "preprocessing" training data is a process that transforms training data from a raw form to a format that can be used for training a machine-learning model. Preprocessing may include sanitizing, feature selection, feature scaling, data augmentation and the like.

With continued reference to FIG. 3, a computing device, one or more processors, and/or machine-learning module 300 may be configured to sanitize training data. For the purposes of this disclosure, "sanitizing" training data is a process whereby training examples that interfere with convergence of a machine-learning model and/or process are removed to yield a useful result. For instance, and without limitation, a training example may include an input and/or output value that is an outlier from typically encountered values, such that a machine-learning algorithm using the training example will be skewed to an unlikely range of input 312 and/or output 308; a value that is more than a threshold number of standard deviations away from an average, mean, or expected value, for instance, may be eliminated. Alternatively, or additionally, one or more training examples may be identified as having poor-quality data, where "poor-quality" means having a signal-to-noise ratio below a threshold value. In one or more embodiments, sanitizing training data may include steps such as removing duplicative or otherwise redundant data, interpolating missing data, correcting data errors, standardizing data, identifying outliers, and/or the like. In one or more embodiments, sanitizing training data may include algorithms that identify duplicate entries or spell-check algorithms.

With continued reference to FIG. 3, in one or more embodiments, images used to train an image classifier or other machine-learning model and/or process that takes images as inputs 312 or generates images as outputs 308 may be rejected if image quality is below a threshold value.

For instance, and without limitation, a computing device, one or more processors, and/or machine-learning module 300 may perform blur detection. Elimination of one or more blurs may be performed, as a nonlimiting example, by taking Fourier transform or a Fast Fourier Transform (FFT) of image and analyzing a distribution of low and high frequencies in the resulting frequency-domain depiction of the image. Numbers of high-frequency values below a threshold level may indicate blurriness. As a further nonlimiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of image, based on the hypothesis that rapid changes indicate sharp edges in the image, and thus are indicative of a lower degree of blurriness. Blur detection may be performed using a wavelet-based operator, which uses coefficients of a discrete wavelet transform to describe the frequency and spatial content of images. Blur detection may be performed using statistics-based operators that take advantage of several image statistics as texture descriptors in order to compute a focus level. Blur detection may be performed by using discrete cosine transform (DCT) coefficients in order to compute a focus level of an image from its frequency content.

With continued reference to FIG. 3, a computing device, one or more processors, and/or machine-learning module 300 may be configured to precondition one or more training examples. For instance, and without limitation, where a machine-learning model and/or process has one or more inputs 312 and/or outputs 308 requiring, transmitting, or receiving a certain number of bits, samples, or other units of data, one or more elements of training examples to be used as or compared to inputs 312 and/or outputs 308 may be modified to have such a number of units of data. In one or more embodiments, computing device, one or more processors, and/or machine-learning module 300 may convert a smaller number of units, such as in a low pixel count image, into a desired number of units by upsampling and interpolating. As a nonlimiting example, a low pixel count image may have 100 pixels, whereas a desired number of pixels may be 128. One or more processors may interpolate the low pixel count image to convert 100 pixels into 128 pixels. It should also be noted that one of ordinary skill in the art, upon reading the entirety of this disclosure, would recognize the various methods to interpolate a smaller number of data units such as samples, pixels, bits, or the like to a desired number of such units. In one or more embodiments, a set of interpolation rules may be trained by sets of highly detailed inputs 312 and/or outputs 308 and corresponding inputs 312 and/or outputs 308 downsampled to smaller numbers of units, and a neural network or another machine-learning model that is trained to predict interpolated pixel values using the training data 304. As a nonlimiting example, a sample input 312 and/or output 308, such as a sample picture, with sample-expanded data units (e.g., pixels added between the original pixels) may be input to a neural network or machine-learning model and output a pseudo replica sample picture with dummy values assigned to pixels between the original pixels based on a set of interpolation rules. As a nonlimiting example, in the context of an image classifier, a machine-learning model may have a set of interpolation rules trained by sets of highly detailed images and images that have been downsampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, computing device, one or more processors, and/or machine-learning module 300 may utilize sample expander methods, a low-pass filter, or both. For the purposes of this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, one or more processors, and/or machine-learning module 300 may use averaging, such as luma or chroma averaging in images, to fill in data units in between original data units.

With continued reference to FIG. 3, in one or more embodiments, a computing device, one or more processors, and/or machine-learning module 300 may downsample elements of a training example to a desired lower number of data elements. As a nonlimiting example, a high pixel count image may contain 256 pixels, however a desired number of pixels may be 128. One or more processors may downsample the high pixel count image to convert 256 pixels into 128 pixels. In one or more embodiments, one or more processors may be configured to perform downsampling on data. Downsampling, also known as decimation, may include removing every $N^{th}$ entry in a sequence of samples, all but every $N^{th}$ entry, or the like, which is a process known as "compression" and may be performed, for instance by an N-sample compressor implemented using hardware or software. Anti-aliasing and/or anti-imaging filters, and/or low-pass filters, may be used to eliminate side effects of compression.

With continued reference to FIG. 3, feature selection may include narrowing and/or filtering training data 304 to exclude features and/or elements, or training data including such elements that are not relevant to a purpose for which a trained machine-learning model and/or algorithm is being trained, and/or collection of features, elements, or training data including such elements based on relevance to or utility for an intended task or purpose for which a machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, wherein a difference between each value, X, and a minimum value, $X_{min}$, in a set or subset of values is divided by a range of values, $X_{max} - X_{min}$, in the set or subset:

$$X_{new} = \frac{X - X_{min}}{X_{max} - X_{min}}.$$

Feature scaling may include mean normalization, wherein a difference between each value, X, and a mean value of a set and/or subset of values, $X_{mean}$, is divided by a range of values, $X_{max} - X_{min}$, in the set or subset:

$$X_{new} = \frac{X - X_{mean}}{X_{max} - X_{min}}.$$

Feature scaling may include standardization, wherein a difference between X and $X_{mean}$ is divided by a standard deviation, σ, of a set or subset of values:

$$X_{new} = \frac{X - X_{mean}}{\sigma}.$$

Feature scaling may be performed using a median value of a set or subset, $X_{median}$, and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

A Person of ordinary skill in the art, upon reviewing the entirety of this disclosure, will be aware of various alternative or additional approaches that may be used for feature scaling.

With continued reference to FIG. 3, computing device, one or more processors, and/or machine-learning module 300 may be configured to perform one or more processes of data augmentation. For the purposes of this disclosure, "data augmentation" is a process that adds data to a training data 304 using elements and/or entries already in the dataset. Data augmentation may be accomplished, without limitation, using interpolation, generation of modified copies of existing entries and/or examples, and/or one or more generative artificial intelligence (AI) processes, for instance using deep neural networks and/or generative adversarial networks. Generative processes may be referred to alternatively in this context as "data synthesis" and as creating "synthetic data". Augmentation may include performing one or more transformations on data, such as geometric, color space, affine, brightness, cropping, and/or contrast transformations of images.

With continued reference to FIG. 3, machine-learning module 300 may be configured to perform a lazy learning process and/or protocol 320. For the purposes of this disclosure, a "lazy learning" process and/or protocol is a process whereby machine learning is conducted upon receipt of input 312 to be converted to output 308 by combining the input 312 and training data 304 to derive the algorithm to be used to produce the output 308 on demand. A lazy learning process may alternatively be referred to as a "lazy loading" or "call-when-needed" process and/or protocol. For instance, an initial set of simulations may be performed to cover an initial heuristic and/or "first guess" at an output 308 and/or relationship. As a nonlimiting example, an initial heuristic may include a ranking of associations between inputs 312 and elements of training data 304. Heuristic may include selecting some number of highest-ranking associations and/or training data 304 elements. Lazy learning may implement any suitable lazy learning algorithm, including without limitation a k-nearest neighbors algorithm, a lazy naive Bayes algorithm, or the like. A person of ordinary skill in the art, upon reviewing the entirety of this disclosure, will be aware of various lazy learning algorithms that may be applied to generate outputs as described in this disclosure, including without limitation lazy learning applications of machine-learning algorithms as described in further detail below.

With continued reference to FIG. 3, alternatively, or additionally, machine-learning processes as described in this disclosure may be used to generate machine-learning models 324. For the purposes of this disclosure, a "machine-learning model" a data structure representing and/or instantiating a mathematical and/or algorithmic representation of a relationship between inputs 312 and outputs 308, generated using any machine-learning process including without limitation any process described above, and stored in memory. An input 312 is submitted to a machine-learning model 324 once created, which generates an output 308 based on the relationship that was derived. For instance, and without limitation, a linear regression model, generated using a linear regression algorithm, may compute a linear combination of input data using coefficients derived during machine-learning processes to calculate an output datum. As a further nonlimiting example, a machine-learning model 324 may be generated by creating an artificial neural network, such as a convolutional neural network comprising an input layer of nodes, one or more intermediate layers, and an output layer of nodes. Connections between nodes may be created by "training" the network, in which elements from a training data 304 are applied to the input nodes, and a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning, as described in detail below.

With continued reference to FIG. 3, machine-learning module 300 may perform at least a supervised machine-learning process 328. For the purposes of this disclosure, a "supervised" machine-learning process is a process with algorithms that receive training data 304 relating one or more inputs 312 to one or more outputs 308, and seek to generate one or more data structures representing and/or instantiating one or more mathematical relations relating input 312 to output 308, where each of the one or more mathematical relations is optimal according to some criterion specified to the algorithm using some scoring function. For instance, a supervised learning algorithm may include inputs 312 described above as inputs, and outputs 308 described above as outputs, and a scoring function representing a desired form of relationship to be detected between inputs 312 and outputs 308. Scoring function may, for instance, seek to maximize the probability that a given input 312 and/or combination thereof is associated with a given output 308 to minimize the probability that a given input 312 is not associated with a given output 308. Scoring function may be expressed as a risk function representing an "expected loss" of an algorithm relating inputs 312 to outputs 308, where loss is computed as an error function representing a degree to which a prediction generated by the relation is incorrect when compared to a given input-output pair provided in training data 304. Supervised machine-learning processes may include classification algorithms as defined above. A person of ordinary skill in the art, upon reviewing the entirety of this disclosure, will be aware of various possible variations of at least a supervised machine-learning process 328 that may be used to determine a relation between inputs and outputs.

With continued reference to FIG. 3, training a supervised machine-learning process may include, without limitation, iteratively updating coefficients, biases, and weights based on an error function, expected loss, and/or risk function. For instance, an output 308 generated by a supervised machine-learning process 328 using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updates may be performed in neural networks using one or more back-propagation algorithms. Iterative and/or recursive updates to weights, biases, coefficients, or other parameters as described above may be performed until currently available training data 304 are exhausted and/or until a convergence test is passed. For the purposes of this disclosure, a "convergence test" is a test for a condition selected to indicate that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

With continued reference to FIG. 3, a computing device, one or more processors, and/or machine-learning module 300 may be configured to perform method, method step, sequence of method steps, and/or algorithm described in reference to this figure, in any order and with any degree of repetition. For instance, computing device, one or more processors, and/or machine-learning module 300 may be configured to perform a single step, sequence, and/or algorithm repeatedly until a desired or commanded outcome is achieved; repetition of a step or a sequence of steps may be performed iteratively and/or recursively using outputs 308 of previous repetitions as inputs 312 to subsequent repetitions, aggregating inputs 312 and/or outputs 308 of repetitions to produce an aggregate result, reduction or decrement of one or more variables such as global variables, and/or division of a larger processing task into a set of iteratively addressed smaller processing tasks. A computing device, one or more processors, system 100, or machine-learning module 300 may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 3, machine-learning process may include at least an unsupervised machine-learning process 332. For the purposes of this disclosure, an "unsupervised" machine-learning process is a process that derives inferences in datasets without regard to labels. As a result, an unsupervised machine-learning process 332 may be free to discover any structure, relationship, and/or correlation provided in the data. Unsupervised processes 332 may not require a response variable, may be used to find interesting patterns and/or inferences between variables, to determine a degree of correlation between two or more variables, or the like.

With continued reference to FIG. 3, machine-learning module 300 may be designed and configured to create machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include an elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to a person of ordinary skill in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought. Similar methods to those described above may be applied to minimize error functions, as will be apparent to a person of ordinary skill in the art upon reviewing the entirety of this disclosure.

With continued reference to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 3, a machine-learning model and/or process may be deployed or instantiated by incorporation into a program, apparatus, system, and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit, to represent a number according to any suitable encoding system including twos complement or the like, or may be stored in any volatile and/or non-volatile memory. Similarly, mathematical operations and input 312 and/or output 308 of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation application-specific integrated circuits (ASICs), production and/or configuration of reconfigurable hardware elements, circuits, and/or modules such as without limitation field programmable gate arrays (FPGAs), production and/or configuration of non-reconfigurable and/or non-rewritable memory elements, circuits, and/or modules such as without limitation non-rewritable read-only memory (ROM), other memory technology described in this disclosure, and/or production and/or configuration of any computing device and/or component thereof as described in this disclosure. Such deployed and/or instantiated machine-learning model and/or algorithm may receive inputs 312 from any other process, module, and/or component described in this disclosure, and produce outputs 308 to any other process, module, and/or component described in this disclosure.

With continued reference to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively, or additionally, retraining, deployment, and/or instantiation may be event-based, and may be triggered, without limitation, by user inputs indicating sub-optimal or otherwise problematic performance and/or by automated field testing and/or auditing processes, which may compare outputs 308 of machine-learning models and/or algorithms, and/or errors and/or error functions thereof, to any thresholds, convergence tests, or the like, and/or may compare outputs 308 of processes described herein to similar thresholds, convergence tests or the like. Event-based retraining, deployment, and/or instantiation may alternatively, or additionally, be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data 304 may include, without limitation, training examples including inputs 312 and correlated outputs 308 used, received, and/or generated from any version of any system, module, machine-learning model or algorithm, apparatus, and/or method described in this disclosure. Such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs 308 for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

With continued reference to FIG. 3, one or more processes or algorithms described above may be performed by at least a dedicated hardware unit 336. For the purposes of this disclosure, a "dedicated hardware unit" is a hardware component, circuit, or the like, aside from a principal control circuit and/or one or more processors performing method steps as described in this disclosure, that is specifically designated or selected to perform one or more specific tasks and/or processes described in reference to this figure. Such specific tasks and/or processes may include without limitation preprocessing and/or sanitization of training data and/or training a machine-learning algorithm and/or model. Dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously, in parallel, and/or the like. Such dedicated hardware units 336 may include, without limitation, graphical processing units (GPUs), dedicated signal processing modules, field programmable gate arrays (FPGA), other reconfigurable hardware that has been configured to instantiate parallel processing units for one or more specific tasks, or the like. Computing device, one or more processors, system 100, or machine-learning module 300 may be configured to instruct one or more dedicated hardware units 336 to perform one or more operations described herein, such as evaluation of model and/or algorithm outputs, one-time or iterative updates to parameters, coefficients, weights, and/or biases, vector and/or matrix operations, and/or any other operations described in this disclosure.

Figure 4:
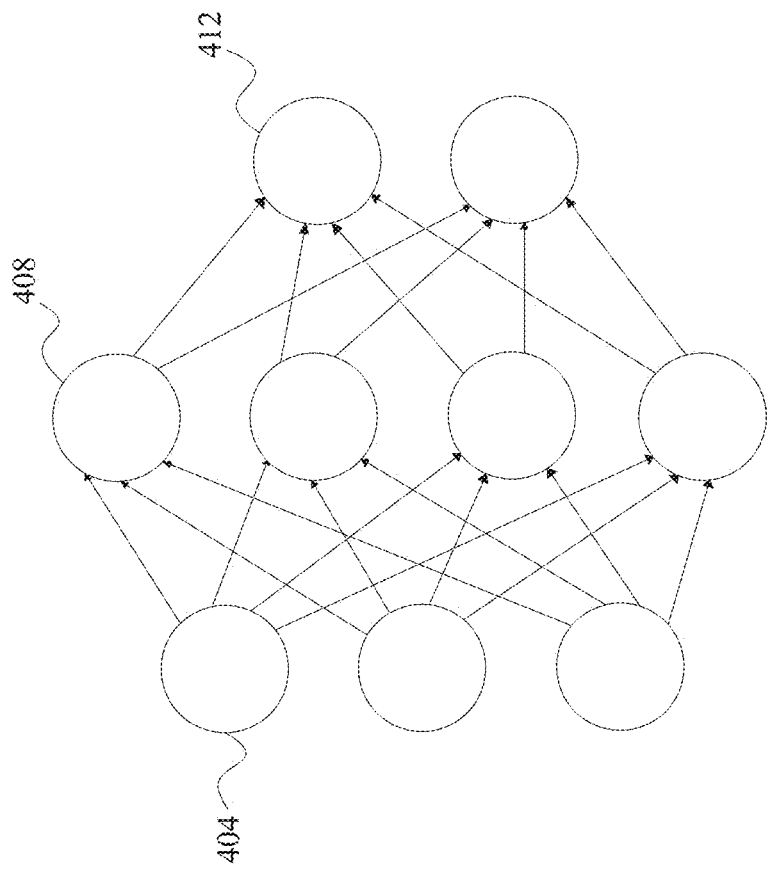
FIG. 4 is a block diagram of an exemplary embodiment of a neural network.

Referring now to FIG. 4, an exemplary embodiment of neural network 400 is illustrated. For the purposes of this disclosure, a "neural network" or "artificial neural network" is a network of "nodes" or data structures having one or more inputs, one or more outputs, and a function determining outputs based on inputs. Such nodes may be organized in a network, such as without limitation a convolutional neural network, including an input layer of nodes 404, at least an intermediate layer of nodes 408, and an output layer of nodes 412. Connections between nodes may be created via the process of "training" neural network 400, in which elements from a training dataset are applied to the input nodes, and a suitable training algorithm (such as Levenberg-Marquardt, conjugate gradient, simulated annealing, or other algorithms) is then used to adjust the connections and weights between nodes in adjacent layers of the neural network 400 to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network". As a further nonlimiting example, neural network 400 may include a convolutional neural network comprising an input layer of nodes 404, one or more intermediate layers of nodes 408, and an output layer of nodes 412. For the purposes of this disclosure, a "convolutional neural network" is a type of neural network 400 in which at least one hidden layer is a convolutional layer that convolves inputs to that layer with a subset of inputs known as a "kernel", along with one or more additional layers such as pooling layers, fully connected layers, and the like.

Figure 5:
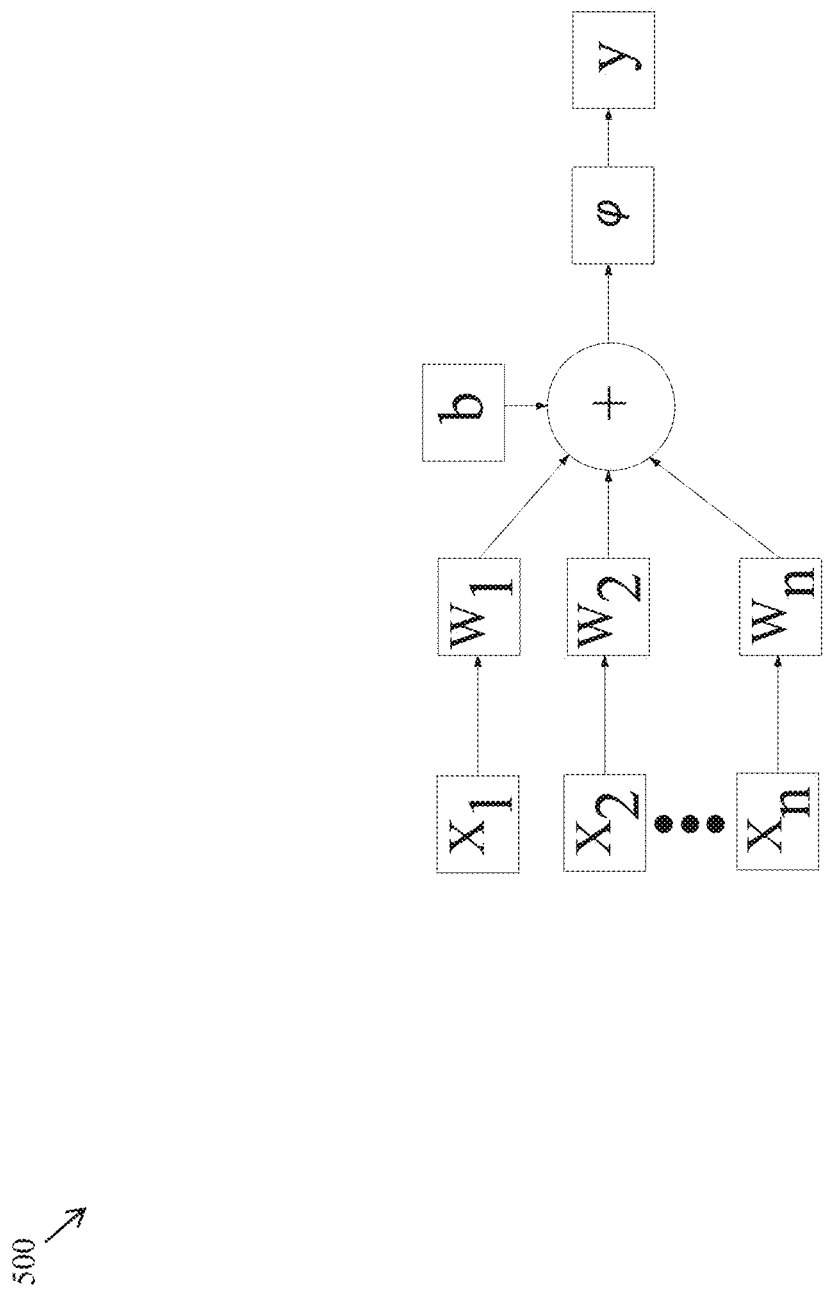
FIG. 5 is a block diagram of an exemplary embodiment of a node of a neural network.

Referring now to FIG. 5, an exemplary embodiment of a node 500 of neural network 400 is illustrated. Node 500 may include, without limitation, a plurality of inputs, $x_i$, that may receive numerical values from inputs to neural network 400 containing the node 500 and/or from other nodes 500. Node 500 may perform one or more activation functions to produce its output given one or more inputs, such as without limitation computing a binary step function comparing an input to a threshold value and outputting either a logic 1 or logic 0 output or its equivalent, a linear activation function whereby an output is directly proportional to input, and/or a nonlinear activation function wherein the output is not proportional to the input. Nonlinear activation functions may include, without limitation, a sigmoid function of the form $$f(x) = \frac{1}{1 - e^{-x}}$$

given input x, a tanh (hyperbolic tangent) function of the form $e^x - e^{-x}/e^x + e^{-x}$, a tanh derivative function such as $f(x)$ =$tanh^2(x)$, a rectified linear unit function such as $f(x)$=max(0, x), a "leaky" and/or "parametric" rectified linear unit function such as $f(x)$=max(ax, x) for some value of a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)$=x*sigmoid(x), a Gaussian error linear unit function such as $f(x)$=a(1+tanh($\sqrt{2/\pi}$(x+bx$^r$))) for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$, that may be used as activation functions. As a nonlimiting and illustrative example, node 500 may perform a weighted sum of inputs using weights, $w_i$, that are multiplied by respective inputs, $x_i$. Additionally, or alternatively, a bias b may be added to the weighted sum of the inputs such that an offset is added to each unit in a neural network layer that is independent of the input to the layer. The weighted sum may then be input into a function, φ, which may generate one or more outputs, y. Weight, $w_i$, applied to an input, $x_i$, may indicate whether the input is "excitatory", indicating that it has strong influence on the one or more outputs, y, for instance by the corresponding weight having a large numerical value, or "inhibitory", indicating it has a weak influence on the one more outputs, y, for instance by the corresponding weight having a small numerical value. The values of weights, $w_i$, may be determined by training neural network 400 using training data, which may be performed using any suitable process as described above.

Figure 6:
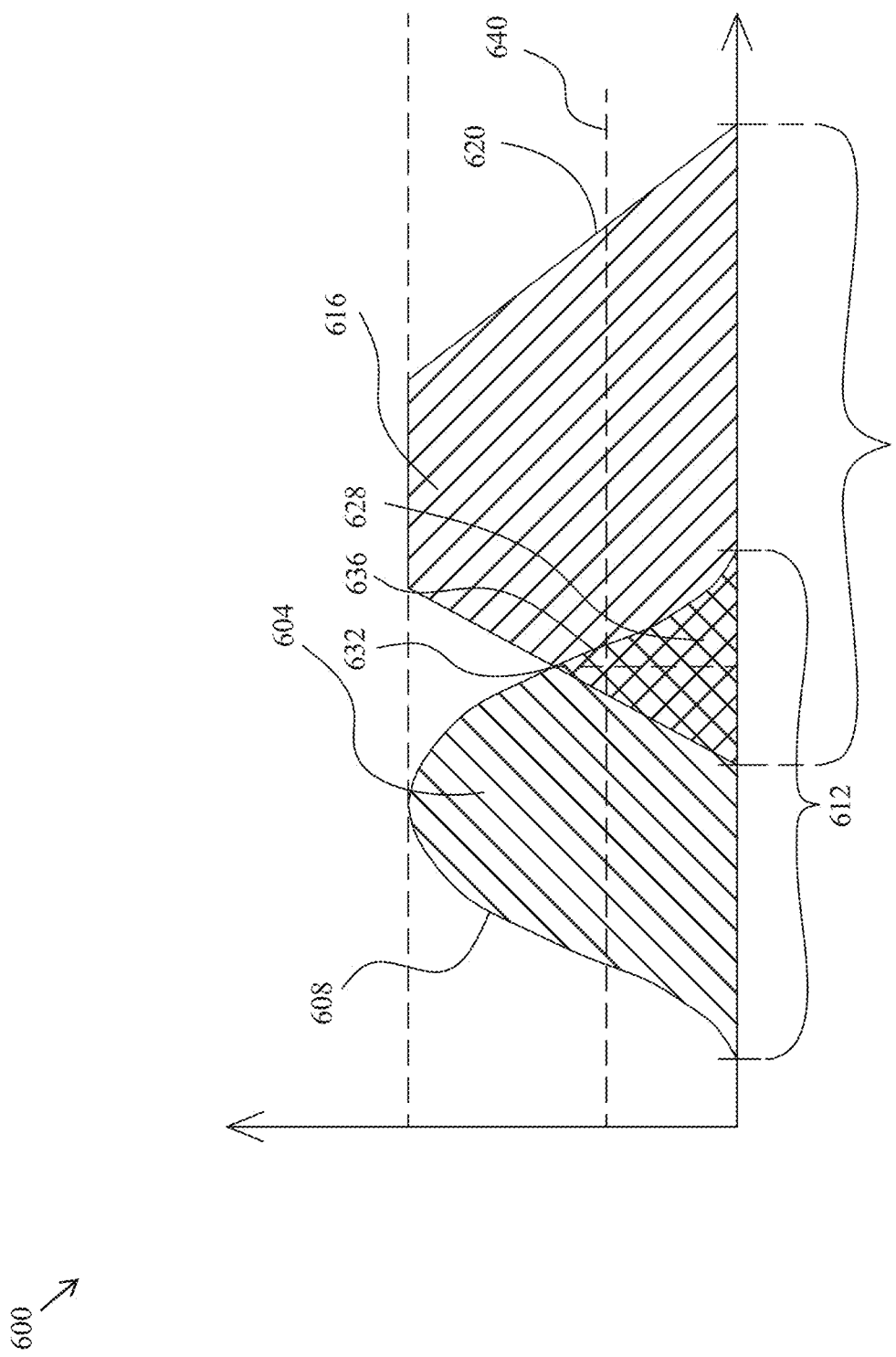
FIG. 6 is an illustration of an exemplary embodiment of fuzzy set comparison.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within the first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range of values 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

A person of ordinary skill in the art, upon reviewing the entirety of this disclosure, will be aware of various alternative or additional membership functions that may be used consistently with this disclosure.

With continued reference to FIG. 6, in one or more embodiments, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range of values 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range of values 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a nonlimiting example, represent a degree of match between first fuzzy set 604 and second fuzzy set 616, and/or single values therein with each other or with either set, which is sufficient for purposes of the matching process; for instance, threshold 640 may indicate a sufficient degree of overlap between an output from one or more machine-learning models. Alternatively, or additionally, each threshold 640 may be tuned by a machine learning and/or statistical process, for instance and without limitation as described in further detail in this disclosure.

With continued reference to FIG. 6, in one or more embodiments, a degree of match between fuzzy sets may be used to classify plurality of streaming contents, as described above in this disclosure. As a nonlimiting example, if one or more streaming contents are associated with a fuzzy set that matches a fuzzy set of a cohort by having a degree of overlap exceeding a threshold, computing device may classify the one or more streaming contents as belonging to that cohort. Where multiple fuzzy matches are performed, degrees of match for each respective fuzzy set may be computed and aggregated through, for instance, addition, averaging, or the like, to determine an overall degree of match.

With continued reference to FIG. 6, in one or more embodiments, one or more streaming contents may be compared to multiple fuzzy sets of multiple cohorts. As a nonlimiting example, one or more streaming contents may be represented by a fuzzy set that is compared to each of the multiple fuzzy sets of multiple cohorts, and a degree of overlap exceeding a threshold between the fuzzy set representing the one or more streaming contents and any of the multiple fuzzy sets representing multiple cohorts may cause computing device to classify the one or more streaming contents as belonging to that cohort. As a nonlimiting example, there may be two fuzzy sets representing two cohorts, cohort A and cohort B. Cohort A may have a cohort A fuzzy set, cohort B may have a cohort B fuzzy set, and one or more streaming contents may have a streaming content fuzzy set. A computing device may compare the streaming content fuzzy set with each of cohort A fuzzy set and cohort B fuzzy set, as described above, and classify one or more associated streaming contents to either, both, or neither of cohort A fuzzy set and cohort B fuzzy set. Machine-learning methods as described throughout this disclosure may, in a nonlimiting example, generate coefficients used in fuzzy set equations as described above, such as without limitation x, c, and σ of a Gaussian set as described above, as outputs of machine learning methods. Likewise, streaming contents may be used indirectly to determine a fuzzy set, as streaming content fuzzy set may be derived from outputs of one or more machine-learning models that take streaming content directly or indirectly as inputs.

With continued reference to FIG. 6, in one or more embodiments, fuzzy set comparison 600 may include a fuzzy inference model. For the purposes of this disclosure, a "fuzzy inference model" is a model that uses fuzzy logic to reach a decision and derive a meaningful outcome. As a nonlimiting example, a fuzzy inference system may be associated with multiple characteristics. In one or more embodiments, an inferencing rule may be applied to determine a fuzzy set membership of a combined output based on the fuzzy set membership of linguistic variables. As a nonlimiting example, membership of a combined output in a fuzzy set X may be determined based on a percentage membership of a second linguistic variable with a first mode in a fuzzy set X and a percentage membership of the second linguistic variable associated with a second mode in a fuzzy set Y. In one or more embodiments, parameters of streaming content fuzzy set may then be determined by comparison to a threshold or output using another defuzzification process. Each stage of such a process may be implemented using any type of machine-learning model, such as any type of neural network, as described herein. In one or more embodiments, parameters of one or more fuzzy sets may be tuned using machine learning. In one or more embodiments, fuzzy inferencing and/or machine learning may be used to synthesize outputs. In some cases, outputs may be combined to make an overall or final determination, which may be displayed with or instead of individual outputs. As another nonlimiting example, outputs may be ranked, wherein the output with the highest confidence score may be the output displayed at display device or displayed first in a ranked display of result outputs.

With continued reference to FIG. 6, fuzzy set comparison 600 may be generated as a function of determining a data compatibility threshold. Data compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine learning, or other method that may occur to a person of ordinary skill in the art upon reviewing the entirety of this disclosure. In some embodiments, determining compatibility threshold may include using a linear regression model. A linear regression model may include a machine-learning model. In some embodiments, determining compatibility threshold may include using a classification model. A classification model may be configured to input collected data and cluster data to a centroid based on, but not limited to, frequency of appearance, linguistic indicators of compatibility and/or allowability, and the like. Centroids may include scores assigned to them such that the compatibility threshold may each be assigned a score. In some embodiments, a classification model may include a k-means clustering model. In some embodiments, a classification model may include a particle swarm optimization model. In some embodiments, determining a compatibility threshold may include using a fuzzy inference engine. A fuzzy inference engine may be configured to map one or more compatibility thresholds using fuzzy logic. In some embodiments, a plurality of computing devices may be arranged by a logic comparison program into compatibility arrangements. Membership function coefficients and/or constants as described above may be tuned according to classification and/or clustering algorithms. As a nonlimiting example, a clustering algorithm may determine a Gaussian or other distribution about a centroid corresponding to a given compatibility threshold, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

With continued reference to FIG. 6, an inference engine may combine rules, such as any semantic language and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), associativity: T(a, T(b, c))=T(T(a, b), c), and the requirement that the number 1 acts as an identity element. Combinations of rules ("and" or "or" combination of rule membership determinations) may be performed using any T-conorm, as represented by an inverted T symbol or "⊥", such as max(a, b), probabilistic sum of a and b (a+b−a×b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally, T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 7:
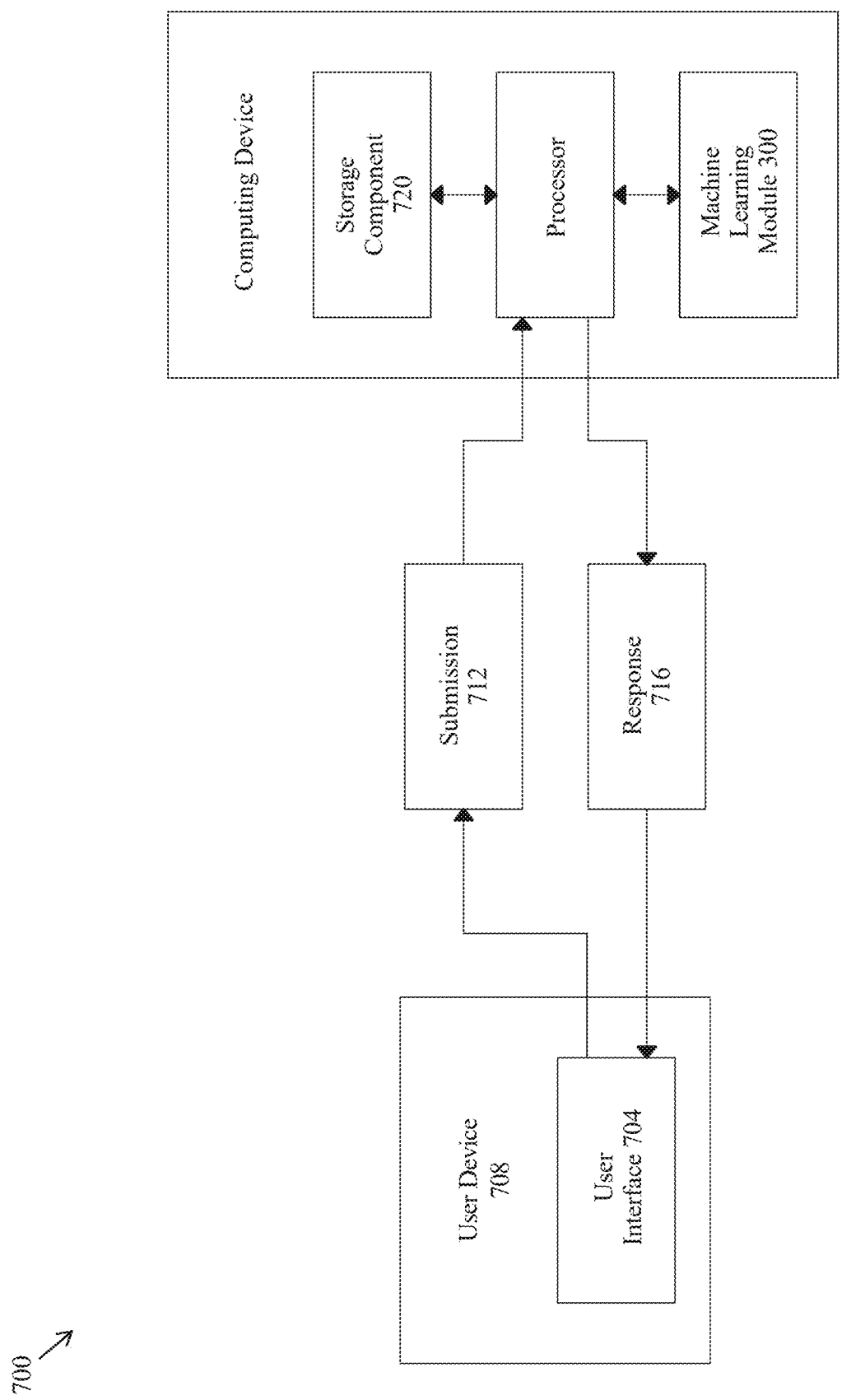
FIG. 7 is a block diagram of an exemplary embodiment of a chatbot system.

Referring now to FIG. 7, in one or more embodiments, system 100 may perform one or more of its functions, such as receiving user query, by implementing at least a chatbot system 700, an exemplary embodiment of which is schematically illustrated. In one or more embodiments, a user interface 704 may be communicatively connected with a computing device that is configured to operate a chatbot. In some cases, user interface 704 may be local to computing device. Alternatively, or additionally, in some other cases, user interface 704 may be remote to computing device, e.g., as part of a user device 708, and communicative with the computing device and one or more processors therein, by way of one or more networks, such as without limitation the internet. Alternatively, or additionally, user interface 704 may communicate with user interface 704 and/or a computing device using telephonic devices and networks, such as without limitation fax machines, short message service (SMS), or multimedia message service (MMS). Commonly, user interface 704 may communicate with computing device using text-based communication, for example without limitation using a character encoding protocol, such as American Standard for Information Interchange (ASCII). Typically, user interface 704 may conversationally interface a chatbot, by way of at least a submission 712, from the user interface 704 to the chatbot, and a response 716, from the chatbot to the user interface 704. In many cases, one or both of submission 712 and response 716 may be text-based communication. Alternatively, or additionally, in some cases, one or both of submission 712 and response 716 may be audio-based communication.

With continued reference to FIG. 7, submission 712, once received by user interface 704 and/or computing device that operates a chatbot, may be processed by one or more processors. In one or more embodiments, one or more processors may process submission 712 using one or more of keyword recognition, pattern matching, and natural language processing. In one or more embodiments, one or more processors may employ real-time learning with evolutionary algorithms. In one or more embodiments, one or more processors may retrieve a pre-prepared response from at least a storage component 720, based upon submission 712.

Alternatively, or additionally, in one or more embodiments, one or more processors may communicate a response 716 without first receiving a submission 712, thereby initiating a conversation. In some cases, one or more processors may communicate an inquiry to user interface 704 and/or computing device, wherein one or more processors are configured to process an answer to the inquiry in a following submission 712 from the user interface 704 and/or computing device. In some cases, an answer to an inquiry presented within submission 712 from user interface 704 and/or computing device may be used by the computing device as an input to another function.

Figure 8:
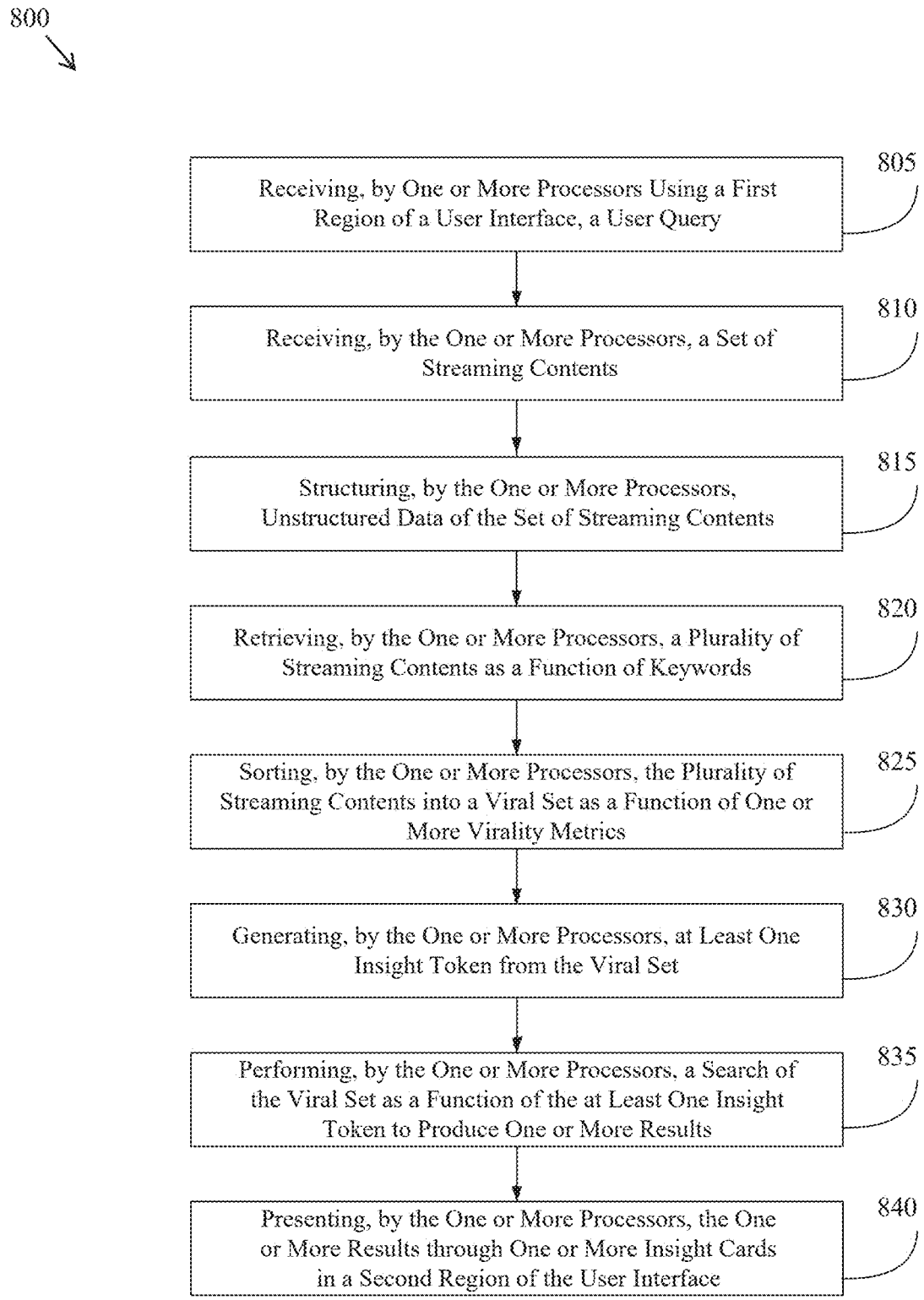
FIG. 8 is an exemplary flow diagram illustrating a method for estimating content uptake metrics.

Referring now to FIG. 8, an exemplary embodiment of a method 800 for estimating content uptake metrics is described. At step 805, method 800 includes receiving, by one or more processors using first region 216 of user interface 104, a user query. Receiving the user query includes parsing the user query into a plurality of keywords using at least a textual processing module. This step may be implemented with reference to details described above in this disclosure and without limitation.

With continued reference to FIG. 8, at step 810, method 800 includes receiving, by the one or more processors, a set of streaming contents, wherein the set of streaming contents includes unstructured data including a plurality of video frames and an audio stream. This step may be implemented with reference to details described above in this disclosure and without limitation.

With continued reference to FIG. 8, at step 815, method 800 includes structuring, by the one or more processors, the unstructured data of the set of streaming contents by extracting a first plurality of tokens from the plurality of video frames as a function of an object recognition module, extracting a second plurality of tokens from the audio stream as a function of a speech-to-text module, and combining at least the first plurality of tokens and the second plurality of tokens to form a unified set of tokens.

With continued reference to FIG. 8, at step 820, method 800 includes retrieving, by the one or more processors, a plurality of streaming contents as a function of the plurality of keywords. Retrieving the plurality of streaming contents includes selecting at least a streaming content from the set of streaming contents, wherein at least a token of the unified set of tokens matches at least a keyword of the plurality of keywords. This step may be implemented with reference to details described above in this disclosure and without limitation.

With continued reference to FIG. 8, at step 825, method 800 includes sorting, by the one or more processors, the plurality of streaming contents into a viral set as a function of one or more virality metrics. This step may be implemented with reference to details described above in this disclosure and without limitation.

With continued reference to FIG. 8, at step 830, method 800 includes generating, by the one or more processors, at least one insight token from the viral set. This step may be implemented with reference to details described above in this disclosure and without limitation.

With continued reference to FIG. 8, at step 835, method 800 includes performing, by one or more processors, a search of the viral set as a function of the at least one insight token to produce one or more results. This step may be implemented with reference to details described above in this disclosure and without limitation.

With continued reference to FIG. 8, at step 840, method 800 includes presenting, by the one or more processors, the one or more results through one or more insight cards 212 in second region 220 of user interface 104. This step may be implemented with reference to details described above in this disclosure and without limitation.

Figure 9:
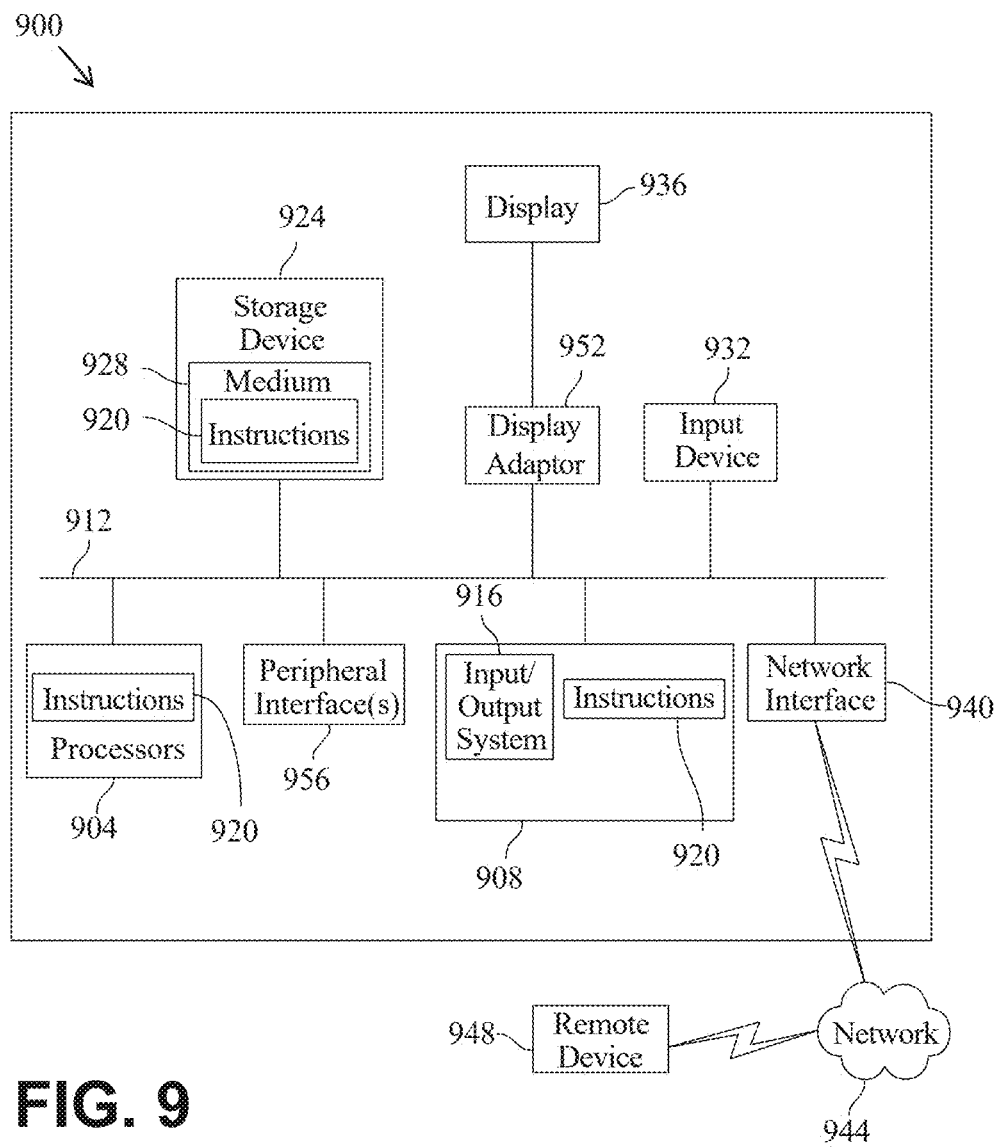
FIG. 9 is a block diagram of an exemplary embodiment of a computing system that can be used to implement any one or more of the methodologies disclosed herein and any one or more portions thereof.

Referring now to FIG. 9, it is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to one of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

With continued reference to FIG. 9, the figure shows a diagrammatic representation of one embodiment of a computing device in the exemplary form of a computing system 900 within which a set of instructions for causing the computing system 900 to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing system 900 may include a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures. Processor 904 may include any suitable processor, such as without limitation a processor incorporating logical circuitry for performing arithmetic and logical operations, such as an arithmetic and logic unit, which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor, field programmable gate array, complex programmable logic device, graphical processing unit, general-purpose graphical processing unit, tensor processing unit, analog or mixed signal processor, trusted platform module, a floating-point unit, and/or system on a chip.

With continued reference to FIG. 9, memory 908 may include various components (e.g., machine-readable media) including, but not limited to, a random-access memory component, a read only component, and any combinations thereof. In one example, a basic input/output system 916, including basic routines that help to transfer information between elements within computing system 900, such as during start-up, may be stored in memory 908. Memory 908 (e.g., stored on one or more machine-readable media) may also include instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

With continued reference to FIG. 9, computing system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, small computer system interface, advanced technology attachment, serial advanced technology attachment, universal serial bus, IEEE 1394 (FIREWIRE), and any combinations thereof. In one example, storage device 924 (or one or more components thereof) may be removably interfaced with computing system 900 (e.g., via an external port connector (not shown)). Particularly, storage device 924 and an associated machine-readable medium 928 may provide nonvolatile and/or volatile storage of machine-readable instructions, data structures, program modules, and/or other data for computing system 900. In one example, software 920 may reside, completely or partially, within machine-readable medium 928. In another example, software 920 may reside, completely or partially, within processor 904.

With continued reference to FIG. 9, computing system 900 may also include an input device 932. In one example, a user of computing system 900 may enter commands and/or other information into computing system 900 via input device 932. Examples of input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

With continued reference to FIG. 9, user may also input commands and/or other information to computing system 900 via storage device 924 (e.g., a removable disk drive, a flash drive, etc.) and/or network interface device 940. A network interface device, such as network interface device 940, may be utilized for connecting computing system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide-area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computing system 900 via network interface device 940.

With continued reference to FIG. 9, computing system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Video display adapter 952 and display device 936 may be utilized in combination with processor 904 to provide graphical representations of aspects of the present disclosure. In addition to a display device, computing system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for structuring and analyzing multimodal, unstructured data, the system comprising:
  a user interface, the user interface comprising:
    a first region configured to receive a user query; and
    a second region configured to display, using one or more insight cards, one or more results as a function of the user query;
  one or more processors; and
  a memory communicatively connected to the one or more processors, wherein the memory contains instructions configuring the one or more processors to:
    receive a set of streaming contents, wherein the set of streaming contents comprises unstructured data comprising a plurality of video frames and an audio stream;
    structure the unstructured data of the set of streaming contents by:
      extracting a first plurality of tokens from the plurality of video frames as a function of an object recognition module;
      extracting a second plurality of tokens from the audio stream as a function of a speech-to-text module; and
      combining the first plurality of tokens and the second plurality of tokens to form a unified set of tokens;
    receive the user query from the first region of the user interface, wherein receiving the user query comprises parsing the user query into a plurality of keywords using at least a textual processing module;
    retrieve a plurality of streaming content as a function of the plurality of keywords, wherein retrieving the plurality of streaming content comprises selecting at least a streaming content from the set of streaming contents as a function of at least a keyword of the plurality of keywords;
    receive one or more virality metrics associated with the at least a streaming content of the plurality of streaming contents;
    sort the plurality of streaming contents into a viral set, as a function of the one or more virality metrics;
    generate at least one insight token from the viral set as a function of the one or more virality metrics and the unified set of tokens; and
    present one or more insight cards that visually represent the at least one insight token in the second region of the user interface.

2. The system of claim 1 wherein at least one token of the second plurality of tokens comprises at least a text tag.

3. The system of claim 2, wherein the speech-to-text module comprises a large language model (LLM), wherein the LLM is trained on training data and configured to extract the at least a text tag from the audio stream.

4. The system of claim 1, wherein the object recognition module comprises a large language model (LLM), wherein the LLM comprises a plurality of domain-specific machine-learning models; and
  at least a domain-specific machine-learning model of the plurality of domain-specific machine-learning models is configured to extract at least one token of the first plurality of tokens.

5. The system of claim 1, wherein the one or more insight cards are generated using a machine-learning model trained on training data, wherein the machine-learning model is selected from a group consisting of a video object recognition machine-learning model, a language translation machine-learning model, and a speech transcript extraction machine-learning model.

6. The system of claim 1, wherein extracting the first plurality of tokens from the plurality of video frames comprises:
  identifying a face within a first video frame using the object recognition module;
  calculating a facial presence of the face in each video frame of the plurality of video frames;
  determining a facial presence percentage as a function of a count of video frames in which the facial presence is positive and a total count of video frames; and
  storing the facial presence percentage as at least a token of the first plurality of tokens.

7. The system of claim 1, wherein at least one of the one or more insight cards is generated using a statistical inference machine-learning model trained on training data.

8. The system of claim 1, wherein:
  the user query comprises a plurality of query video frames and a query audio stream; and
  parsing the user query comprises structuring the user query by:
    extracting at least a first keyword from the plurality of query video frames, as a function of the object recognition module;
    extracting at least a second keyword from the query audio stream as a function of the speech-to-text module; and
    combining the at least a first keyword and the at least a second keyword to form the plurality of keywords.

9. The system of claim 1, wherein the one or more virality metrics include one or more members selected from a group consisting of a number of likes, a number of dislikes, a number of shares, a number of comments, a number of views per like, a number of likes per follower, a number of shares per follower, a number of shares per viewer, a number of shares over a total number of streaming contents, a number of shares over a total number of shares, a number of likes per total likes in a channel, a number of views per subscriber, a retention rate of viewers, a retention time of viewers, a number of followers gained upon video posting, and a number of total followers in the channel.

10. The system of claim 1, wherein the one or more processors are further configured to determine, for at least a token of the unified set of tokens, a frequency in the viral set; and
  calculate a p-value using a hypergeometric test as a function of the frequency of the viral set.

11. The system of claim 1, wherein the user interface further comprises a third region configured to display one or more viral concepts related to the user query as a function of a prior history of virality for concepts associated with the user query.

12. The system of claim 1, wherein retrieving the plurality of streaming content as a function of the plurality of keywords comprises matching at least a token of the unified set of tokens to at least a keyword of the plurality of keywords.

13. The system of claim 1, wherein presenting the one or more insight cards that visually represent the at least one insight token in the second region of the user interface, further comprises:
   performing a search of the viral set as a function of the at least one insight token to produce one or more results; and
   presenting the one or more results through the one or more insight cards in the second region of the user interface.

14. A method for structuring and analyzing multimodal, unstructured data, the method comprising:
   receiving, by one or more processors, a set of streaming contents, wherein the set of streaming contents comprises unstructured data comprising a plurality of video frames and an audio stream;
   structuring, by the one or more processors, the unstructured data of the set of streaming contents by:
      extracting a first plurality of tokens from the plurality of video frames as a function of an object recognition module;
      extracting a second plurality of tokens from the audio stream as a function of a speech-to-text module; and
      combining at least the first plurality of tokens and the second plurality of tokens to form a unified set of tokens;
   receiving, by the one or more processors, a user query from a first region of a user interface, wherein receiving the user query comprises parsing the user query into a plurality of keywords using at least a textual processing module;
   retrieving, by the one or more processors, a plurality of streaming contents as a function of the plurality of keywords, wherein retrieving the plurality of streaming contents comprises selecting at least a streaming content from the set of streaming contents as a function of at least a keyword of the plurality of keywords;
   receive one or more virality metrics associated with the at least a streaming content of the plurality of streaming contents;
   sorting, by the one or more processors, the plurality of streaming contents into a viral set, as a function of the one or more virality metrics;
   generating, by the one or more processors, at least one insight token from the viral set, as function of the one or more virality metrics and the unified set of tokens; and
   presenting, by the one or more processors, one or more insight cards that visually represent the at least one insight token in the second region of the user interface.

15. The method of claim 14, further comprising generating, by the one or more processors, the one or more insight cards using a machine-learning model trained on training data, wherein the machine-learning model is selected from a group consisting of a video object recognition machine-learning model, a language translation machine-learning model, and a speech transcript extraction machine-learning model.

16. The method of claim 14, further comprising generating, by the one or more processors, the one or more insight cards using a statistical inference machine-learning model trained on training data.

17. The method of claim 14, wherein:
   the user query comprises a plurality of query video frames and a query audio stream; and
   parsing the user query comprises structuring the user query by:
      extracting at least a first keyword from the plurality of query video frames, as a function of the object recognition module;
      extracting at least a second keyword from the query audio stream as a function of the speech-to-text module; and
      combining the at least a first keyword and the at least a second keyword to form the plurality of keywords.

18. The method of claim 14, wherein the one or more virality metrics include one or more members selected from a group consisting of a number of likes, a number of dislikes, a number of shares, a number of comments, a number of views per like, a number of likes per follower, a number of shares per follower, a number of shares per viewer, a number of shares over total number of videos, a number of shares over total number of shares, a number of likes per total likes in a channel, a number of views per subscriber, a retention rate of viewers, a retention time of viewers, a number of followers gained upon video posting, and a number of total followers in the channel.

19. The method of claim 14, further comprising:
   determining, by the one or more processors, a frequency in the viral set for at least a token of the unified set of tokens; and
   calculating, by the one or more processors using a hypergeometric test, a p-value as a function of the frequency.

20. The method of claim 14, wherein retrieving the plurality of streaming content as a function of the plurality of keywords comprises matching at least a token of the unified set of tokens to at least a keyword of the plurality of keywords.

21. The method of claim 14, wherein presenting the one or more insight cards that visually represent the at least one insight token in the second region of the user interface, further comprises:
   performing a search of the viral set as a function of the at least one insight token to produce one or more results; and
   presenting the one or more results through the one or more insight cards in the second region of the user interface.

22. At least one non-transitory processor-readable storage medium storing a computer program of instructions configured to be readable by at least one processor for instructing the at least one processor to:
   receive a set of streaming contents, wherein the set of streaming contents comprises unstructured data comprising a plurality of video frames and an audio stream;
   structure the unstructured data of the set of streaming contents by:
      extracting a first plurality of tokens from the plurality of video frames as a function of an object recognition module; and
      extracting a second plurality of tokens from the audio stream as a function of a speech-to-text module; and
      combining the first plurality of tokens and the second plurality of tokens to form a unified set of tokens;

receive a user query from a first region of a user interface, wherein receiving the user query comprises parsing the user query into a plurality of keywords using at least a textual processing module;

retrieve a plurality of streaming content as a function of the plurality of keywords, wherein retrieving the plurality of streaming content comprises selecting at least a streaming content from the set of streaming contents as a function of at least a keyword of the plurality of keywords;

receive one or more virality metrics associated with the at least a streaming content of the plurality of streaming contents;

sorting the plurality of streaming contents into a viral set, as a function of the one or more virality metrics;

generating at least one insight token from the viral set, as function of the one or more virality metrics and the unified set of tokens; and presenting one or more insight cards that visually represent the at least one insight token in the second region of the user interface.

\* \* \* \* \*